(12) United States Patent
Holzer et al.

(10) Patent No.: US 11,435,869 B2
(45) Date of Patent: *Sep. 6, 2022

(54) VIRTUAL REALITY ENVIRONMENT BASED MANIPULATION OF MULTI-LAYERED MULTI-VIEW INTERACTIVE DIGITAL MEDIA REPRESENTATIONS

(71) Applicant: Fyusion, Inc., San Francisco, CA (US)

(72) Inventors: Stefan Johannes Josef Holzer, San Mateo, CA (US); Stephen David Miller, San Francisco, CA (US); Radu Bogdan Rusu, San Francisco, CA (US); Alexander Jay Bruen Trevor, San Francisco, CA (US); Krunal Ketan Chande, San Francisco, CA (US)

(73) Assignee: Fyusion, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/726,090

(22) Filed: Dec. 23, 2019

(65) Prior Publication Data

US 2020/0133462 A1 Apr. 30, 2020

Related U.S. Application Data

(63) Continuation of application No. 15/724,081, filed on Oct. 3, 2017, now Pat. No. 10,514,820, which is a
(Continued)

(51) Int. Cl.
*G06F 3/04815* (2022.01)
*G06F 3/01* (2006.01)
(Continued)

(52) U.S. Cl.
CPC .......... *G06F 3/04815* (2013.01); *G06F 3/011* (2013.01); *G06T 15/205* (2013.01);
(Continued)

(58) Field of Classification Search
None
See application file for complete search history.

(56) References Cited

U.S. PATENT DOCUMENTS 5,495,576 A 2/1996 Ritchey
5,557,684 A 9/1996 Wang
(Continued)

FOREIGN PATENT DOCUMENTS

CN 105849781 A 8/2016
CN 105849781 B 8/2016
(Continued)

OTHER PUBLICATIONS

Mikolajczyk, Krystian, et al., A Performance Evaluation of Local Descriptors, IEEE Transactions on Pattern Analysis and Machine Intelligence, vol. 27, No. 10, 1615-1630 pgs.
(Continued)

*Primary Examiner* — Yingchun He
(74) *Attorney, Agent, or Firm* — Kwan & Olynick LLP

(57) ABSTRACT

Various embodiments of the present disclosure relate generally to systems and methods for generating multi-view interactive digital media representations in a virtual reality environment. According to particular embodiments, a plurality of images is fused into a first content model and a first context model, both of which include multi-view interactive digital media representations of objects. Next, a virtual reality environment is generated using the first content model and the first context model. The virtual reality environment includes a first layer and a second layer. The user can navigate through and within the virtual reality environment to switch between multiple viewpoints of the content model via corresponding physical movements. The first layer includes the first content model and the second layer includes a second content model and wherein selection of
(Continued)

the first layer provides access to the second layer with the second content model.

20 Claims, 62 Drawing Sheets

Related U.S. Application Data continuation of application No. 15/682,362, filed on Aug. 21, 2017, now Pat. No. 10,222,932, which is a continuation-in-part of application No. 14/800,638, filed on Jul. 15, 2015, now Pat. No. 9,940,541.

(60) Provisional application No. 62/377,519, filed on Aug. 19, 2016, provisional application No. 62/377,513, filed on Aug. 19, 2016, provisional application No. 62/377,517, filed on Aug. 19, 2016.

(51) Int. Cl.
| | |
|---|---|
| *G06T 15/20* | (2011.01) |
| *G06T 19/00* | (2011.01) |
| *H04N 21/00* | (2011.01) |
| *H04N 13/111* | (2018.01) |
| *G06V 10/70* | (2022.01) |
| *G06V 20/10* | (2022.01) |
| *G06V 20/20* | (2022.01) |
| *H04L 67/131* | (2022.01) |
| *H04N 13/00* | (2018.01) |
| *H04N 13/261* | (2018.01) |

(52) U.S. Cl.
CPC .......... *G06T 19/003* (2013.01); *G06V 10/768* (2022.01); *G06V 20/10* (2022.01); *G06V 20/20* (2022.01); *H04L 67/131* (2022.05); *H04N 13/111* (2018.05); *H04N 21/00* (2013.01); *A63F 2300/303* (2013.01); *A63F 2300/8082* (2013.01); *H04N 13/261* (2018.05); *H04N 2013/0085* (2013.01)

(56) References Cited

U.S. PATENT DOCUMENTS

| | | | |
|---|---|---|---|
| 5,613,048 | A | 3/1997 | Chen et al. |
| 5,613,056 | A | 3/1997 | Gasper |
| 5,694,533 | A * | 12/1997 | Richards ............ G06T 15/10 345/420 |
| 5,706,417 | A | 1/1998 | Adelson |
| 5,847,714 | A | 12/1998 | Naqvi |
| 5,850,352 | A | 12/1998 | Moezzi et al. |
| 5,926,190 | A | 7/1999 | Turkowski et al. |
| 6,031,564 | A | 2/2000 | Ma et al. |
| 6,080,063 | A | 6/2000 | Khosla |
| 6,185,343 | B1 | 2/2001 | Ikeda |
| 6,252,974 | B1 | 6/2001 | Martens et al. |
| 6,266,068 | B1 | 7/2001 | Kang |
| 6,281,903 | B1 | 8/2001 | Martin et al. |
| 6,327,381 | B1 | 12/2001 | Rogina et al. |
| 6,385,245 | B1 | 5/2002 | De Haan |
| 6,504,569 | B1 | 1/2003 | Jasinschi et al. |
| 6,522,787 | B1 | 2/2003 | Kumar |
| 6,778,207 | B1 | 8/2004 | Lee et al. |
| 6,814,889 | B1 | 11/2004 | O'Grady et al. |
| 6,975,756 | B1 | 12/2005 | Slabaugh |
| 7,167,180 | B1 | 1/2007 | Shibolet |
| 7,593,000 | B1 | 9/2009 | Chin |
| 7,631,261 | B2 | 12/2009 | Williams |
| 7,631,277 | B1 | 12/2009 | Nie |
| 8,078,004 | B2 | 12/2011 | Kang et al. |
| 8,094,928 | B2 | 1/2012 | Graepel |
| 8,160,391 | B1 | 4/2012 | Zhu |
| 8,244,069 | B1 | 8/2012 | Bourdev |
| 8,401,276 | B1 | 3/2013 | Choe et al. |
| 8,503,826 | B2 | 8/2013 | Klimenko |
| 8,504,842 | B1 | 8/2013 | Meacham |
| 8,515,982 | B1 | 8/2013 | Hickman |
| 8,589,069 | B1 | 11/2013 | Lehman |
| 8,682,097 | B2 | 3/2014 | Steinberg et al. |
| 8,803,912 | B1 | 8/2014 | Fouts |
| 8,817,071 | B2 | 8/2014 | Wang |
| 8,819,525 | B1 | 8/2014 | Holmer |
| 8,866,841 | B1 | 10/2014 | Distler |
| 8,942,917 | B2 | 1/2015 | Chrysanthakopoulos |
| 8,947,452 | B1 | 2/2015 | Ballagh et al. |
| 8,947,455 | B2 | 2/2015 | Friesen |
| 8,963,855 | B2 | 2/2015 | Chen et al. |
| 8,966,356 | B1 | 2/2015 | Hickman |
| 9,024,970 | B2 | 5/2015 | Lynch |
| 9,027,117 | B2 | 5/2015 | Wilairat |
| 9,043,222 | B1 | 5/2015 | Kerr |
| 9,070,402 | B2 | 6/2015 | Burtnyk |
| 9,094,670 | B1 | 7/2015 | Furio |
| 9,129,179 | B1 | 9/2015 | Wong |
| 9,317,881 | B1 | 4/2016 | Ledterman et al. |
| 9,325,899 | B1 | 4/2016 | Chou et al. |
| 9,367,951 | B1 | 6/2016 | Gray et al. |
| 9,390,250 | B2 | 7/2016 | Kim et al. |
| 9,400,595 | B2 | 7/2016 | Li et al. |
| 2,534,821 | A1 | 8/2016 | Joseph |
| 9,407,816 | B1 | 8/2016 | Sehn |
| 9,412,203 | B1 | 8/2016 | Garcia, I et al. |
| 9,472,161 | B1 | 10/2016 | Ho |
| 9,621,768 | B1 | 4/2017 | Lyon |
| 9,704,257 | B1 | 7/2017 | Tuzel et al. |
| 9,734,586 | B2 | 8/2017 | Luo et al. |
| 9,865,033 | B1 | 1/2018 | Jafarzadeh et al. |
| 9,865,058 | B2 | 1/2018 | Mullins |
| 9,865,069 | B1 | 1/2018 | Saporta et al. |
| 9,886,771 | B1 | 2/2018 | Chen |
| 9,898,742 | B2 | 2/2018 | Higgins et al. |
| 9,904,056 | B2 | 2/2018 | Raghoebardajal |
| 9,910,505 | B2 | 3/2018 | Park et al. |
| 9,928,544 | B1 | 3/2018 | Hasan |
| 9,940,541 | B2 | 4/2018 | Holzer et al. |
| 9,968,257 | B1 | 5/2018 | Burt |
| 9,998,663 | B1 | 6/2018 | François et al. |
| 10,055,882 | B2 | 8/2018 | Marin |
| 10,147,211 | B2 | 12/2018 | Holzer et al. |
| 10,157,333 | B1 | 12/2018 | Wang |
| 10,176,592 | B2 | 1/2019 | Holzer et al. |
| 10,176,636 | B1 | 1/2019 | Neustein |
| 10,204,448 | B2 | 2/2019 | Hazeghi |
| 10,222,932 | B2 | 3/2019 | Holzer et al. |
| 10,242,474 | B2 | 3/2019 | Holzer et al. |
| 10,262,426 | B2 | 4/2019 | Holzer et al. |
| 10,275,935 | B2 | 4/2019 | Holzer et al. |
| 10,284,794 | B1 | 5/2019 | Francois |
| 10,306,203 | B1 | 5/2019 | Goyal |
| 10,360,601 | B1 | 7/2019 | Adegan |
| 10,373,260 | B1 | 8/2019 | Haller, Jr. |
| 10,382,739 | B1 | 8/2019 | Rusu |
| 10,430,995 | B2 | 10/2019 | Holzer et al. |
| 10,574,974 | B2 | 2/2020 | Arora |
| 10,657,647 | B1 | 5/2020 | Chen |
| 10,668,965 | B2 | 6/2020 | Czinger |
| 10,719,939 | B2 | 7/2020 | Holzer |
| 10,725,609 | B2 | 7/2020 | Holzer |
| 10,726,560 | B2 | 7/2020 | Holzer |
| 10,748,313 | B2 | 8/2020 | Holzer |
| 10,750,161 | B2 | 8/2020 | Holzer |
| 10,818,029 | B2 | 10/2020 | Holzer |
| 10,846,913 | B2 | 11/2020 | Holzer |
| 10,852,902 | B2 | 12/2020 | Holzer |
| 11,006,095 | B2 | 5/2021 | Holzer |
| 11,055,534 | B2 | 7/2021 | Beall |
| 2001/0014172 | A1 | 8/2001 | Baba |
| 2002/0024517 | A1 | 2/2002 | Yamaguchi et al. |
| 2002/0094125 | A1 | 7/2002 | Guo |
| 2002/0190991 | A1 | 12/2002 | Efran et al. |
| 2003/0086002 | A1 | 5/2003 | Cahill et al. |
| 2003/0185456 | A1 | 10/2003 | Sato |

(56) References Cited

U.S. PATENT DOCUMENTS

| | | |
|---|---|---|
| 2003/0231179 A1 | 12/2003 | Suzuki |
| 2004/0085335 A1 | 5/2004 | Burlnyk |
| 2004/0104935 A1 | 6/2004 | Williamson et al. |
| 2004/0141014 A1 | 7/2004 | Kamiwada et al. |
| 2004/0184013 A1 | 9/2004 | Raskar et al. |
| 2004/0222987 A1 | 11/2004 | Chang et al. |
| 2004/0239699 A1 | 12/2004 | Uyttendaele |
| 2005/0018045 A1 | 1/2005 | Thomas |
| 2005/0041842 A1 | 2/2005 | Frakes |
| 2005/0046645 A1 | 3/2005 | Breton |
| 2005/0119550 A1 | 6/2005 | Serra |
| 2005/0151759 A1 | 7/2005 | Gonzalez-Banos et al. |
| 2005/0186548 A1 | 8/2005 | Tomlinson |
| 2005/0219264 A1 | 10/2005 | Shum et al. |
| 2005/0226502 A1 | 10/2005 | Cohen et al. |
| 2005/0232467 A1 | 10/2005 | Mohri et al. |
| 2005/0232510 A1 | 10/2005 | Blake |
| 2005/0253877 A1 | 11/2005 | Thompson |
| 2005/0283075 A1 | 12/2005 | Ma |
| 2005/0285874 A1 | 12/2005 | Zitnick et al. |
| 2006/0028552 A1 | 2/2006 | Aggarwal |
| 2006/0188147 A1 | 8/2006 | Rai et al. |
| 2006/0193535 A1 | 8/2006 | Mishima et al. |
| 2006/0250505 A1 | 11/2006 | Gennetten et al. |
| 2006/0256109 A1 | 11/2006 | Acker |
| 2007/0008312 A1 | 1/2007 | Zhou et al. |
| 2007/0058880 A1 | 3/2007 | Lienard |
| 2007/0064802 A1 | 3/2007 | Paniconi |
| 2007/0070069 A1 | 3/2007 | Samarasekera |
| 2007/0110338 A1 | 5/2007 | Snavely et al. |
| 2007/0118801 A1 | 5/2007 | Harshbarger |
| 2007/0126928 A1 | 6/2007 | Klompnhouwer |
| 2007/0159487 A1 | 7/2007 | Felt |
| 2007/0237420 A1 | 10/2007 | Steedly et al. |
| 2007/0237422 A1 | 10/2007 | Zhou et al. |
| 2007/0252804 A1 | 11/2007 | Engel et al. |
| 2008/0025588 A1 | 1/2008 | Zhang |
| 2008/0033641 A1 | 2/2008 | Medalia |
| 2008/0106593 A1 | 5/2008 | Arfvidsson et al. |
| 2008/0151106 A1 | 6/2008 | Verburgh |
| 2008/0152258 A1 | 6/2008 | Tulkki |
| 2008/0198159 A1 | 8/2008 | Liu |
| 2008/0201734 A1 | 8/2008 | Lyon et al. |
| 2008/0225132 A1 | 9/2008 | Inaguma |
| 2008/0246759 A1 | 10/2008 | Summers |
| 2008/0266142 A1 | 10/2008 | Sula |
| 2008/0278569 A1 | 11/2008 | Rotem et al. |
| 2008/0313014 A1 | 12/2008 | Fell et al. |
| 2009/0003725 A1 | 1/2009 | Merkel |
| 2009/0046160 A1 | 2/2009 | Hayashi |
| 2009/0077161 A1 | 3/2009 | Hamilton, II |
| 2009/0087029 A1 | 4/2009 | Coleman |
| 2009/0116732 A1 | 5/2009 | Zhou et al. |
| 2009/0141130 A1 | 6/2009 | Ortiz |
| 2009/0144173 A1 | 6/2009 | Mo et al. |
| 2009/0153549 A1 | 6/2009 | Lynch et al. |
| 2009/0160934 A1 | 6/2009 | Hendrickson et al. |
| 2009/0163185 A1 | 6/2009 | Lim |
| 2009/0174709 A1 | 7/2009 | Kozlak |
| 2009/0208062 A1 | 8/2009 | Sorek |
| 2009/0262074 A1 | 10/2009 | Nasiri et al. |
| 2009/0263045 A1 | 10/2009 | Szeliski et al. |
| 2009/0274391 A1* | 11/2009 | Arcas ............... G06T 15/205 382/285 |
| 2009/0276805 A1 | 11/2009 | Andrews, I et al. |
| 2009/0303343 A1 | 12/2009 | Drimbarean et al. |
| 2010/0007715 A1 | 1/2010 | Lai |
| 2010/0017181 A1 | 1/2010 | Mouton |
| 2010/0026788 A1 | 2/2010 | Ishikawa |
| 2010/0033553 A1 | 2/2010 | Levy |
| 2010/0060793 A1 | 3/2010 | Oz |
| 2010/0079667 A1 | 4/2010 | Türetken et al. |
| 2010/0098258 A1 | 4/2010 | Thorn |
| 2010/0100492 A1 | 4/2010 | Law |
| 2010/0110069 A1 | 5/2010 | Yuan |
| 2010/0111444 A1 | 5/2010 | Coffman |
| 2010/0164990 A1 | 7/2010 | Van Doorn |
| 2010/0171691 A1 | 7/2010 | Cook et al. |
| 2010/0188584 A1 | 7/2010 | Liu et al. |
| 2010/0215251 A1 | 8/2010 | Gunnewiek et al. |
| 2010/0225743 A1 | 9/2010 | Florencio et al. |
| 2010/0231593 A1 | 9/2010 | Zhou |
| 2010/0259595 A1 | 10/2010 | Trimeche et al. |
| 2010/0266172 A1 | 10/2010 | Shlomi |
| 2010/0305857 A1 | 12/2010 | Byrne et al. |
| 2010/0315412 A1 | 12/2010 | Sinha et al. |
| 2010/0329542 A1 | 12/2010 | Ramalingam |
| 2011/0007072 A1 | 1/2011 | Khan et al. |
| 2011/0033170 A1 | 2/2011 | Ikeda |
| 2011/0034103 A1 | 2/2011 | Fong |
| 2011/0040539 A1 | 2/2011 | Szymczyk et al. |
| 2011/0043604 A1 | 2/2011 | Peleg et al. |
| 2011/0064388 A1 | 3/2011 | Brown |
| 2011/0074926 A1 | 3/2011 | Khan |
| 2011/0090344 A1 | 4/2011 | Gefen |
| 2011/0105192 A1 | 5/2011 | Jung |
| 2011/0109618 A1 | 5/2011 | Nowak |
| 2011/0109726 A1 | 5/2011 | Hwang |
| 2011/0115886 A1 | 5/2011 | Nguyen |
| 2011/0141141 A1 | 6/2011 | Kankainen |
| 2011/0141227 A1 | 6/2011 | Bigioi et al. |
| 2011/0142289 A1 | 6/2011 | Barenbrug et al. |
| 2011/0142343 A1 | 6/2011 | Kim |
| 2011/0170789 A1 | 7/2011 | Amon et al. |
| 2011/0173565 A1 | 7/2011 | Ofek |
| 2011/0179373 A1 | 7/2011 | Moore et al. |
| 2011/0193941 A1 | 8/2011 | Inaba et al. |
| 2011/0214072 A1 | 9/2011 | Lindemann et al. |
| 2011/0234750 A1 | 9/2011 | Lai |
| 2011/0248987 A1 | 10/2011 | Mitchell |
| 2011/0254835 A1 | 10/2011 | Segal |
| 2011/0261050 A1 | 10/2011 | Smolic et al. |
| 2011/0288858 A1 | 11/2011 | Gay |
| 2011/0313653 A1 | 12/2011 | Lindner |
| 2011/0316963 A1 | 12/2011 | Li |
| 2012/0007713 A1 | 1/2012 | Nasiri et al. |
| 2012/0013711 A1 | 1/2012 | Tamir et al. |
| 2012/0017147 A1 | 1/2012 | Mark |
| 2012/0019557 A1 | 1/2012 | Aronsson et al. |
| 2012/0028706 A1 | 2/2012 | Raitt et al. |
| 2012/0041722 A1 | 2/2012 | Quan et al. |
| 2012/0057006 A1 | 3/2012 | Joseph |
| 2012/0062756 A1 | 3/2012 | Tian |
| 2012/0075411 A1 | 3/2012 | Matsumoto |
| 2012/0092348 A1 | 4/2012 | McCutchen |
| 2012/0095323 A1 | 4/2012 | Eskandari |
| 2012/0099804 A1 | 4/2012 | Aguilera |
| 2012/0127172 A1 | 5/2012 | Wu et al. |
| 2012/0127270 A1 | 5/2012 | Zhang et al. |
| 2012/0139918 A1 | 6/2012 | Michail et al. |
| 2012/0147224 A1 | 6/2012 | Takayama |
| 2012/0148162 A1 | 6/2012 | Zhang et al. |
| 2012/0162223 A1 | 6/2012 | Hirai et al. |
| 2012/0162253 A1 | 6/2012 | Collins |
| 2012/0167146 A1 | 6/2012 | Incorvia |
| 2012/0198317 A1 | 8/2012 | Eppolito |
| 2012/0207308 A1 | 8/2012 | Sung |
| 2012/0212579 A1 | 8/2012 | Fröjdh et al. |
| 2012/0236201 A1 | 9/2012 | Larsen |
| 2012/0240035 A1 | 9/2012 | Gaucas et al. |
| 2012/0242798 A1* | 9/2012 | Mcardle ............ H04N 21/4312 348/46 |
| 2012/0257025 A1 | 10/2012 | Kim |
| 2012/0257065 A1 | 10/2012 | Velarde et al. |
| 2012/0258436 A1 | 10/2012 | Lee |
| 2012/0262580 A1 | 10/2012 | Huebner |
| 2012/0287123 A1* | 11/2012 | Starner ................ G06F 1/163 345/419 |
| 2012/0293632 A1 | 11/2012 | Yukich |
| 2012/0294549 A1 | 11/2012 | Doepke |
| 2012/0300019 A1 | 11/2012 | Yang |
| 2012/0301044 A1 | 11/2012 | Nakada |
| 2012/0314027 A1 | 12/2012 | Tian |
| 2012/0314040 A1 | 12/2012 | Kopf et al. |

(56) References Cited

U.S. PATENT DOCUMENTS

| | | |
|---|---|---|
| 2012/0314899 A1 | 12/2012 | Cohen et al. |
| 2013/0002649 A1 | 1/2013 | Wu et al. |
| 2013/0016102 A1 | 1/2013 | Look |
| 2013/0016897 A1 | 1/2013 | Cho et al. |
| 2013/0018881 A1 | 1/2013 | Bhatt |
| 2013/0044191 A1 | 2/2013 | Matsumoto |
| 2013/0050573 A1 | 2/2013 | Syed |
| 2013/0057644 A1 | 3/2013 | Stefanoski et al. |
| 2013/0063549 A1 | 3/2013 | Schnyder et al. |
| 2013/0071012 A1 | 3/2013 | Leichsenring |
| 2013/0076619 A1 | 3/2013 | Carr et al. |
| 2013/0113830 A1 | 5/2013 | Suzuki |
| 2013/0120581 A1 | 5/2013 | Daniels |
| 2013/0127844 A1 | 5/2013 | Koeppel |
| 2013/0127847 A1 | 5/2013 | Jin |
| 2013/0129304 A1 | 5/2013 | Feinson |
| 2013/0141530 A1 | 6/2013 | Zavesky |
| 2013/0147795 A1 | 6/2013 | Kim et al. |
| 2013/0147905 A1 | 6/2013 | Vivekanandan |
| 2013/0154926 A1 | 6/2013 | Kim et al. |
| 2013/0155180 A1 | 6/2013 | Wantland et al. |
| 2013/0162634 A1 | 6/2013 | Baik |
| 2013/0162787 A1 | 6/2013 | Cho |
| 2013/0176392 A1 | 7/2013 | Carr et al. |
| 2013/0195350 A1 | 8/2013 | Tanaka et al. |
| 2013/0204411 A1 | 8/2013 | Clark et al. |
| 2013/0208900 A1 | 8/2013 | Vincent |
| 2013/0212538 A1 | 8/2013 | Lemire |
| 2013/0219357 A1 | 8/2013 | Reitan |
| 2013/0240628 A1 | 9/2013 | Van Der Merwe |
| 2013/0250045 A1 | 9/2013 | Ki et al. |
| 2013/0271566 A1 | 10/2013 | Chen et al. |
| 2013/0278596 A1 | 10/2013 | Wu et al. |
| 2013/0314442 A1 | 11/2013 | Langlotz et al. |
| 2014/0002440 A1 | 1/2014 | Lynch |
| 2014/0002472 A1 | 1/2014 | Sobeski |
| 2014/0009462 A1 | 1/2014 | McNamer et al. |
| 2014/0013414 A1 | 1/2014 | Bruck |
| 2014/0023341 A1 | 1/2014 | Wang |
| 2014/0037198 A1 | 2/2014 | Larlus-Larrondo et al. |
| 2014/0040742 A1 | 2/2014 | Hyekyung |
| 2014/0049607 A1 | 2/2014 | Amon et al. |
| 2014/0059674 A1 | 2/2014 | Sun et al. |
| 2014/0063005 A1 | 3/2014 | Ahn et al. |
| 2014/0078136 A1 | 3/2014 | Sohn et al. |
| 2014/0087877 A1 | 3/2014 | Krishnan |
| 2014/0092259 A1 | 4/2014 | Tsang |
| 2014/0100995 A1 | 4/2014 | Koshy |
| 2014/0107888 A1 | 4/2014 | Quast |
| 2014/0118479 A1 | 5/2014 | Rapoport |
| 2014/0118483 A1 | 5/2014 | Rapoport |
| 2014/0118494 A1 | 5/2014 | Wu et al. |
| 2014/0125659 A1 | 5/2014 | Yoshida |
| 2014/0132594 A1 | 5/2014 | Gharpure |
| 2014/0152834 A1 | 6/2014 | Kosseifi |
| 2014/0153832 A1 | 6/2014 | Kwatra et al. |
| 2014/0177927 A1 | 6/2014 | Shieh |
| 2014/0192155 A1 | 7/2014 | Choi et al. |
| 2014/0198184 A1 | 7/2014 | Stein et al. |
| 2014/0199050 A1 | 7/2014 | Khalsa |
| 2014/0211989 A1 | 7/2014 | Ding et al. |
| 2014/0225930 A1 | 8/2014 | Durmek |
| 2014/0232634 A1 | 8/2014 | Piemonte |
| 2014/0253436 A1 | 9/2014 | Petersen |
| 2014/0253746 A1 | 9/2014 | Voss et al. |
| 2014/0267616 A1 | 9/2014 | Krig |
| 2014/0275704 A1 | 9/2014 | Zhang |
| 2014/0286566 A1 | 9/2014 | Rhoads |
| 2014/0293004 A1 | 10/2014 | Tsubaki |
| 2014/0293028 A1 | 10/2014 | Nguyen et al. |
| 2014/0297798 A1 | 10/2014 | Bakalash |
| 2014/0307045 A1 | 10/2014 | Richardt et al. |
| 2014/0340404 A1 | 11/2014 | Wang et al. |
| 2014/0362198 A1 | 12/2014 | Nakayama |
| 2014/0365888 A1 | 12/2014 | Curzon |
| 2014/0375684 A1 | 12/2014 | Algreatly |
| 2015/0009130 A1 | 1/2015 | Motta |
| 2015/0010218 A1 | 1/2015 | Bayer |
| 2015/0016714 A1 | 1/2015 | Chui |
| 2015/0042812 A1 | 2/2015 | Tang |
| 2015/0046875 A1 | 2/2015 | Xu |
| 2015/0078449 A1 | 3/2015 | Diggins |
| 2015/0097961 A1 | 4/2015 | Ure |
| 2015/0103170 A1 | 4/2015 | Nelson |
| 2015/0103197 A1 | 4/2015 | Djordjevic |
| 2015/0073570 A1 | 5/2015 | Gonzalez-Mendoza et al. |
| 2015/0130799 A1 | 5/2015 | Holzer et al. |
| 2015/0130800 A1 | 5/2015 | Holzer et al. |
| 2015/0130894 A1 | 5/2015 | Holzer et al. |
| 2015/0134651 A1 | 5/2015 | Holzer et al. |
| 2015/0138190 A1 | 5/2015 | Holzer et al. |
| 2015/0143239 A1 | 5/2015 | Birkbeck |
| 2015/0154442 A1 | 6/2015 | Takahashi |
| 2015/0188967 A1 | 7/2015 | Paulauskas |
| 2015/0193963 A1 | 7/2015 | Chen et al. |
| 2015/0198443 A1 | 7/2015 | Yi et al. |
| 2015/0201176 A1 | 7/2015 | Graziosi |
| 2015/0206341 A1 | 7/2015 | Loper |
| 2015/0222880 A1 | 8/2015 | Choi |
| 2015/0227285 A1 | 8/2015 | Lee et al. |
| 2015/0227816 A1 | 8/2015 | Du et al. |
| 2015/0235408 A1 | 8/2015 | Gross et al. |
| 2015/0242686 A1 | 8/2015 | Lenka |
| 2015/0254224 A1 | 9/2015 | Kim |
| 2015/0269772 A1 | 9/2015 | Ha et al. |
| 2015/0271356 A1 | 9/2015 | Terada |
| 2015/0281323 A1 | 10/2015 | Gold |
| 2015/0294492 A1 | 10/2015 | Koch et al. |
| 2015/0309695 A1 | 10/2015 | Sannandeji |
| 2015/0318020 A1 | 11/2015 | Pribula |
| 2015/0319424 A1 | 11/2015 | Haimovitch-Yogev et al. |
| 2015/0324649 A1 | 11/2015 | Grewe |
| 2015/0339846 A1 | 11/2015 | Holzer et al. |
| 2015/0371440 A1 | 12/2015 | Pirchheim et al. |
| 2015/0379763 A1 | 12/2015 | Liktor et al. |
| 2016/0001137 A1 | 1/2016 | Phillips |
| 2016/0026253 A1 | 1/2016 | Bradski |
| 2016/0027209 A1 | 1/2016 | Demirli |
| 2016/0034459 A1 | 2/2016 | Larsen et al. |
| 2016/0042251 A1 | 2/2016 | Cordova-Diba |
| 2016/0044240 A1 | 2/2016 | Beers |
| 2016/0050368 A1 | 2/2016 | Seo et al. |
| 2016/0055330 A1 | 2/2016 | Morishita et al. |
| 2016/0061582 A1 | 3/2016 | Lucey |
| 2016/0063740 A1 | 3/2016 | Sakimoto |
| 2016/0077422 A1 | 3/2016 | Wang |
| 2016/0078287 A1 | 3/2016 | Auge et al. |
| 2016/0080684 A1 | 3/2016 | Farrell |
| 2016/0080830 A1 | 3/2016 | Kim |
| 2016/0086381 A1 | 3/2016 | Jung et al. |
| 2016/0088287 A1 | 3/2016 | Sadi |
| 2016/0110913 A1 | 4/2016 | Kosoy |
| 2016/0139794 A1 | 5/2016 | Hammendorp |
| 2016/0140125 A1 | 5/2016 | Goyal et al. |
| 2016/0171330 A1 | 6/2016 | Mentese |
| 2016/0189334 A1 | 6/2016 | Mason |
| 2016/0191895 A1 | 6/2016 | Yun |
| 2016/0203586 A1 | 7/2016 | Chang |
| 2016/0205341 A1 | 7/2016 | Hollander |
| 2016/0210602 A1 | 7/2016 | Siddique |
| 2016/0261855 A1 | 9/2016 | Park |
| 2016/0267676 A1 | 9/2016 | Setomoto |
| 2016/0275283 A1 | 9/2016 | Leon |
| 2016/0295127 A1 | 10/2016 | Yu |
| 2016/0350930 A1 | 12/2016 | Lin et al. |
| 2016/0350975 A1 | 12/2016 | Nakagawa |
| 2016/0353089 A1 | 12/2016 | Gallup et al. |
| 2016/0358337 A1 | 12/2016 | Dai et al. |
| 2016/0379415 A1 | 12/2016 | Espeset |
| 2017/0018054 A1 | 1/2017 | Holzer et al. |
| 2017/0018055 A1 | 1/2017 | Holzer et al. |
| 2017/0018056 A1 | 1/2017 | Holzer et al. |
| 2017/0024094 A1 | 1/2017 | Gresham |
| 2017/0026574 A1 | 1/2017 | Kwon |

(56) References Cited

U.S. PATENT DOCUMENTS

| | | |
|---|---|---|
| 2017/0053169 A1 | 2/2017 | Cuban |
| 2017/0067739 A1 | 3/2017 | Siercks |
| 2017/0084001 A1 | 3/2017 | Holzer et al. |
| 2017/0084293 A1 | 3/2017 | Holzer |
| 2017/0087415 A1 | 3/2017 | Nandimandalam |
| 2017/0103510 A1 | 4/2017 | Wang |
| 2017/0103584 A1 | 4/2017 | Vats |
| 2017/0109930 A1 | 4/2017 | Holzer |
| 2017/0124769 A1 | 5/2017 | Saito |
| 2017/0124770 A1 | 5/2017 | Vats |
| 2017/0126988 A1 | 5/2017 | Holzer et al. |
| 2017/0140236 A1 | 5/2017 | Price et al. |
| 2017/0148179 A1 | 5/2017 | Holzer et al. |
| 2017/0148186 A1 | 5/2017 | Holzer et al. |
| 2017/0148199 A1 | 5/2017 | Holzer et al. |
| 2017/0148222 A1 | 5/2017 | Holzer et al. |
| 2017/0148223 A1 | 5/2017 | Holzer et al. |
| 2017/0158131 A1 | 6/2017 | Friebe |
| 2017/0206648 A1 | 7/2017 | Marra |
| 2017/0213385 A1 | 7/2017 | Yu |
| 2017/0231550 A1 | 8/2017 | Do et al. |
| 2017/0236287 A1 | 8/2017 | Shen et al. |
| 2017/0249339 A1 | 8/2017 | Lester |
| 2017/0255648 A1 | 9/2017 | Dube |
| 2017/0256066 A1 | 9/2017 | Richard |
| 2017/0277363 A1 | 9/2017 | Holzer et al. |
| 2017/0277952 A1 | 9/2017 | Thommes |
| 2017/0278544 A1 | 9/2017 | Choi |
| 2017/0287137 A1 | 10/2017 | Lin et al. |
| 2017/0293894 A1 | 10/2017 | Taliwal |
| 2017/0308771 A1 | 10/2017 | Shimauchi |
| 2017/0330319 A1 | 11/2017 | Xu et al. |
| 2017/0337693 A1 | 11/2017 | Baruch |
| 2017/0344223 A1 | 11/2017 | Holzer et al. |
| 2017/0344808 A1 | 11/2017 | El-Khamy et al. |
| 2017/0357910 A1 | 12/2017 | Sommer |
| 2017/0359570 A1 | 12/2017 | Holzer et al. |
| 2017/0364766 A1 | 12/2017 | Das et al. |
| 2018/0012330 A1 | 1/2018 | Holzer et al. |
| 2018/0012529 A1 | 1/2018 | Chiba |
| 2018/0035105 A1 | 2/2018 | Choi |
| 2018/0035500 A1 | 2/2018 | Song et al. |
| 2018/0045592 A1 | 2/2018 | Okita |
| 2018/0046356 A1 | 2/2018 | Holzer et al. |
| 2018/0046357 A1 | 2/2018 | Holzer et al. |
| 2018/0046649 A1 | 2/2018 | Dal Mutto |
| 2018/0052665 A1 | 3/2018 | Kaur et al. |
| 2018/0063504 A1 | 3/2018 | Haines |
| 2018/0082715 A1 | 3/2018 | Rymkowski |
| 2018/0143023 A1 | 5/2018 | Bjorke |
| 2018/0143756 A1 | 5/2018 | Mildrew |
| 2018/0144547 A1 | 5/2018 | Shakib |
| 2018/0155057 A1 | 6/2018 | Irish |
| 2018/0158197 A1 | 6/2018 | Dasgupta |
| 2018/0165875 A1 | 6/2018 | Yu |
| 2018/0199025 A1 | 7/2018 | Holzer |
| 2018/0203877 A1 | 7/2018 | Holzer |
| 2018/0205941 A1 | 7/2018 | Kopf |
| 2018/0211131 A1 | 7/2018 | Holzer et al. |
| 2018/0211404 A1 | 7/2018 | Zhu |
| 2018/0218235 A1 | 8/2018 | Holzer et al. |
| 2018/0218236 A1 | 8/2018 | Holzer et al. |
| 2018/0234671 A1 | 8/2018 | Yang |
| 2018/0240243 A1 | 8/2018 | Kim |
| 2018/0255290 A1 | 9/2018 | Holzer et al. |
| 2018/0286098 A1 | 10/2018 | Lorenzo |
| 2018/0293774 A1 | 10/2018 | Yu |
| 2018/0315200 A1 | 11/2018 | Davydov |
| 2018/0336724 A1 | 11/2018 | Spring |
| 2018/0336737 A1 | 11/2018 | Varady |
| 2018/0338126 A1 | 11/2018 | Trevor |
| 2018/0338128 A1 | 11/2018 | Trevor |
| 2018/0357518 A1 | 12/2018 | Sekii |
| 2018/0374273 A1 | 12/2018 | Holzer |
| 2019/0019056 A1 | 1/2019 | Pierce et al. |
| 2019/0025544 A1 | 1/2019 | Watanabe |
| 2019/0026956 A1 | 1/2019 | Gausebeck |
| 2019/0035149 A1 | 1/2019 | Chen |
| 2019/0050664 A1 | 2/2019 | Yang |
| 2019/0080499 A1 | 3/2019 | Holzer et al. |
| 2019/0094981 A1 | 3/2019 | Bradski |
| 2019/0147221 A1 | 5/2019 | Grabner |
| 2019/0209886 A1 | 7/2019 | Harlow |
| 2019/0220991 A1 | 7/2019 | Holzer et al. |
| 2019/0221021 A1 | 7/2019 | Holzer et al. |
| 2019/0235729 A1 | 8/2019 | Day |
| 2019/0244372 A1 | 8/2019 | Holzer et al. |
| 2019/0251738 A1 | 8/2019 | Holzer et al. |
| 2019/0278434 A1 | 9/2019 | Holzer |
| 2019/0304064 A1 | 10/2019 | Zhang |
| 2019/0213392 A1 | 11/2019 | Pan et al. |
| 2019/0364265 A1 | 11/2019 | Matsunobu |
| 2020/0027263 A1 | 1/2020 | Holzer |
| 2020/0045249 A1 | 2/2020 | Francois |
| 2020/0137380 A1 | 4/2020 | Supikov |
| 2020/0167570 A1 | 5/2020 | Beall |
| 2020/0234397 A1 | 7/2020 | Holzer |
| 2020/0234451 A1 | 7/2020 | Holzer |

FOREIGN PATENT DOCUMENTS

| | | |
|---|---|---|
| DE | 112014005165 | 7/2016 |
| DE | 112017004150 | 6/2019 |
| GB | 2534821 A | 8/2016 |
| KR | 20120110861 | 10/2012 |
| KR | 101590256 B1 | 2/2016 |
| WO | 2015073570 A2 | 5/2015 |
| WO | 2017053197 A1 | 3/2017 |
| WO | 2018035500 A1 | 2/2018 |
| WO | 2018052665 A1 | 3/2018 |
| WO | 2018154331 A1 | 8/2018 |
| WO | 2019209886 | 10/2019 |
| WO | 2020092177 A2 | 5/2020 |

OTHER PUBLICATIONS

P.H.S., et al., Robust Parameterization and Computation of the Trifocal Tensor, Elsevier, Image and Vision Computing, vol. 15, Issue 8, 591-605 pgs.

Pollard, Stephen, et al., Automatically Synthesising Virtual Viewpoints by Trinocular Image Interpolation—Detailed Report, HP, Technical Report, HP Laboratories Bristol HPL-97-166, 40 pgs.

Pollard, Stephen, et al., Automatically Synthesising Virtual Viewpoints by Trinooular Image Interpolation—Detailed Report, 40 pgs.

Prisacariu, Victor Adrian., et al., Simultaneous 3D Tracking and Reconstruction on a Mobile Phone, IEEE International Symposium on Mixed and Augmented Reality, 10 pgs.

Saito, Hideo, et al., View Interpolation of Multiple Cameras Based on Projective Geometry, Department of Information and Computer Science, Keio University and Presto, Japan Science and Technology Corporation (JST), retrieved from the Internet.

Saito, Hideo, et al.,View Interpolation of Multiple Cameras Based on Projective Geometry, 6 pgs.

Schiller, Ingo, et al., Datastructure for Capturing Dynamic Scenes with a Time-of-Flight Camera, 16 pgs.

Schiller, Ingo, et al., Datastructure for Capturing Dynamic Scenes with a Time-of-Flight Camera, Springer-Verlad, Dyna3D 2009, LNCS 5742, 42-57 pgs.

Seitz, Steven Maxwell., Image-Based Transformation of Viewpoint and Scene Appearance, A Dissertation submitted in partial fulfillment of the requirements for the Degree of Doctor of Philosophy at the University of Wisconsin; retrieved from the Internet , p. 111.

Seitz, Steven Maxwell., Image-Based Transformation of Viewpoint and Scene Appearance, A Dissertation submitted in partial fulfillment of the requirements for the Degree of Doctor of Philosophy at the University of Wisconsin; retrieved from the Internet.

Shade, Jonathan, et al., Layered Depth Images, 231-242 pgs.

Shade, Jonathan, et al., Layered Depth Images, Proceedings of the 25th Annual Conference on Computer Graphics and Interactive Techniques, 231-242 pgs.

(56) References Cited

OTHER PUBLICATIONS

Shin, Hong-Chang, et al., Fast View Synthesis using GPU for 3D Display, IEEE Transactions on Consumer Electronics, vol. 54, No. 4, 2068-2076 pgs.

Snavely, Noah, et al., Photo Tourism: Exploring Phot Collections in 3D, 12 pgs.

Snavely, Noah, et al., Photo Tourism: Exploring Phot Collections in 3D,ACM, ACM Transactions on Graphics (TOG)—Proceeding of ACM SIGGRAPH 2006, vol. 25, Issue 3, 835-846 pgs.

Steder, Bastian, et al., Robust On-line Model-based Object Detection from Range Images, 6 pgs.

Steder, Bastian, et al., Robust On-line Model-based Object Detection from Range Images,International Conference on Intelligent Robots and Systems, 6 pgs.

Thyssen, Anthony, ImageMagick v6 Examples—Color Basics and Channels, 37 pgs.

Thyssen, Anthony, ImageMagick v6 Examples—Color Basics and Channels, Website http://www.imagemagick.org/Usage/color_basics/.

Torr, P.H.S., et al., Robust Parameterization and Computation of the Trifocal Tensor, Elsevier, Image and Vision Computing, vol. 15, Issue 8, 591-605 pgs.

United Kingdom Application Serial No. 1609577.0, Office Action dated Jun. 15, 2016, 1 pg.

United Kingdom Application Serial No. 1609577.0, Office Action dated Jun. 15, 166, 1 pgs.

Weigel, Christian, et al., Advanced 3D Video Object Synthesis Based on Trilinear Tensors, IEEE Tenth International Symposium on Consumer Electronics.

Xiao, Jiangjian, et al., Tri-view Morphing, Elsevier, Computer Vision and Image Understanding, vol. 96, Issue 3, 22 pgs.

Zhang, Guofeng, et al., Video stabilization based on a 3D perspective camera model, 997 pgs.

Zhang, Guofeng, et al., Video stabilization based on a 3D perspective camera model, Springer, The Visual Computer (2009) 25, 997 pg.

Zhang, Zhengyou, et al., A robust technique for matching two uncalibrated images through the recovery of the unknown epipolar geometry, Elsevier, Artificial Intelligence 78, 87-119 pgs.

Zheng, et al., Conditional Random Fields as Recurrent Neural Networks, IEEE International Conference on Computer Vision, 1529-1537 pgs.

U.S. Appl. No. 15/724,081, Non Final Office Action dated Dec. 11, 2018, 12 pgs.

U.S. Appl. No. 15/724,081, Notice of Allowance dated Aug. 20, 2019, 12 pgs.

U.S. Appl. No. 15/724,087, Final Office Action dated Jul. 1, 2019, 16 pgs.

U.S. Appl. No. 15/724,087, Non Final Office Action dated Jan. 31, 2019, 15 pgs.

U.S. Appl. No. 16/384,578, Corrected Notice of Allowance dated Nov. 26, 2019, 2 pgs.

U.S. Appl. No. 16/384,578, Non Final Office Action dated May 9, 2019, 9 pgs.

U.S. Appl. No. 14/800,638, Advisory Action dated May 9, 2017, 5 pgs.

Ballan, Luca, et al.,Unstructured Video-Based Rendering: Interactive Exploration of Casually Captured Videos, ACM, ACM Transactions on Graphics (TOG)—Proceedings of ACM SIGGRAPH 2010.

Buehler, Chris, et al., Unstructured Lumigraph Rendering, ACM, ACM SIGGRAPH 2001, pp. 425-432

Buehler, Chris, et al.,Unstructured Lumigraph Rendering, ACM, ACM SIGGRAPH, 8 pgs.

Cao, Xun, et al., Semi-Automatic 2D-to-3D Conversion Using Disparity Propagation, 1 pg.

Cao, Xun, et al., Semi-Automatic 2D-to-3D Conversion Using Disparity Propagation, IEEE, IEEE Transactions on Broadcasting, 491-499 pgs.

Cao, Xun, et al.,Semi-Automatio 2D-to-3D Conversion Using Disparity Propagation, IEEE, IEEE Transactions on Broadcasting, 491-199 pgs.

Chan, Shing-Chow, et al., An Object-Based Approach to Image/Video-Based Synthesis and Processing for 3-D and Multiview Televisions, IEEE, IEEE Transactions on Circuits and Systems for Video Technology, vol. 19, Issue 6, 821-831 pgs.

Chan, Shing-Chow, et al., An Object-Based Approach to Image/Video-Based Synthesis and Processing for 3-D and Multiview Televisions, 821-831 pgs.

Chen, Shenchang Eric., QuickTime VR—An Image-Based Approach to Virtual Environment Navigation, 10 pgs.

Chen, Shenchang Eric., QuickTime VR—An Image-Based Approach to Virtual Environment Navigation, ACM, SIGGRAPH '95 Proceedings of the 22nd annual conference on Computer graphics and interactive techniques, 29-38 pgs.

Clare, Adam, Reality is a Game; What is Skybox?, 5 pgs.

Clare, Adam, Reality is a Game; What is Skybox?, retrieved from the Internet.

Davis, Abe, et al., Unstructured Light Fields, Blackwell Publishing, Computer Graphics Forum, vol. 31, Issue 2, Pt. 1, 10pgs.

Extract all frames from video files, Video Help Forum, Oct. 2010. Extract all frames from video files, Video Help Forum.

Figueroa, Nadia, et al., From Sense to Print: Towards Automatic 3D Printing from 3D Sensing Devices.

Figueroa, Nadia, et al., From Sense to Print: Towards Automatic 3D Printing from 3D Sensing Devices, IEEE, 2013 IEEE International Conference on Systems, Man, and Cybernetics (SMC).

Fischler, Martin A.., et al., Random Sample Consensus: A Paradigm for Model Fitting with Applications to Image Analysis and Automated Cartography.

Fischler, Martin A.., et al., Random Sample Consensus: A Paradigm for Model Fitting with Applications to Image Analysis and Automated Cartography, ACM, Communications of the ACM, vol. 24, No. 6, 381-395 pgs.

Fitzgibbon, Andrew, Automatic 3D Model Acquisition and Generation of New Images from Video Sequences, IEEE, 9th European Signal Processing Conference, 8 pgs.

Fusiello, Andrea, et al., View Synthesis from Uncalibrated Images Using Parallax, Proceedings of the 12th International Conference on Image Analysis and Processing, 146-151 pgs.

Fusiello, Andrea, Extract all frames from video files, IEEE Transactions on Circuits and Systems for Video Technology, vol. 17, No. 5.

Gibson, Simon, et al., Accurate Camera Calibration for Off-line, Video-Based Augmented Reality, IEEE, Proceedings of the International Symposium on Mixed and Augmented Reality (ISMAR'02).

Golovinskly, Aleksey, et al., Shape-based Recognition of 3D Point Clouds in Urban Environment, 8 pgs.

Golovinskly, Aleksey, et al., Shape-based Recognition of 3D Point Clouds in Urban Environment, IEEE, IEEE 12th International Conference on Computer Vision (ICCV), 8 pgs.

Gurdan, Tobias, et al., Spatial and Temporal Interpolation of Multi-View Image Sequences, 12 pgs.

Gurdan, Tobias, et al., Spatial and Temporal Interpolation of Multi-View Image Sequences, Department of Computer Science, Technische Universität München Ascending Technologies GmbH, Krailing, Germany, Section 2.3, Image Warping and Blending; Retrieved from the Internet.

International Application Serial No. PCT/US2016/042355, Search Report and Written Opinion dated Oct. 19, 2016, 9 pgs.

Int'l Application Serial No. PCT/US17/47684, Int'l Preliminary Report on Patentability dated Feb. 28, 2019, 7 pgs.

Int'l Application Serial No. PCT/US17/47684, Int'l Search Report and Written Opinion dated Oct. 27, 2017, 8 pgs.

Int'l Application Serial No. PCT/US17/47859, Int'l Preliminary Report on Patentability dated Feb. 28, 2019, 7 pgs.

Int'l Application Serial No. PCT/US17/47859, Int'l Search Report and Written Opinion dated Nov. 2, 2017, 8 pgs.

Int'l Application Serial No. PCT/US19/30395, Int'l Search Report and Written Opinion dated Sep. 2, 2019, 11 pgs.

Int'l Application Serial No. PCT/US2014/065282, Search Report & Written Opinion dated Feb. 23, 2015, 9 pgs.

(56) References Cited

OTHER PUBLICATIONS

Keller, Maik, et al., Real-Time 3D Reconstruction in Dynamic Scenes Using Point-Based Fusion.
Keller, Maik, et al., Real-Time 3D Reconstruction in Dynamic Scenes Using Point-Based Fusion, IEEE, 2013 International Conference on 3DTV.
Klappstein, Jens, et al., Moving Object Segmentation Using Optical Flow and Depth Information, Springer, In: Wada T., Huang F., Lin S. (eds) Advances in Image and Video Technology. PSIVT 2009. LectureNotes in Computer Science, vol. 5414, 611-623 pgs.
Kottamasu, V. L. PhaniKumar., User Interaction of One-Dimensional Panoramic Images for iPod Touch.
Kottamasu, V. L. PhaniKumar., User Interaction of One-Dimensional Panoramic Images for iPod Touch,Thesis, Linkoping University Electronic Press.
Mian, Ajmal S., et al., Three-Dimensional Model-Based Object Recognition and Segmentation in Clutterd Scenes, 18 pgs.
Mian, Ajmal S., et al., Three-Dimensional Model-Based Object Recognition and Segmentation in Clutterd Scenes, IEEE Transactions on Pattern Analysis and Machine Intelligence, col. 28, No. 10, 10pgs.
Mian, Ajmal S., et al., Three-Dimensional Model-Based Object Recognition and Segmentation in Clutterd Scenes, IEEE Transactions on Pattern Analysis and Machine Intelligence, col. 28, No. 10, 1584-1601 pgs.
Mikolajczyk, Krystian, et al., A Performance Evaluation of Local Descriptors, IEEE Transactions on Pattern Analysis and Machine Intelligence, vol. 27, No. 10, 1615-1630.
U.S. Appl. No. 15/408,211, Examiner Interview Summary dated Mar. 4, 2019, 3 pgs.
U.S. Appl. No. 15/408,211, Examiner Interview Summary dated Mar. 18, 2019, 2 pgs.
U.S. Appl. No. 15/408,211, Examiner Interview Summary dated Apr. 3, 2019, 3 pgs.
U.S. Appl. No. 15/408,211, Examiner Interview Summary dated Aug. 5, 2019, 3 pgs.
U.S. Appl. No. 15/408,211, Examiner Interview Summary dated Oct. 16, 2019, 2 pgs.
U.S. Appl. No. 15/408,211, Examiner Interview Summary dated Dec. 5, 2018, 3 pgs.
U.S. Appl. No. 15/408,211, Final Office Action dated Jan. 11, 2019, 23 pgs.
U.S. Appl. No. 15/408,211, Non Final Office Action dated Aug. 6, 2018, 22 pgs.
U.S. Appl. No. 15/408,211, Non Final Office Action dated May 2, 2019, 20 pgs.
U.S. Appl. No. 15/425,983, Advisory Action dated Oct. 12, 2018, 5 pgs.
U.S. Appl. No. 15/425,983, Examiner Interview Summary dated May 3, 2018, 3 pgs.
U.S. Appl. No. 15/425,983, Examiner Interview Summary dated Jun. 5, 2018, 3 pgs.
U.S. Appl. No. 15/425,983, Examiner Interview Summary dated Sep. 28, 2018, 3 pgs.
U.S. Appl. No. 15/425,983, Examiner Interview Summary dated Oct. 12, 2018, 2 pgs.
U.S. Appl. No. 15/425,983, Examiner Interview Summary dated Dec. 12, 2018, 2 pgs.
U.S. Appl. No. 15/425,983, Final Office Action dated Jun. 26, 2018, 29 pgs.
U.S. Appl. No. 15/425,983, Non Final Office Action dated Jan. 11, 2018, 29 pgs.
U.S. Appl. No. 15/425,983, Notice of Allowance dated Dec. 12, 2018, 14 pgs.
U.S. Appl. No. 15/425,988, Examiner Interview Summary dated Nov. 20, 2018, 3 pgs.
U.S. Appl. No. 15/425,988, Non Final Office Action dated Aug. 10, 2018, 18 pgs.
U.S. Appl. No. 15/425,988, Notice of Allowance dated Dec. 28, 2018, pgs.
U.S. Appl. No. 15/425,988, Notice of Allowance dated Dec. 28, 2018, 8 pgs.
U.S. Appl. No. 15/426,994, Advisory Action dated Dec. 13, 2018, 3 pgs.
U.S. Appl. No. 15/426,994, Examiner Interview Summary dated Jan. 15, 2019, 3 pgs.
U.S. Appl. No. 15/426,994, Final Office Action dated Oct. 10, 2018, 21 pgs.
U.S. Appl. No. 15/426,994, Non Final Office Action dated Apr. 19, 2018, 22 pgs.
U.S. Appl. No. 15/426,994, Non Final Office Action dated Aug. 6, 2019, 22 pgs.
U.S. Appl. No. 15/427,009, Notice of Allowance dated Sep. 6, 2018, 9 pgs.
U.S. Appl. No. 15/428,104, Advisory Action dated Dec. 13, 2018, 3 pgs.
U.S. Appl. No. 15/428,104, Examiner Interview Summary dated Jan. 15, 2019, 3 pgs.
U.S. Appl. No. 15/428,104, Examiner Interview Summary dated Dec. 7, 2018, 3 pgs.
U.S. Appl. No. 15/428,104, Final Office Action dated Oct. 10, 2018, 23 pgs.
U.S. Appl. No. 15/428,104, Non Final Office Action dated Apr. 19, 2018, 21 pgs.
U.S. Appl. No. 15/428,104, Non Final Office Action dated Aug. 6, 2019, 24 pgs.
U.S. Appl. No. 15/620,506, Advisory Action dated Aug. 26, 2019, 2 pgs.
U.S. Appl. No. 15/620,506, Examiner Inteview Summary dated Aug. 26, 2019, 1 pg.
U.S. Appl. No. 15/620,506, Final Office Action dated Jun. 10, 2019, 17 pgs.
U.S. Appl. No. 15/620,506, Non Final Office Action dated Jan. 23, 2019, 13 pgs.
U.S. Appl. No. 15/673,125, Examiner Interview Summary dated Aug. 1, 2019, 3 pgs.
U.S. Appl. No. 15/673,125, Final Office Action dated Jun. 3, 2019, 17 pgs.
U.S. Appl. No. 15/673,125, Non Final Office Action dated Feb. 6, 2019, 17 pgs.
U.S. Appl. No. 15/682,362, Notice of Allowance dated Oct. 22, 2018, 9 pgs.
U.S. Appl. No. 15/713,406, Examiner Interview Summary dated Aug. 2, 2019, 3 pgs.
U.S. Appl. No. 15/713,406, Final Office Action dated Jun. 3, 2019, 21 pgs.
U.S. Appl. No. 15/713,406, Non Final Office Action dated Jan. 30, 2019, 21 pgs.
U.S. Appl. No. 15/724,081, Examiner Interview Summary dated Mar. 4, 2019, 3 pgs.
U.S. Appl. No. 15/724,081, Examiner Interview Summary dated Jul. 30, 2019, 3 pgs.
U.S. Appl. No. 15/724,081, Examiner Interview Summary dated Aug. 20, 2019, 2 pgs.
U.S. Appl. No. 15/724,081, Final Office Action dated May 14, 2019, 14 pgs.
U.S. Appl. No. 16/586,868, USPTO e-Office Action: CTNF—Non-Final Rejection, dated Dec. 20, 2019, 19 pgs.
U.S. Appl. No. 14/800,638, Non Final Office Action dated Jul. 29, 2016, 11 pgs.
U.S. Appl. No. 12/101,883, Examiner Interview Summary dated Oct. 18, 2017, 2 pgs.
U.S. Appl. No. 13/464,588, Non Final Office Action dated Aug. 2, 2019, 14 pgs.
U.S. Appl. No. 14/530,669, Advisory Action dated Aug. 8, 2017, 5 pgs.
U.S. Appl. No. 14/530,669, Examiner Interview Summary dated Apr. 14, 2017, 3 pgs.
U.S. Appl. No. 14/530,669, Examiner Interview Summary dated Aug. 8, 2017, 2 pgs.
U.S. Appl. No. 14/530,669, Final Office Action dated Apr. 20, 2017, 25 pgs.

(56) References Cited

OTHER PUBLICATIONS

U.S. Appl. No. 14/530,669, Non Final Office Action dated Jan. 3, 2017, 26 pgs.
U.S. Appl. No. 14/530,671, Non Final Office Action dated Jan. 3, 2017, 32 pgs.
U.S. Appl. No. 14/539,814, Non Final Office Action dated Dec. 30, 2016, 37 pgs.
U.S. Appl. No. 14/539,889, Non Final Office Action dated Oct. 6, 2016, 14 pgs.
U.S. Appl. No. 14/800,638, Examiner Interview Summary dated May 9, 2017, 2 pgs.
U.S. Appl. No. 14/800,638, Examiner Interview Summary dated Nov. 7, 2016, 3 pgs.
U.S. Appl. No. 14/800,638, Examiner Interview Summary dated Dec. 13, 2017, 1 pg.
U.S. Appl. No. 14/800,638, Final Office Action dated Jan. 20, 2017, 12 pgs.
U.S. Appl. No. 14/800,638, Non Final Office Action dated Jun. 15, 2017, 12 pgs.
U.S. Appl. No. 14/800,638, Notice of Allowance dated Dec. 13, 2017, 9 pgs.
U.S. Appl. No. 14/800,640, Advisory Action dated Jan. 5, 2018, 3 pgs.
U.S. Appl. No. 14/800,640, Advisory Action dated Feb. 8, 2018, 2 pgs.
U.S. Appl. No. 14/800,640, Examiner Interview Summary dated Feb. 8, 2018, 1 pg.
U.S. Appl. No. 14/800,640, Examiner Interview Summary dated Oct. 23, 2018, 3 pgs.
U.S. Appl. No. 14/800,640, Final Office Action dated Oct. 16, 2017, 15 pgs.
U.S. Appl. No. 14/800,640, Non Final Office Action dated Jun. 8, 2017, 14 pgs.
U.S. Appl. No. 14/800,640, Non Inal Office Action dated Jul. 17, 2018, 16 pgs.
U.S. Appl. No. 14/800,640, Notice of Allowance dated Nov. 21, 2018, 7 pgs.
U.S. Appl. No. 14/800,640, Restriction Requirement dated Mar. 3, 2017, 5 pgs.
U.S. Appl. No. 14/800,642, Advisory Action dated Jan. 5, 2018, 3 pgs.
U.S. Appl. No. 14/800,642, Advisory Action dated Feb. 8, 2018, 3 pgs.
U.S. Appl. No. 14/800,642, Examiner Interview Summary dated Feb. 8, 2018, 1 pg.
U.S. Appl. No. 14/800,642, Examiner Interview Summary dated Aug. 6, 2018, 1 pg.
U.S. Appl. No. 14/800,642, Final Office Action dated Oct. 17, 2017, 18 pgs.
U.S. Appl. No. 14/800,642, Non Final Office Action dated May 18, 2017, 17 pgs.
U.S. Appl. No. 14/800,642, Notice of Allowance dated Aug. 6, 2018, 12 pgs.
U.S. Appl. No. 14/819,473, Examiner Interview Summary dated Jul. 11, 2016, 3 pgs.
U.S. Appl. No. 14/819,473, Examiner Interview Summary dated Aug. 17, 2016, 3 pgs.
U.S. Appl. No. 14/819,473, Examiner Interview Summary dated Oct. 14, 2016, 3 pgs.
U.S. Appl. No. 14/819,473, Final Office Action dated Apr. 28, 2016, 45 pgs.
U.S. Appl. No. 14/819,473, Non Final Office Action dated Sep. 1, 2016, 36 pgs.
U.S. Appl. No. 14/819,473, Non Final Office Action dated Oct. 8, 2015, 44 pgs.
U.S. Appl. No. 14/860,983, Advisory Action dated Jan. 23, 2018, 3 pgs.
U.S. Appl. No. 14/860,983, Advisory Action dated Mar. 26, 2019, 2 pgs.
U.S. Appl. No. 14/860,983, Examiner Interview Summary dated Mar. 26, 2019, 2 pgs.
U.S. Appl. No. 14/860,983, Examiner Interview Summary dated Apr. 8, 2019, 3 pgs.
U.S. Appl. No. 14/860,983, Examiner Interview Summary dated Nov. 15, 2018, 3 pgs.
U.S. Appl. No. 14/860,983, Final Office Action dated Jan. 18, 2019, 19 pgs.
U.S. Appl. No. 14/860,983, Final Office Action dated Oct. 18, 2017, 21 pgs.
U.S. Appl. No. 14/860,983, Non Final Office Action dated Jun. 8, 2017, 26 pgs.
U.S. Appl. No. 14/860,983, Non Final Office Action dated Aug. 7, 2018, 22 pgs.
U.S. Appl. No. 15/408,211, Advisory Action dated Mar. 18, 2019, 4 pgs.
U.S. Appl. No. 16/362,547, Non-Final Office Action dated Mar. 23, 2021, 14 pgs.
U.S. Appl. No. 16/726,090, Advisory Action dated Jun. 21, 2021, 3 pgs.
U.S. Appl. No. 16/726,090, Examiner Interview Summary dated Feb. 25, 2021, 3 pgs.
U.S. Appl. No. 16/726,090, Examiner Interview Summary dated Jun. 21, 2021, 1 pg.
U.S. Appl. No. 16/778,981, Corrected Notice of Allowance dated Mar. 31, 2021, 11 pgs.
U.S. Appl. No. 16/778,981, Examiner Interview Summary dated Mar. 31, 2021, 1 pg.
U.S. Appl. No. 16/778,981, Notice of Allowance dated Mar. 9, 2021, 9 pgs.
Belongie, Serge, Jitendra Malik, and Jan Puzicha. "Shape matching and object recognition using shape contexts." IEEE Transactions on Pattern Analysis & Machine Intelligence 4 (2002): 509-522. (Year: 2002).
Bulat et al.; "Human pose estimation via convolutional part heatmap regression," In ECCV, 2016 (Year: 2016).
Gatys et al, "A Neural Algorithm of Artistic Style", Cornell University, arXiv:1508.06576v2 pp. 1-16. (Year: 2015).
Haines, Russell, U.S. Appl. No. 62/380,914, Specification and Drawings, p. 1-24 (Year: 2016).
International Application Serial No. PCT/US19/28807 Preliminary Report on Patentability dated Nov. 5, 209 pgs.
International Application Serial No. PCT/US19/28807 Search Report and Written Opinion dated Oct. 8, 2019, 12 pgs.
International Application Serial No. PCT/US19/30395, Preliminary Report on Patentability dated Nov. 12, 2020, 7 pgs.
International Application Serial No. PCT/US19/58204, Preliminary Report on Patentability dated May 14, 2021, 7 pgs.
International Application Serial No. PCT/US2019/058204, Search Report and Written Opinion dated Apr. 21, 2010 pages.
Li, Mingyang, Byung Hyung Kim, and Anastasius 1. Mourikis. "Real-time motion tracking on a cellphone using inertial sensing and a rolling-shutter camera." 2013 IEEE International Conference on Robotics and Automation. IEEE, 2013. (Year: 2013) 8 pages.
Matsunobu, Tom et al., U.S. Appl. No. 62/457,276, Specification, p. 1-19 (Year: 2017).
Notice of Allowance dated Apr. 20, 2021 for U.S. Appl. No. 15/969,749 (pp. 1-5).
Notice of Allowance dated Jun. 17, 2021 for U.S. Appl. No. 15/604,938 (pp. 1-12).
Notice of Allowance dated May 3, 2021 for U.S. Appl. No. 15/632,709 (pp. 1-9).
Nützi, Gabriel, et al. "Fusion of IMU and vision for absolute scale estimation in monocular SLAM." Journal of intelligent & robotic Systems 61.1-4 (2011): 287-299. (Year: 2011).
Office Action (Final Rejection) dated Apr. 25, 2022 for U.S. Appl. No. 16/813,506 (pp. 1-17).
Office Action (Final Rejection) dated Aug. 20, 2021 for U.S. Appl. No. 16/362,547 (pp. 1-15).
Office Action (Non-Final Rejection) dated Mar. 21, 2022 for U.S. Appl. No. 14/861,019 (pp. 1-32).
Office Action (Non-Final Rejection) dated Mar. 24, 2022 for U.S. Appl. No. 16/362,547 (pp. 1-14).

(56) References Cited

OTHER PUBLICATIONS

Office Action (Non-Final Rejection) dated Apr. 14, 2022 for U.S. Appl. No. 17/338,217 (pp. 1-10).
Office Action (Non-Final Rejection) dated Oct. 14, 2021 for U.S. Appl. No. 15/427,030 (pp. 1-17).
Office Action (Non-Final Rejection) dated Oct. 28, 2021 for U.S. Appl. No. 16/813,506 (pp. 1-19).
Office Action (Non-Final Rejection) dated Nov. 10, 2021 for U.S. Appl. No. 16/389,544 (pp. 1-28).
Office Action (Notice of Allowance and Fees Due (PTOL-85)) dated Sep. 16, 2021 for U.S. Appl. No. 16/179,746 (pp. 1-5).
Office Action (Notice of Allowance and Fees Due (PTOL-85)) dated Sep. 29, 2021 for U.S. Appl. No. 15/717,889 (pp. 1-12).
Office Action (Notice of Allowance and Fees Due (PTOL-85)) dated Sep. 30, 2021 for U.S. Appl. No. 16/179,746 (pp. 1-2).
Office Action (Notice of Allowance and Fees Due (PTOL-85)) dated Oct. 15, 2021 for U.S. Appl. No. 16/179,746 (pp. 1-2).
Office Action dated Apr. 1, 2021 for U.S. Appl. No. 15/427,030 (pp. 1-18).
Office Action dated Apr. 1, 2021 for U.S. Appl. No. 16/389,544 (pp. 1-29).
Office Action dated Apr. 9, 2021 for U.S. Appl. No. 16/554,996 (pp. 1-29).
Office Action dated Jun. 3, 2021 for U.S. Appl. No. 16/179,746 (pp. 1-26).
Office Action dated Mar. 23, 2021 for U.S. Appl. No. 16/362,547 (pp. 1-15).
Qi Pan et al., "Rapid Scene Reconstruction on Mobile Phones from Panoramic Images", Oct. 2011, pp. 55-64 (Year: 2011).
Russell, Bryan C, etal. "LabelMe: a database and web-based tool forimage annotation." International Journal of Computer vision 77.1-3 (2008): 157-173. (Year: 2008).
Supplemental Notice of Allowability dated May 5, 2021 for U.S. Appl. No. 15/969,749 (pp. 1-2).
Utasi, Ákos, and Csaba Benedek. "A multi-view annotation tool for people detection evaluation." Proceedings of the 1st international Workshop on Visual interfaces forground truth collection in Computer vision applications. ACM, 2012. (Year: 2012) 7 pages.
Z. Cao et al., 'Realtime Multi-Person 2D Pose Estimation using Part Affinity Fields', In Proceedings of the IEEE Conference on Computer Vision and Pattern Recognition, Apr. 14, 2017, pp. 1-9 sections 2-3; and ffigure 2.
"U.S. Appl. No. 15/409,500, Examiner Interview Summary dated Mar. 5, 2019", 3 pages.
"U.S. Appl. No. 15/409,500, Non Final Office Action dated Dec. 11, 2018", 11 pgs.
"U.S. Appl. No. 15/409,500, Notice of Allowance dated Jun. 3, 2019", 8 pages.
"U.S. Appl. No. 15/601,863, Examiner Interview Summary dated Nov. 21, 2018", 4 pgs.
"U.S. Appl. No. 15/601,863, Non Final Office Action dated Sep. 20, 2018", 23 pages.
"U.S. Appl. No. 15/601,863, Notice of Allowance dated Jan. 24, 2019", 8 pages.
"International Application Serial No. PCT/US16/52192, Intl Search Report and Written Opinion dated Dec. 12, 2016", 8 pages.
"Intl Application Serial No. PCT/US16/52192, Intl Preliminary Report on Patentability dated Apr. 5, 2018", 7 pgs.
U.S. Appl. No. 14/860,983, Final Rejection, dated Feb. 12, 2020, 18 pgs.
U.S. Appl. No. 15/620,506, Notice of Allowance and Fees Due (Ptol-85), dated Mar. 2, 2020, 10 pgs.
U.S. Appl. No. 15/632,709, Non-Final Rejection, dated May 22, 2020, 10 pgs.
U.S. Appl. No. 15/673,125, Final Rejection, dated Feb. 19, 2020, 17 pgs.
U.S. Appl. No. 15/713,406, Final Rejection, dated Feb. 19, 2020, 22 pgs.
U.S. Appl. No. 15/717,889, Non-Final Rejection, dated Oct. 27, 2020, 40 pgs.
U.S. Appl. No. 15/911,993, Non-Final Rejection, dated Aug. 5, 2020, 6 pgs.
U.S. Appl. No. 15/969,749, Final Rejection, dated Feb. 26, 2020, 15 pgs.
U.S. Appl. No. 15/969,749, Non-Final Rejection, dated Sep. 17, 2020, 15 pgs.
U.S. Appl. No. 16/179,746, Advisory Action (Ptol-303), dated Sep. 15, 2020, 2 pgs.
U.S. Appl. No. 16/179,746, Examiner Interview Summary Record (Ptol-413), dated Nov. 5, 2020, 2 pgs.
U.S. Appl. No. 16/362,547, Advisory Action (Ptol-303), dated Nov. 18, 2020, 2 pgs.
U.S. Appl. No. 16/362,547, Examiner Interview Summary Record (Ptol-413), dated Nov. 18, 2020, 1 pg.
U.S. Appl. No. 16/362,547, Final Rejection, dated Sep. 24, 2020,14 pgs.
U.S. Appl. No. 16/362,547,Examiner Interview Summary Record (Ptol-413), dated Nov. 5, 2020, 2 pgs.
U.S. Appl. No. 16/426,323, Notice of Allowance and Fees Due (Ptol-85), dated Aug. 5, 2020, 11 pgs.
U.S. Appl. No. 16/451,371, NOA—Notice of Allowance and Fees Due (Ptol-85), dated Sep. 17, 2020, 5 pgs.
U.S. Appl. No. 16/451,371, Non-Final Rejection, dated Jun. 11, 2020,—9 pgs.
U.S. Appl. No. 16/586,868, Notice of Allowance and Fees Due (Ptol-85), dated Oct. 7, 2020, 2 pgs.
U.S. Appl. No. 16/586,868, Notice of Allowance and Fees Due (Ptol-85), dated Jul. 31, 2020,13 pgs.
U.S. Appl. No. 16/726,090, Non-Final Rejection, dated Nov. 19, 2020, 12 pgs.
U.S. Appl. No. 16/778,981, Non-Final Rejection, dated Oct. 13, 2020,7 pgs.
U.S. Appl. No. 12/101,883, Examiner Interview Summary dated Sep. 6, 2016, 3 pgs.
U.S. Appl. No. 14/800,642, Non-Final Office Action dated May 18, 2017, 17 pages.
U.S. Appl. No. 15/425,983, Examiner Interview Summary dated May 17, 2018, 3 pgs.
U.S. Appl. No. 15/632,709, Examiner Interview Summary dated Apr. 30, 2018, 1 pg.
U.S. Appl. No. 15/632,709, Final Office Action dated Jul. 17, 2018, 12 pgs.
U.S. Appl. No. 15/632,709, Non Final Office Action dated Apr. 3, 2019, 13 pgs.
U.S. Appl. No. 15/632,709, Non Final Office Action dated Apr. 30, 2018, 14 pgs.
U.S. Appl. No. 15/632,709, Notice of Allowance dated May 3, 2021, 9 pgs.
U.S. Appl. No. 15/717,889, Advisory Action dated Jul. 6, 2021, 3 pgs.
U.S. Appl. No. 15/717,889, Examiner Interview Summary dated Jun. 4, 2021, 2 pgs.
U.S. Appl. No. 15/717,889, Examiner Interview Summary dated Jul. 6, 2021, 2 pgs.
U.S. Appl. No. 15/717,889, Final Office Action dated Mar. 4, 2021, 37 pgs.
U.S. Appl. No. 15/911,993, Notice of Allowance dated Jan. 12, 2021, 8 pgs.
U.S. Appl. No. 15/963,896, Non Final Office Action dated Apr. 18, 2019, 7 pgs.
U.S. Appl. No. 15/963,896, Notice of Allowance dated May 22, 2019, 8 pgs.
U.S. Appl. No. 15/969,749, Examiner Interview Summary dated Apr. 20, 2021, 1 pg.
U.S. Appl. No. 16/179,746, Examiner Interview Summary dated Jun. 3, 2021, 1 pg.
U.S. Appl. No. 16/179,746, Final Office Action dated Jun. 3, 2021, 25 pgs.
U.S. Appl. No. 16/179,746, Non-Final Office Action dated Feb. 11, 2021, 25 pgs.

(56) References Cited

OTHER PUBLICATIONS

U.S. Appl. No. 16/362,547, Examiner Interview Summary dated Jul. 12, 2021, 2 pgs.

* cited by examiner

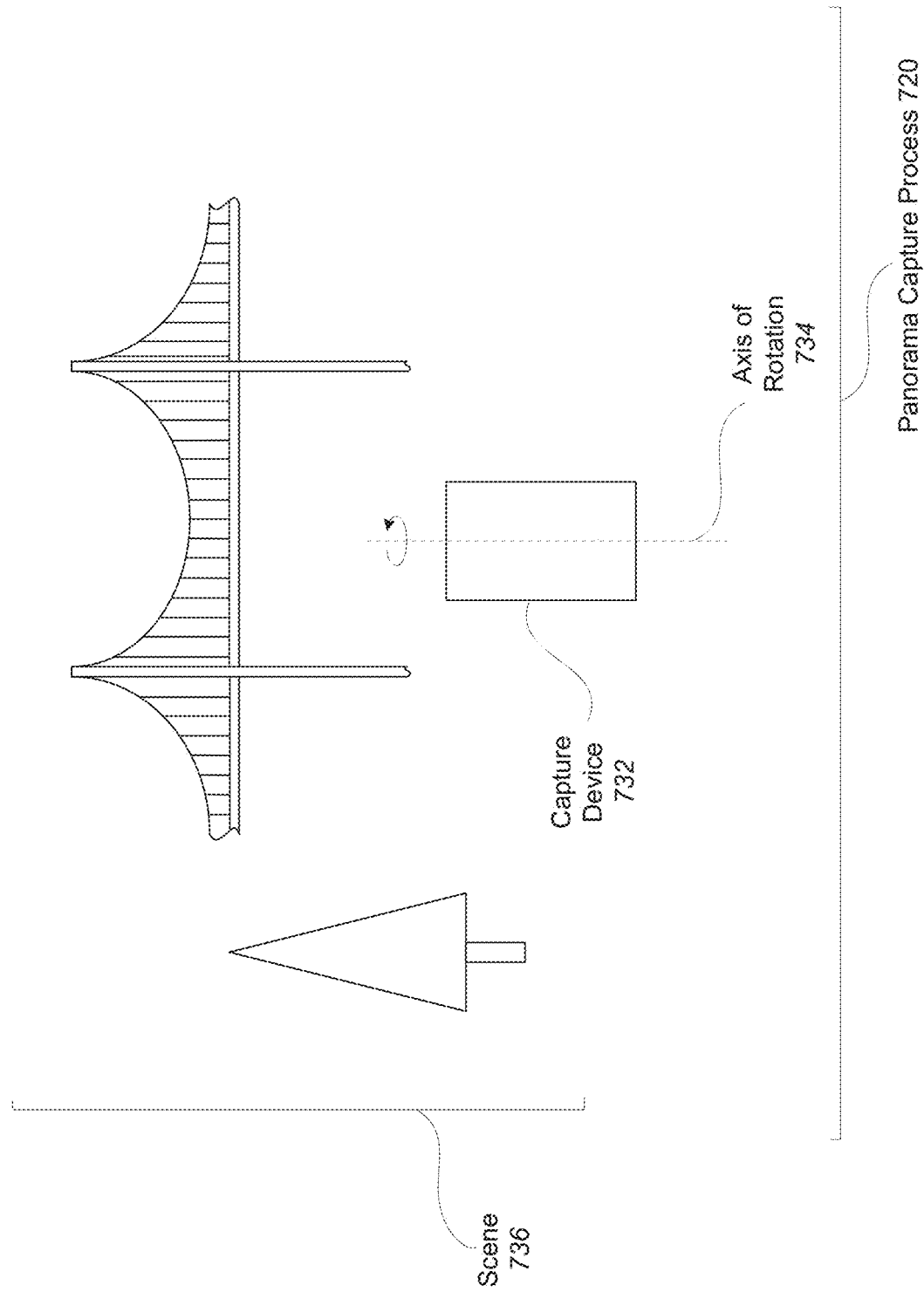

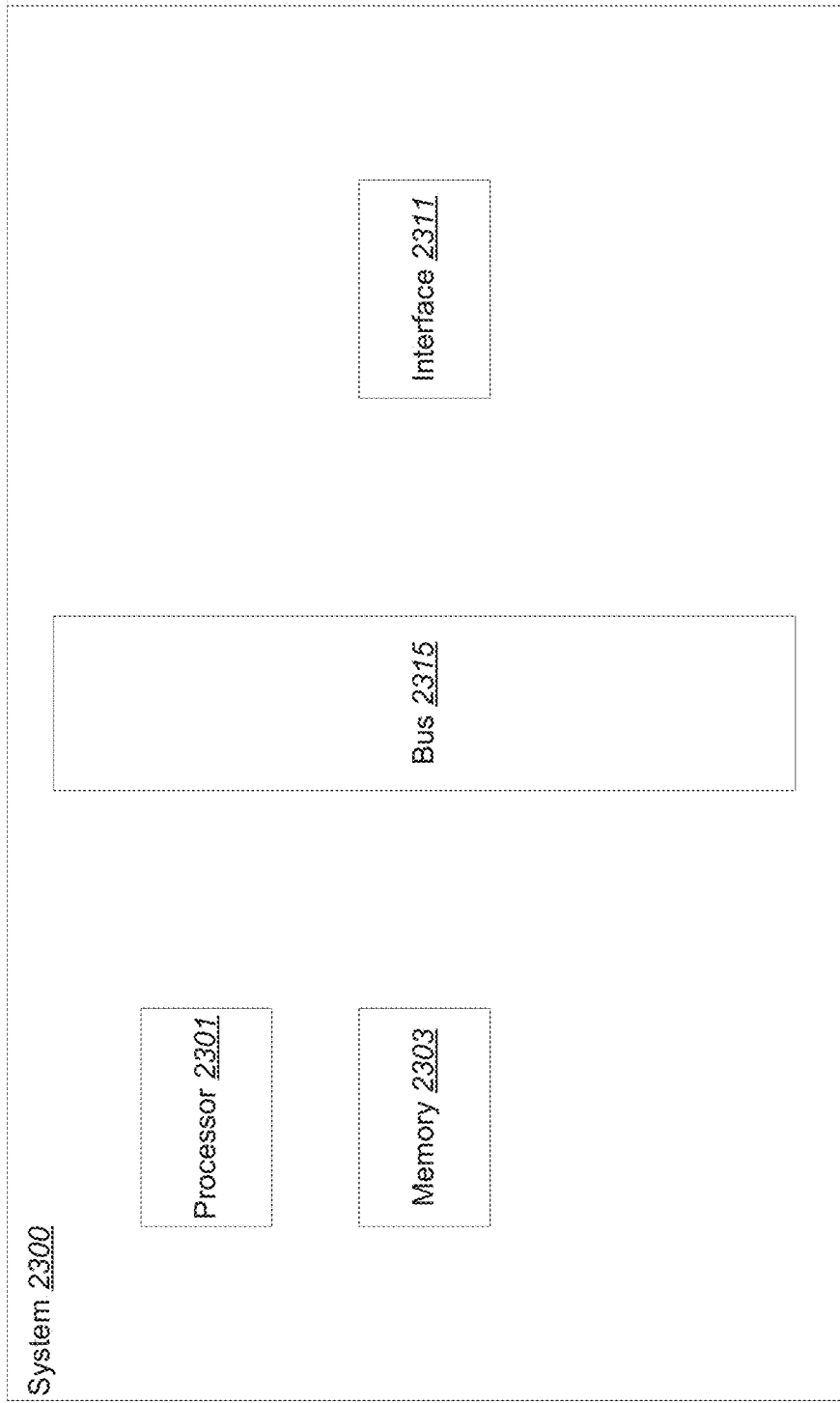

VIRTUAL REALITY ENVIRONMENT BASED MANIPULATION OF MULTI-LAYERED MULTI-VIEW INTERACTIVE DIGITAL MEDIA REPRESENTATIONS

CROSS-REFERENCE TO RELATED APPLICATIONS

This application is a continuation application of U.S. application Ser. No. 15/724,081, filed on Oct. 3, 2017, which is a continuation of U.S. application Ser. No. 15/682,362, filed on Aug. 21, 2017, now U.S. Pat. No. 10,222,932, issued on Mar. 5, 2019. In addition, this application claims the benefit of U.S. Provisional Application No. 62/377,519, which is incorporated by reference herein in its entirety for all purposes. In addition, this application claims the benefit of U.S. Provisional Application No. 62/377,517, filed on Aug. 19, 2016, which is incorporated by reference herein in its entirety for all purposes. In addition, this application claims the benefit of U.S. Provisional Application No. 62/377,513, filed on Aug. 19, 2016, which is incorporated by reference herein in its entirety for all purposes. In addition, this application is a Continuation-in-Part of U.S. application Ser. No. 14/800,638, filed on Jul. 15, 2015, now U.S. Pat. No. 9,940,541, issued on Apr. 10, 2018, which is also incorporated by reference herein in its entirety for all purposes.

TECHNICAL FIELD

The present disclosure relates to layers in surround views, which includes providing a multi-view interactive digital media representation (MIDMR).

DESCRIPTION OF RELATED ART

With modern computing platforms and technologies shifting towards mobile and wearable devices that include camera sensors as native acquisition input streams, the desire to record and preserve moments digitally in a different form than more traditional two-dimensional (2D) flat images and videos has become more apparent. Traditional digital media formats typically limit their viewers to a passive experience. For instance, a 2D flat image can be viewed from one angle and is limited to zooming in and out. Accordingly, traditional digital media formats, such as 2D flat images, do not easily lend themselves to reproducing memories and events with high fidelity.

Current predictions (Ref: KPCB "Internet Trends 2012" presentation") indicate that every several years the quantity of visual data that is being captured digitally online will double. As this quantity of visual data increases, so does the need for much more comprehensive search and indexing mechanisms than ones currently available. Unfortunately, neither 2D images nor 2D videos have been designed for these purposes. Accordingly, improved mechanisms that allow users to view and index visual data, as well as query and quickly receive meaningful results from visual data are desirable.

In addition, virtual reality has become increasingly popular. With virtual reality (VR) technology, a user can experience an immersive digital world by engaging with virtual reality equipment. However, with standard VR technology, the digital worlds are usually limited to manufactured computer animated environments, such as simulators. Such computer animation is not "realistic" to a real world environment. Even if a VR system does attempt to simulate the real world environment, such systems are often limited to using three dimensional polygon modeling with subsequent texture rendering. Such VR systems do not seem "realistic" to a user and usually require multiple processing steps for generating the three dimensional models. Thus, there exists a need for improved VR systems that provide a more "realistic" feel to a user, while reducing the amount of processing needed to generate realistic three-dimensional objects in a virtual reality environment.

OVERVIEW

According to various embodiments, a multi-view interactive digital media (MIDM) is used herein to describe any one of various images (or other media data) used to represent a dynamic surrounding view of an object of interest and/or contextual background. Such dynamic surrounding view may be referred to herein as multi-view interactive digital media representation (MIDMR). Various embodiments of the present disclosure relate generally to systems and methods for generating multi-view interactive digital media representations in a virtual reality environment. According to particular embodiments, a plurality of images is fused into a first content model and a first context model, both of which include multi-view interactive digital media representations of objects. Next, a virtual reality environment is generated using the first content model and the first context model. The virtual reality environment includes a first layer and a second layer. The user can navigate through and within the virtual reality environment to switch between multiple viewpoints of the content model via corresponding physical movements. The first layer includes the first content model and the second layer includes a second content model and wherein selection of the first layer provides access to the second layer with the second content model.

BRIEF DESCRIPTION OF THE DRAWINGS

The disclosure may best be understood by reference to the following description taken in conjunction with the accompanying drawings, which illustrate particular embodiments of the present disclosure.

FIG. 7C illustrates one example of a dynamic panorama capture process where the capture device is rotated through the axis of rotation.

FIG. 23 illustrates a particular example of a computer system that can be used with various embodiments of the present disclosure.

DETAILED DESCRIPTION

Figure 1:
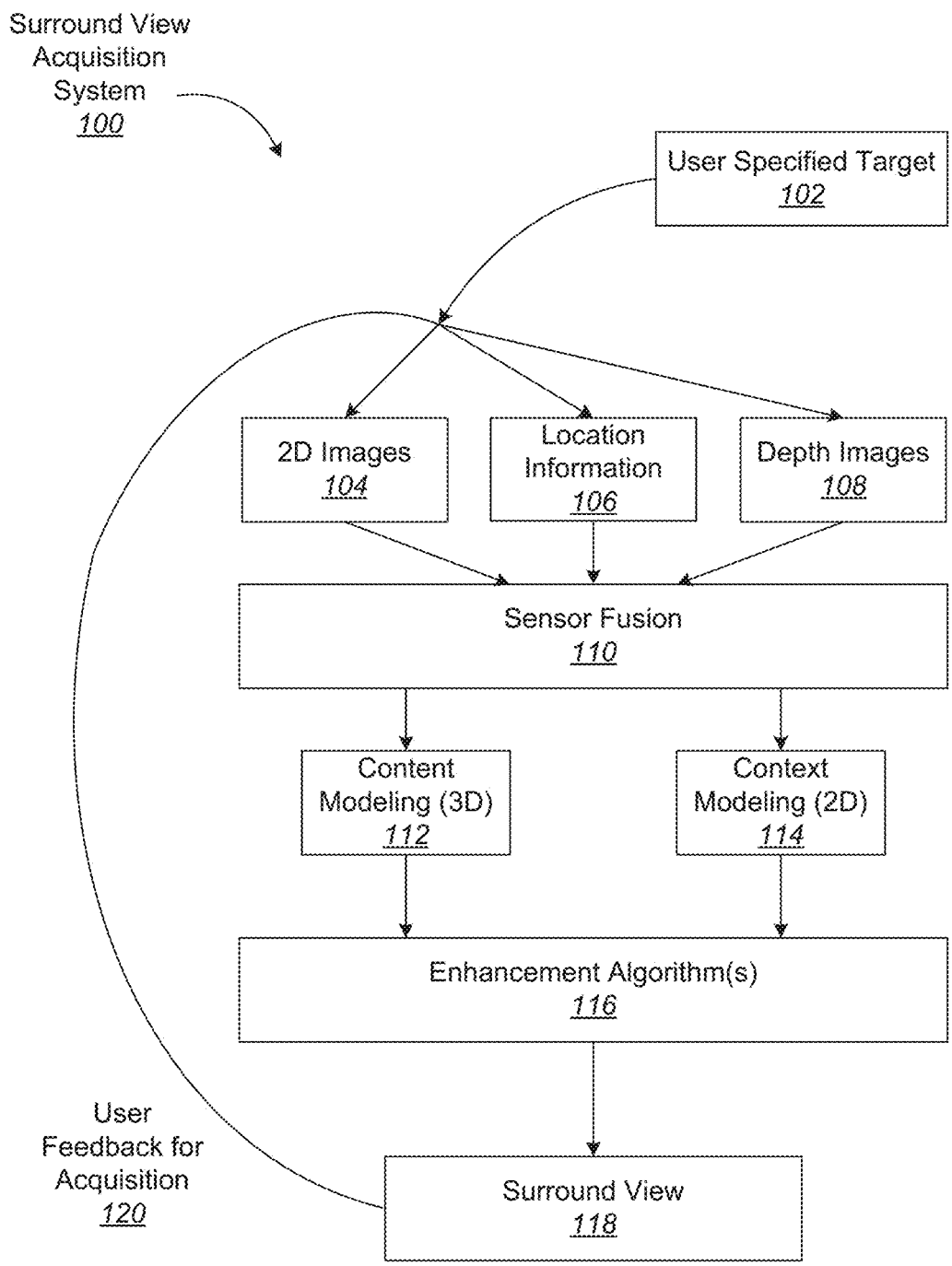
FIG. 1 illustrates an example of a surround view acquisition system.

Reference will now be made in detail to some specific examples of the disclosure including the best modes contemplated by the inventors for carrying out the disclosure. Examples of these specific embodiments are illustrated in the accompanying drawings. While the present disclosure is described in conjunction with these specific embodiments, it will be understood that it is not intended to limit the disclosure to the described embodiments. On the contrary, it is intended to cover alternatives, modifications, and equivalents as may be included within the spirit and scope of the disclosure as defined by the appended claims.

In the following description, numerous specific details are set forth in order to provide a thorough understanding of the present disclosure. Particular embodiments of the present disclosure may be implemented without some or all of these specific details. In other instances, well known process operations have not been described in detail in order not to unnecessarily obscure the present disclosure.

In various embodiments, the virtual reality system uses real images to generate three dimensional objects in a virtual environment. Surround views of objects of interest are generated by fusing actual images of the objects of interest. In some embodiments, the system does not use an intermediate polygon model generation step. Instead, objects are identified within the plurality of images. Next, common objects from the plurality of images are identified and different views/angles of each common object are stored. Next, measurements and dimensions of the common object are extracted from the different views/angles of the common object. In some embodiments, the three dimensional measurements of an object are extracted by comparing differences of common features of the common object in different surround views. After extracting the measurements and dimensions of the object, a three dimensional content model of the object is generated by stitching together various images of the object. The various images correspond to different angles and views of the object obtained via concave or convex movement of an image capturing device, e.g. a camera. By directly using the images, the virtual reality system conserves processing resources and time. In addition, the image generated content model is more accurate than traditional polygon generation systems that estimate an object's dimensions.

In some embodiments, the content model is three-dimensional and allows a user in the virtual reality environment to navigate around the object by circling the object in the virtual reality environment. In some embodiments, the virtual reality environment is mapped to the physical world. For instance, a virtual room with objects can be mapped to a physical 20 ft×20 ft room, such that when a user puts on the virtual reality headset or goggles, or any other type of engagement device, the user can see and interact with digital objects that are in the virtual room but are not physically present in the real world room. For example, an object such as a painting can be "fixed" to the north wall of the room such that whenever the user is physically oriented toward the north wall, the user can see the painting. The painting can be any painting captured through a camera. For example, the famous painting "the Mona Lisa" can be captured by a moving camera (thus capturing the Mona Lisa at different angles) through space. From all the different images generated, the dimensions of the Mona Lisa can be captured. The Mona Lisa can then be replicated by generating a three dimensional model of the painting by stitching together the different images. The three dimensional model can then be "hung" on the north wall of the room such that any user engaged in the virtual reality environment (as used herein, "an engaged user") can "see" the Mona Lisa when looking at the north wall of the room.

In some embodiments, the objects are "fixed in space" and correspond to actual physical dimensions of a room. For example, a three dimensional model of a chair can be "placed" in the center of the room such that an engaged user can walk up to the model of the chair by ambulating to the center of the room. In some embodiments, in order to simulate realistic objects, the size of the object model (or appearance of size) increases as a user moves toward the object model and decreases as the user moves away from the object model. In some embodiments, the object models are fixed in space to an actual physical location. Thus, in such embodiments, no matter where the user starts, the object models always start in the same location. For example, in the room scenario above, if the chair was fixed to the center of the room, then the chair will always be in the center of the room no matter if the user starts in the center or starts at the wall. In other embodiments, the object models are not fixed to physical locations, but rather are fixed to relative positions to the user. In such embodiments, the objects always start at a predetermined distance relative to the start point of the user. As the user moves toward the object, the object appears bigger, and vice versa. For example, if the chair always starts ten feet away from the user, the chair starts in the center of the room if the user starts at the wall. Similarly, the chair then also starts at the wall if the user starts in the center of the room. As used herein, "starts" refers to the initial location of an object when the user turns on or engages with the virtual reality environment. In relative location embodiments, the placement of objects is more flexible and can be easily altered. For example, the settings for the VR system can be set such that the chair always starts 10 feet away from the user or adjusted to 5 feet or 15 feet. Of course with relative location embodiments, the system still has to take into account real world road blocks or obstructions and adjust accordingly. For example, if the chair is set to start at 25 feet from a user and the user is within a 20 ft×20 ft room, then if the user starts in the center of the room the chair would have to start beyond the wall. In such cases, the system can auto-adjust such that the object must appear at the farthest distance to the user but before the wall, or the system can choose to eliminate the chair from the VR environment altogether.

In some embodiments, objects are automatically identified and extracted using similarity algorithms for recognizing objects common to a plurality of pictures. In some embodiments, objects are automatically identified and extracted from the plurality of images and stored to use as content models for various VR environments. In some embodiments, actual dimensions of objects are calculated by comparing the dimensions to known objects or objects with known dimensions in the images. For example, if the object is captured by a camera (as used herein, "captured by a camera" refers to obtaining a plurality of images using an image capturing device such as a camera) in a known setting such as show room with objects of known dimensions, or if an object is captured while being next to an object of a standard or known size, such as a credit card or a ruler, then the real world dimensions of the object can also be determined. However, if an object is captured in an environment with no known objects or objects with known dimensions, real world dimensions can still be estimated by identifying objects that are similar in size to either the object or to objects in the background. In some embodiments, the VR environment includes a context model, e.g. scenery, in addition to content models, e.g. objects. For example in the room example above, a content model could be the chair located in the center of the room. The context model could then be aquariums, trees, jail bars, and other scenery replacements for the walls of the room. In some embodiments, the context model is the real world scenery surrounding the object when the object was captured in a plurality of images by the camera.

Various aspects of the present disclosure relate generally to systems and methods for analyzing the spatial relationship between multiple images and video together with location information data, for the purpose of creating a single representation, a surround view, which eliminates redundancy in the data, and presents a user with an interactive and immersive active viewing experience. According to various embodiments, active is described in the context of providing a user with the ability to control the viewpoint of the visual information displayed on a screen. In particular example embodiments, the surround view data structure (and associated algorithms) is natively built for, but not limited to, applications involving visual search.

According to various embodiments of the present disclosure, a surround view is a multi-view interactive digital media representation. With reference to FIG. 1, shown is one example of a surround view acquisition system 100. In the present example embodiment, the surround view acquisition system 100 is depicted in a flow sequence that can be used to generate a surround view. According to various embodiments, the data used to generate a surround view can come from a variety of sources. In particular, data such as, but not limited to two-dimensional (2D) images 104 can be used to generate a surround view. These 2D images can include color image data streams such as multiple image sequences, video data, etc., or multiple images in any of various formats for images, depending on the application. Another source of data that can be used to generate a surround view includes location information 106. This location information 106 can be obtained from sources such as accelerometers, gyroscopes, magnetometers, GPS, WiFi, IMU-like systems (Inertial Measurement Unit systems), and the like. Yet another source of data that can be used to generate a surround view can include depth images 108. These depth images can include depth, 3D, or disparity image data streams, and the like, and can be captured by devices such as, but not limited to, stereo cameras, time-of-flight cameras, three-dimensional cameras, and the like.

In the present example embodiment, the data can then be fused together at sensor fusion block 110. In some embodiments, a surround view can be generated a combination of data that includes both 2D images 104 and location information 106, without any depth images 108 provided. In other embodiments, depth images 108 and location information 106 can be used together at sensor fusion block 110. Various combinations of image data can be used with location information at 106, depending on the application and available data.

In the present example embodiment, the data that has been fused together at sensor fusion block 110 is then used for content modeling 112 and context modeling 114. As described in more detail with regard to FIG. 4, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments, as described in more detail below with regard to FIG. 4. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. According to various embodiments, the models provided by content modeling 112 and context modeling 114 can be generated by combining the image and location information data, as described in more detail with regard to FIG. 3.

According to various embodiments, context and content of a surround view are determined based on a specified object of interest. In some examples, an object of interest is automatically chosen based on processing of the image and location information data. For instance, if a dominant object is detected in a series of images, this object can be selected as the content. In other examples, a user specified target 102 can be chosen, as shown in FIG. 1. It should be noted, however, that a surround view can be generated without a user specified target in some applications.

In the present example embodiment, one or more enhancement algorithms can be applied at enhancement algorithm(s) block 116. In particular example embodiments, various algorithms can be employed during capture of surround view data, regardless of the type of capture mode employed. These algorithms can be used to enhance the user experience. For instance, automatic frame selection, stabilization, view interpolation, filters, and/or compression can be used during capture of surround view data. In some examples, these enhancement algorithms can be applied to image data after acquisition of the data. In other examples, these enhancement algorithms can be applied to image data during capture of surround view data.

According to particular example embodiments, automatic frame selection can be used to create a more enjoyable surround view. Specifically, frames are automatically selected so that the transition between them will be smoother or more even. This automatic frame selection can incorporate blur- and overexposure—detection in some applications, as well as more uniformly sampling poses such that they are more evenly distributed.

In some example embodiments, stabilization can be used for a surround view in a manner similar to that used for video. In particular, keyframes in a surround view can be stabilized for to produce improvements such as smoother transitions, improved/enhanced focus on the content, etc. However, unlike video, there are many additional sources of stabilization for a surround view, such as by using IMU information, depth information, computer vision techniques, direct selection of an area to be stabilized, face detection, and the like.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor.

In some examples, depth information, if available, can be used to provide stabilization for a surround view. Because points of interest in a surround view are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it. Furthermore, content can also be selected automatically by using a foreground/background differentiation based on depth. In various examples, the content can stay relatively stable/visible even when the context changes.

According to various examples, computer vision techniques can also be used to provide stabilization for surround views. For instance, keypoints can be detected and tracked. However, in certain scenes, such as a dynamic scene or static scene with parallax, no simple warp exists that can stabilize everything. Consequently, there is a trade-off in which certain aspects of the scene receive more attention to stabilization and other aspects of the scene receive less attention. Because a surround view is often focused on a particular object of interest, a surround view can be content-weighted so that the object of interest is maximally stabilized in some examples.

Another way to improve stabilization in a surround view includes direct selection of a region of a screen. For instance, if a user taps to focus on a region of a screen, then records a convex surround view, the area that was tapped can be maximally stabilized. This allows stabilization algorithms to be focused on a particular area or object of interest.

In some examples, face detection can be used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, mouth) can be used as areas to stabilize, rather than using generic keypoints.

According to various examples, view interpolation can be used to improve the viewing experience. In particular, to avoid sudden "jumps" between stabilized frames, synthetic, intermediate views can be rendered on the fly. This can be informed by content-weighted keypoint tracks and IMU information as described above, as well as by denser pixel-to-pixel matches. If depth information is available, fewer artifacts resulting from mismatched pixels may occur, thereby simplifying the process. As described above, view interpolation can be applied during capture of a surround view in some embodiments. In other embodiments, view interpolation can be applied during surround view generation.

In some examples, filters can also be used during capture or generation of a surround view to enhance the viewing experience. Just as many popular photo sharing services provide aesthetic filters that can be applied to static, two-dimensional images, aesthetic filters can similarly be applied to surround images. However, because a surround view representation is more expressive than a two-dimensional image, and three-dimensional information is available in a surround view, these filters can be extended to include effects that are ill-defined in two dimensional photos. For instance, in a surround view, motion blur can be added to the background (i.e. context) while the content remains crisp. In another example, a drop-shadow can be added to the object of interest in a surround view.

In various examples, compression can also be used as an enhancement algorithm 116. In particular, compression can be used to enhance user-experience by reducing data upload and download costs. Because surround views use spatial information, far less data can be sent for a surround view than a typical video, while maintaining desired qualities of the surround view. Specifically, the IMU, keypoint tracks, and user input, combined with the view interpolation described above, can all reduce the amount of data that must be transferred to and from a device during upload or download of a surround view. For instance, if an object of interest can be properly identified, a variable compression style can be chosen for the content and context. This variable compression style can include lower quality resolution for background information (i.e. context) and higher quality resolution for foreground information (i.e. content) in some examples. In such examples, the amount of data transmitted can be reduced by sacrificing some of the context quality, while maintaining a desired level of quality for the content.

In the present embodiment, a surround view 118 is generated after any enhancement algorithms are applied. The surround view can provide a multi-view interactive digital media representation. In various examples, the surround view can include three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, surround views provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with surround views that allow the surround views to be indexed with a high degree of efficiency and accuracy; and the ability of the user to interact and change the viewpoint of the surround view. In particular example embodiments, the characteristics described above can be incorporated natively in the surround view representation, and provide the capability for use in various applications. For instance, surround views can be used to enhance various fields such as e-commerce, visual search, 3D printing, file sharing, user interaction, and entertainment.

According to various example embodiments, once a surround view 118 is generated, user feedback for acquisition 120 of additional image data can be provided. In particular, if a surround view is determined to need additional views to provide a more accurate model of the content or context, a user may be prompted to provide additional views. Once these additional views are received by the surround view acquisition system 100, these additional views can be processed by the system 100 and incorporated into the surround view.

Figure 2:
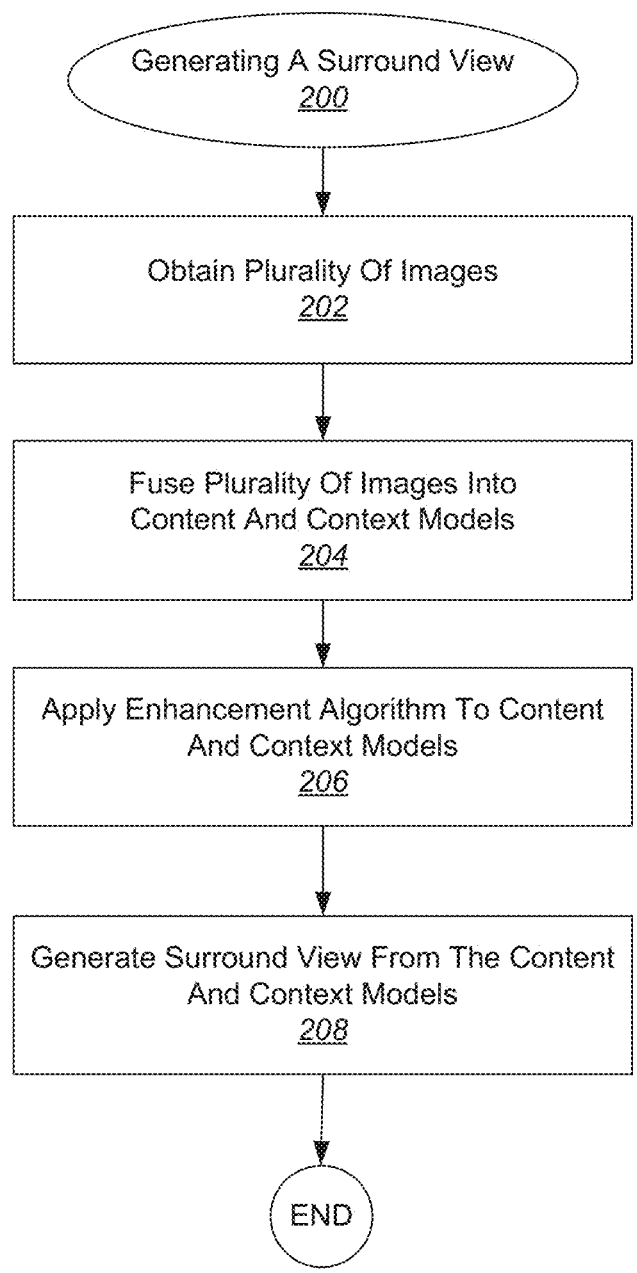
FIG. 2 illustrates an example of a process flow for generating a surround view.

With reference to FIG. 2, shown is an example of a process flow diagram for generating a surround view 200. In the present example, a plurality of images is obtained at 202. According to various embodiments, the plurality of images can include two-dimensional (2D) images or data streams. These 2D images can include location information that can be used to generate a surround view. In some embodiments, the plurality of images can include depth images 108, as also described above with regard to FIG. 1. The depth images can also include location information in various examples.

According to various embodiments, the plurality of images obtained at 202 can include a variety of sources and characteristics. For instance, the plurality of images can be obtained from a plurality of users. These images can be a collection of images gathered from the internet from different users of the same event, such as 2D images or video obtained at a concert, etc. In some examples, the plurality of images can include images with different temporal information. In particular, the images can be taken at different times of the same object of interest. For instance, multiple images of a particular statue can be obtained at different times of day, different seasons, etc. In other examples, the plurality of images can represent moving objects. For instance, the images may include an object of interest moving through scenery, such as a vehicle traveling along a road or a plane traveling through the sky. In other instances, the images may include an object of interest that is also moving, such as a person dancing, running, twirling, etc.

In the present example embodiment, the plurality of images is fused into content and context models at 204. According to various embodiments, the subject matter featured in the images can be separated into content and context. The content can be delineated as the object of interest and the context can be delineated as the scenery surrounding the object of interest. According to various embodiments, the content can be a three-dimensional model, depicting an object of interest, and the content can be a two-dimensional image in some embodiments.

According to the present example embodiment, one or more enhancement algorithms can be applied to the content and context models at 206. These algorithms can be used to enhance the user experience. For instance, enhancement algorithms such as automatic frame selection, stabilization, view interpolation, filters, and/or compression can be used. In some examples, these enhancement algorithms can be applied to image data during capture of the images. In other examples, these enhancement algorithms can be applied to image data after acquisition of the data.

In the present embodiment, a surround view is generated from the content and context models at 208. The surround view can provide a multi-view interactive digital media representation. In various examples, the surround view can include a three-dimensional model of the content and a two-dimensional model of the context. According to various embodiments, depending on the mode of capture and the viewpoints of the images, the surround view model can include certain characteristics. For instance, some examples of different styles of surround views include a locally concave surround view, a locally convex surround view, and a locally flat surround view. However, it should be noted that surround views can include combinations of views and characteristics, depending on the application.

Figure 3:
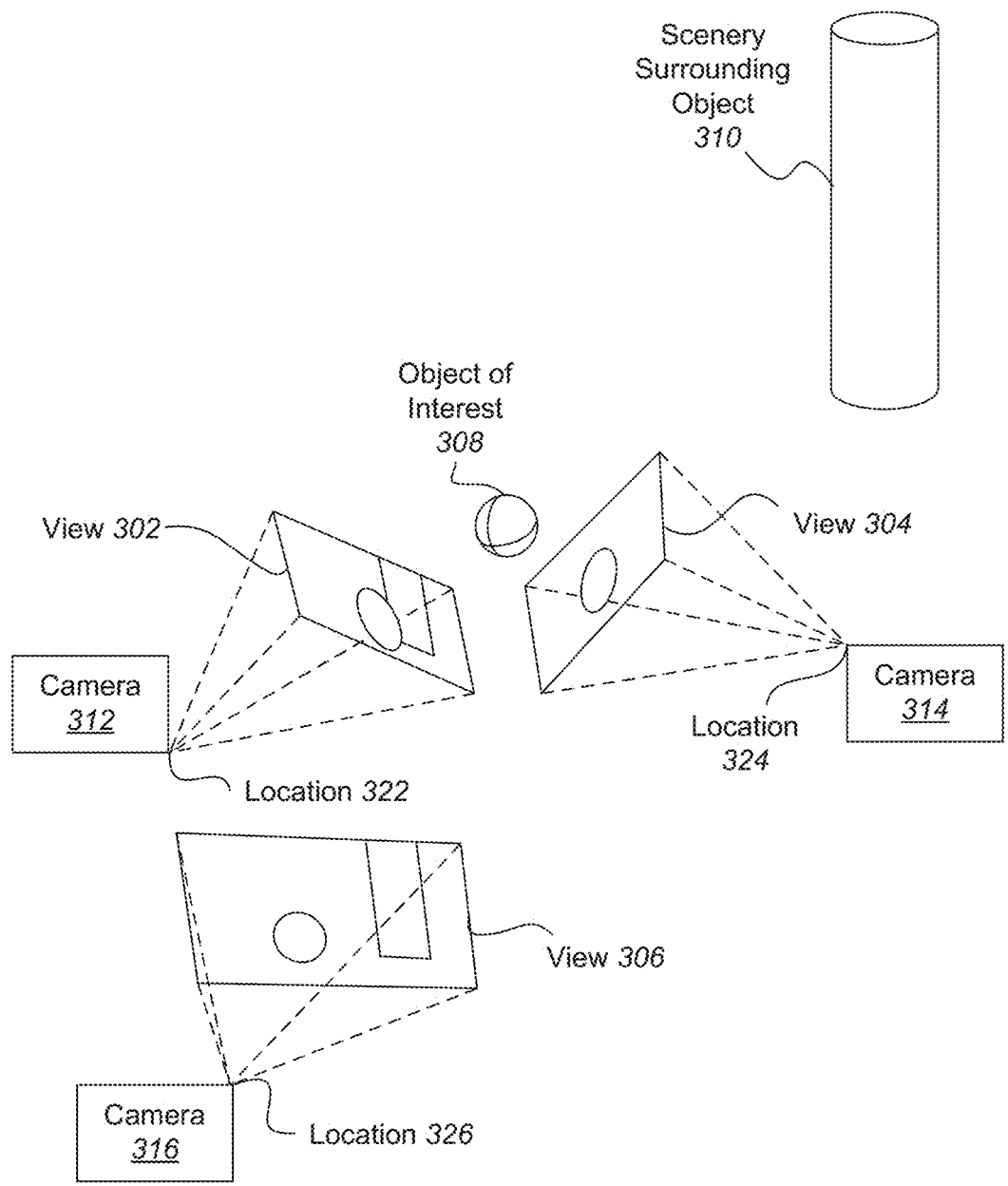
FIG. 3 illustrates one example of multiple camera views that can be fused into a three-dimensional (3D) model to create an immersive experience.

With reference to FIG. 3, shown is one example of multiple camera views that can be fused together into a three-dimensional (3D) model to create an immersive experience. According to various embodiments, multiple images can be captured from various viewpoints and fused together to provide a surround view. In the present example embodiment, three cameras 312, 314, and 316 are positioned at locations 322, 324, and 326, respectively, in proximity to an object of interest 308. Scenery can surround the object of interest 308 such as object 310. Views 302, 304, and 306 from their respective cameras 312, 314, and 316 include overlapping subject matter. Specifically, each view 302, 304, and 306 includes the object of interest 308 and varying degrees of visibility of the scenery surrounding the object 310. For instance, view 302 includes a view of the object of interest 308 in front of the cylinder that is part of the scenery surrounding the object 310. View 306 shows the object of interest 308 to one side of the cylinder, and view 304 shows the object of interest without any view of the cylinder.

In the present example embodiment, the various views 302, 304, and 306 along with their associated locations 322, 324, and 326, respectively, provide a rich source of information about object of interest 308 and the surrounding context that can be used to produce a surround view. For instance, when analyzed together, the various views 302, 304, and 306 provide information about different sides of the object of interest and the relationship between the object of interest and the scenery. According to various embodiments, this information can be used to parse out the object of interest 308 into content and the scenery as the context. Furthermore, as also described above with regard to FIGS. 1 and 2, various algorithms can be applied to images produced by these viewpoints to create an immersive, interactive experience when viewing a surround view.

Figure 4A:
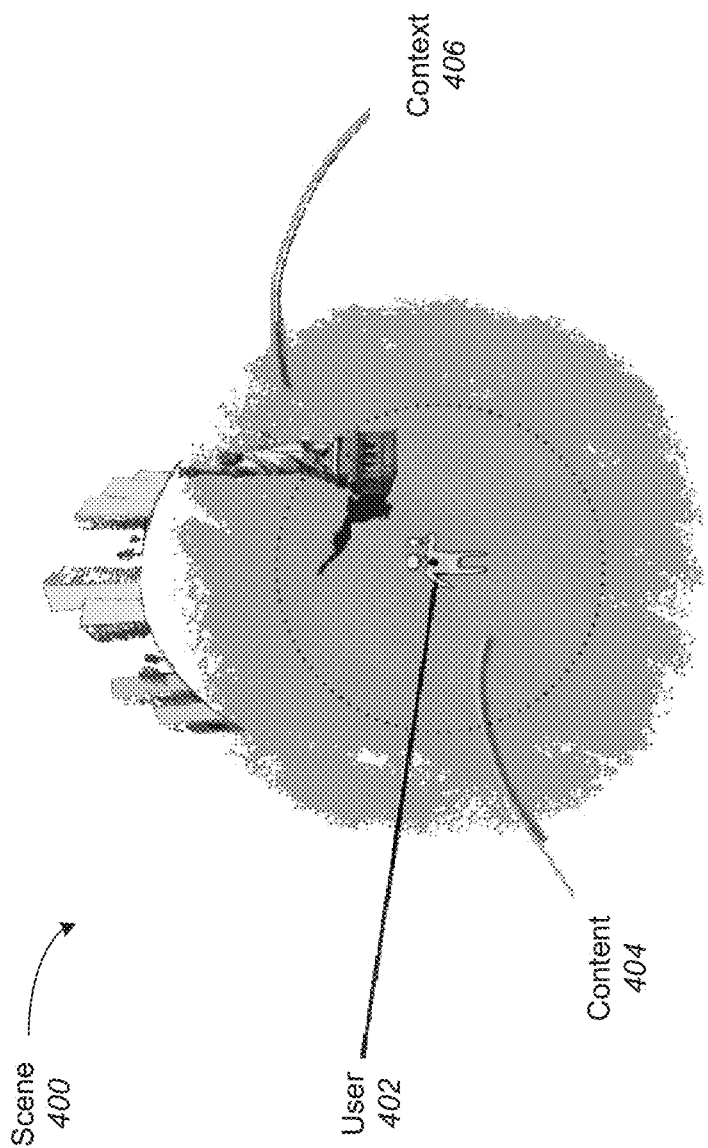
FIG. 4A illustrates one example of separation of content and context in a surround view.

FIG. 4A illustrates one example of separation of content and context in a surround view. According to various embodiments of the present disclosure, a surround view is a multi-view interactive digital media representation of a scene 400. With reference to FIG. 4A, shown is a user 402 located in a scene 400. The user 402 is capturing images of an object of interest, such as a statue. The images captured by the user constitute digital visual data that can be used to generate a surround view.

According to various embodiments of the present disclosure, the digital visual data included in a surround view can be, semantically and/or practically, separated into content 404 and context 406. According to particular embodiments, content 404 can include the object(s), person(s), or scene(s) of interest while the context 406 represents the remaining elements of the scene surrounding the content 404. In some examples, a surround view may represent the content 404 as three-dimensional data, and the context 406 as a two-dimensional panoramic background. In other examples, a surround view may represent both the content 404 and context 406 as two-dimensional panoramic scenes. In yet other examples, content 404 and context 406 may include three-dimensional components or aspects. In particular embodiments, the way that the surround view depicts content 404 and context 406 depends on the capture mode used to acquire the images.

In some examples, such as but not limited to: recordings of objects, persons, or parts of objects or persons, where only the object, person, or parts of them are visible, recordings of large flat areas, and recordings of scenes where the data captured appears to be at infinity (i.e., there are no subjects close to the camera), the content 404 and the context 406 may be the same. In these examples, the surround view produced may have some characteristics that are similar to other types of digital media such as panoramas. However, according to various embodiments, surround views include additional features that distinguish them from these existing types of digital media. For instance, a surround view can represent moving data. Additionally, a surround view is not limited to a specific cylindrical, spherical or translational movement. Various motions can be used to capture image data with a camera or other capture device. Furthermore, unlike a stitched panorama, a surround view can display different sides of the same object.

Figure 4B:
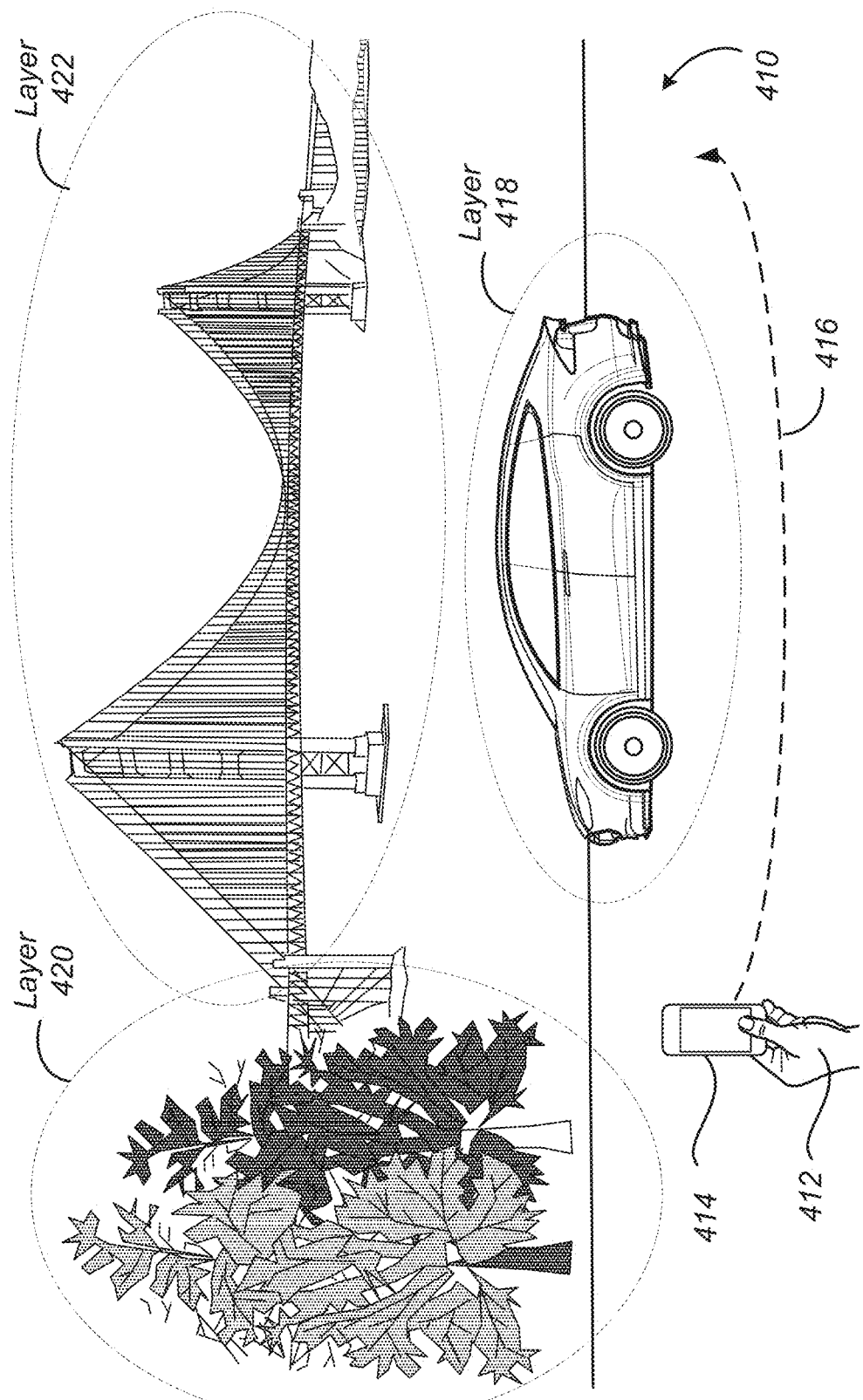
FIG. 4B illustrates one example of layering in a surround view.

Although a surround view can be separated into content and context in some applications, a surround view can also be separated into layers in other applications. With reference to FIG. 4B, shown is one example of layering in a surround view. In this example, a layered surround view 410 is segmented into different layers 418, 420, and 422. Each layer 418, 420, and 422 can include an object (or a set of objects), people, dynamic scene elements, background, etc. Furthermore, each of these layers 418, 420, and 422 can be assigned a depth.

According to various embodiments, the different layers 418, 420, and 422 can be displayed in different ways. For instance, different filters (e.g. gray scale filter, blurring, etc.) can be applied to some layers but not to others. In other examples, different layers can be moved at different speeds relative to each other, such that when a user swipes through a surround view a better three-dimensional effect is provided. Similarly, when a user swipes along the parallax direction, the layers can be displaced differently to provide a better three-dimensional effect. In addition, one or more layers can be omitted when displaying a surround view, such that unwanted objects, etc. can be removed from a surround view.

In the present example, a user 412 is shown holding a capture device 414. The user 412 moves the capture device 414 along capture motion 416. When the images captured are used to generate a surround view, layers 418, 420, and 422 are separated based on depth. These layers can then be processed or viewed differently in a surround view, depending on the application.

Figure 4C:
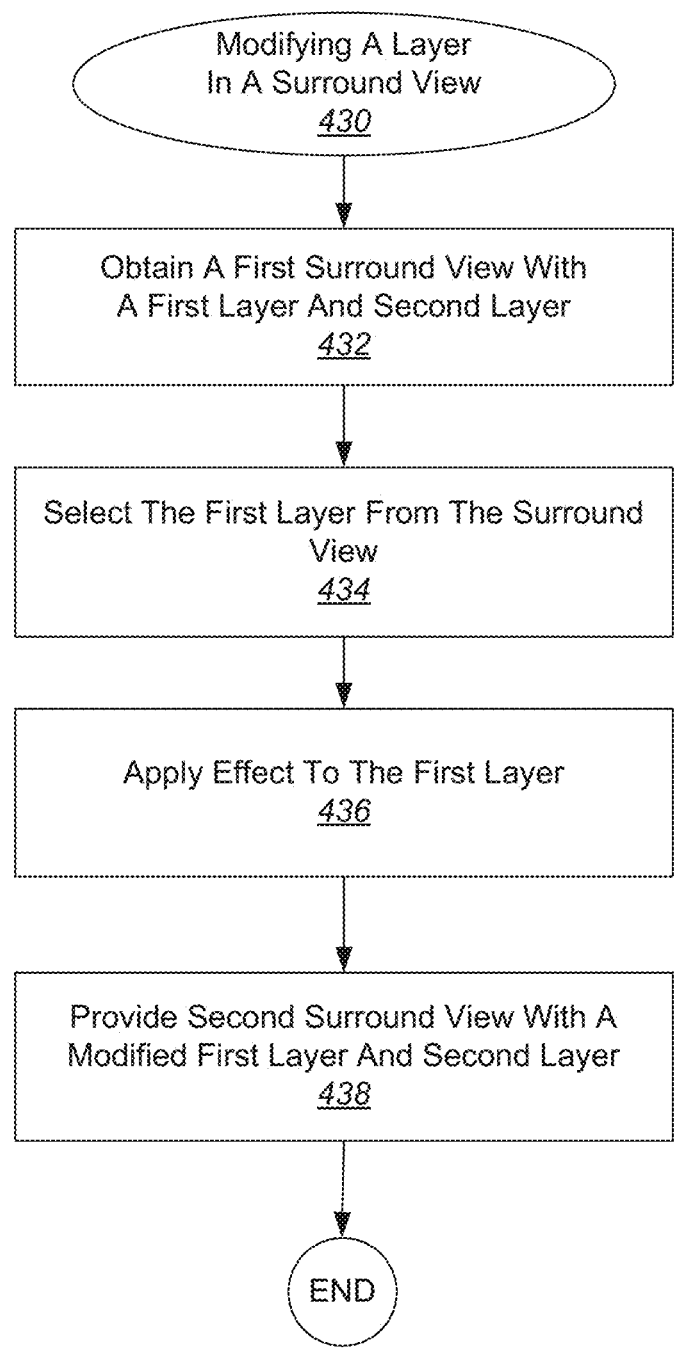
FIG. 4C illustrates one example of a process for modifying a layer in a surround view.

With reference to FIG. 4C, shown is one example of a process for generating a surround view with a modified layer in a surround view 430. In particular, a first surround view having a first layer and a second layer is obtained at 432. As described above with regard to FIG. 4B, a surround view can be divided into different layers. In the present example, the first layer includes a first depth and the second layer includes a second depth.

Next, the first layer is selected at 434. According to various examples, selecting the first layer includes selecting data within the first depth. More specifically, selecting data within the first depth includes selecting the visual data located within the first depth. According to various embodiments, the first layer can include features such as an object, person, dynamic scene elements, background, etc. In some examples, selection of the first layer is performed automatically without user input. In other examples, selection of the first layer is performed semi-automatically using user-guided interaction.

After the first layer is selected, an effect is applied to the first layer within the first surround view to produce a modified first layer at 436. In one example, the effect applied can be a filter such as a blurring filter, gray scale filter, etc. In another example, the effect applied can include moving the first layer at a first speed relative to the second layer, which is moved at a second speed. When the first speed is different from the second speed, three-dimensional effects can be improved in some instances. In some applications, a parallax effect can occur, thereby creating a three-dimensional effect.

Next, a second surround view is generated that includes the modified first layer and the second layer at 438. As described above, applying one or more effects to the first layer can improve the three-dimensional effects of a surround view in some applications. In these applications, the second surround view can have improved three-dimensional effects when compared to the first surround view. Other effects can be applied in different examples, and can emphasize or deemphasize various aspects of a first surround view to yield a second surround view. In addition, in some applications, a layer can be omitted in a second surround view. Specifically, when the first surround view includes a third layer, the second surround view omits this third layer. In one example, this third layer could include an object or person that would be "edited out" in the generated second surround view. In another example, this third layer could include a background or background elements, and the second surround view generated would not include the background or background elements. Of course, any object or feature can be located in this omitted third layer, depending on the application.

Figures 5A, 5B:
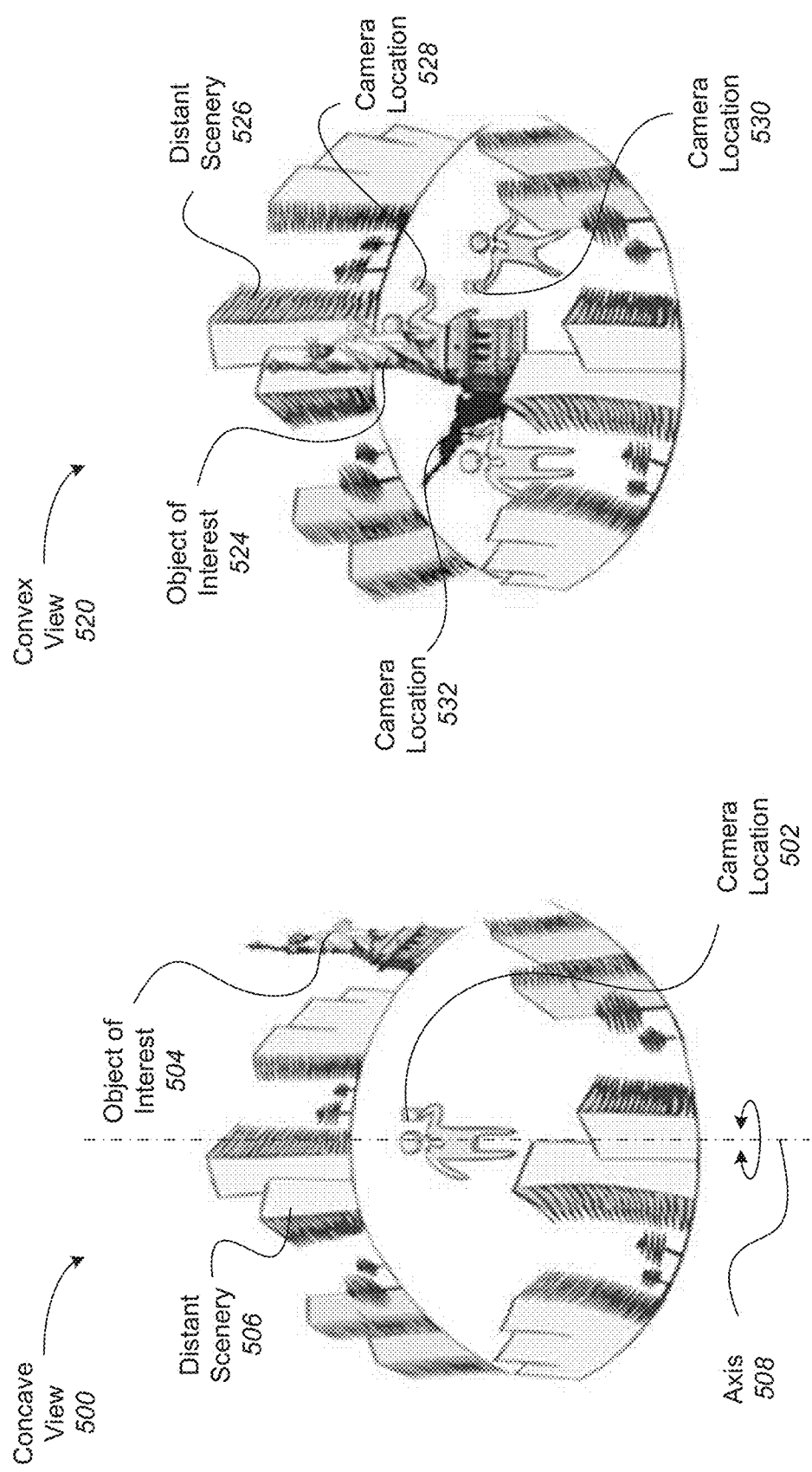
FIGS. 5A-5B illustrate examples of concave view and convex views, respectively, where both views use a back-camera capture style.

FIGS. 5A-5B illustrate examples of concave and convex views, respectively, where both views use a back-camera capture style. In particular, if a camera phone is used, these views use the camera on the back of the phone, facing away from the user. In particular embodiments, concave and convex views can affect how the content and context are designated in a surround view.

With reference to FIG. 5A, shown is one example of a concave view 500 in which a user is standing along a vertical axis 508. In this example, the user is holding a camera, such that camera location 502 does not leave axis 508 during image capture. However, as the user pivots about axis 508, the camera captures a panoramic view of the scene around the user, forming a concave view. In this embodiment, the object of interest 504 and the distant scenery 506 are all viewed similarly because of the way in which the images are captured. In this example, all objects in the concave view appear at infinity, so the content is equal to the context according to this view.

With reference to FIG. 5B, shown is one example of a convex view 520 in which a user changes position when capturing images of an object of interest 524. In this example, the user moves around the object of interest 524, taking pictures from different sides of the object of interest from camera locations 528, 530, and 532. Each of the images obtained includes a view of the object of interest, and a background of the distant scenery 526. In the present example, the object of interest 524 represents the content, and the distant scenery 526 represents the context in this convex view.

FIGS. 6A-6E illustrate examples of various capture modes for surround views. Although various motions can be used to capture a surround view and are not constrained to any particular type of motion, three general types of motion can be used to capture particular features or views described in conjunction surround views. These three types of motion, respectively, can yield a locally concave surround view, a locally convex surround view, and a locally flat surround view. In some examples, a surround view can include various types of motions within the same surround view.

Figure 6A:
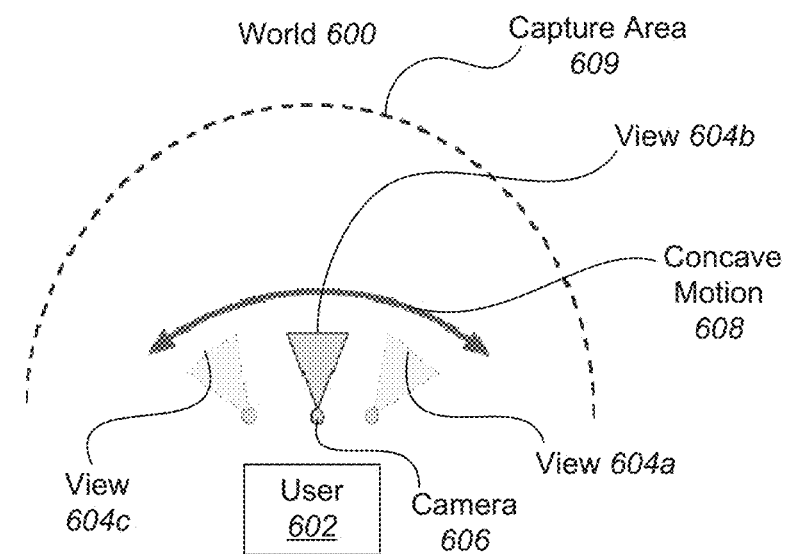
FIGS. 6A-6E illustrate examples of various capture modes for surround views.

With reference to FIG. 6A, shown is an example of a back-facing, concave surround view being captured. According to various embodiments, a locally concave surround view is one in which the viewing angles of the camera or other capture device diverge. In one dimension this can be likened to the motion required to capture a spherical 360 panorama (pure rotation), although the motion can be generalized to any curved sweeping motion in which the view faces outward. In the present example, the experience is that of a stationary viewer looking out at a (possibly dynamic) context.

In the present example embodiment, a user 602 is using a back-facing camera 606 to capture images towards world 600, and away from user 602. As described in various examples, a back-facing camera refers to a device with a camera that faces away from the user, such as the camera on the back of a smart phone. The camera is moved in a concave motion 608, such that views 604a, 604b, and 604c capture various parts of capture area 609.

Figure 6B:
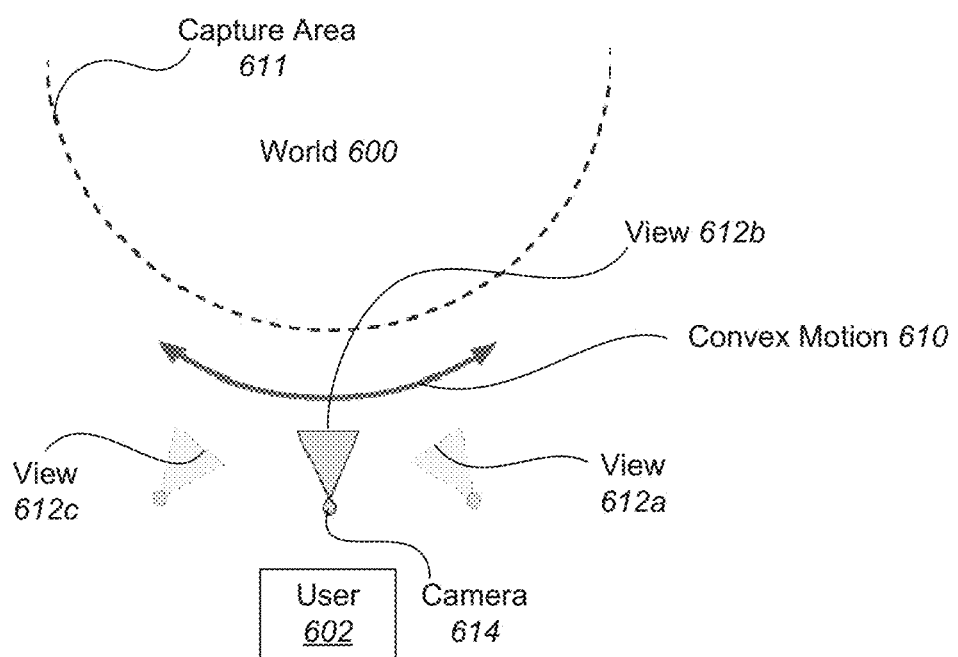

With reference to FIG. 6B, shown is an example of a back-facing, convex surround view being captured. According to various embodiments, a locally convex surround view is one in which viewing angles converge toward a single object of interest. In some examples, a locally convex surround view can provide the experience of orbiting about a point, such that a viewer can see multiple sides of the same object. This object, which may be an "object of interest," can be segmented from the surround view to become the content, and any surrounding data can be segmented to become the context. Previous technologies fail to recognize this type of viewing angle in the media-sharing landscape.

In the present example embodiment, a user 602 is using a back-facing camera 614 to capture images towards world 600, and away from user 602. The camera is moved in a convex motion 610, such that views 612a, 612b, and 612c capture various parts of capture area 611. As described above, world 600 can include an object of interest in some examples, and the convex motion 610 can orbit around this object. Views 612a, 612b, and 612c can include views of different sides of this object in these examples.

Figure 6C:
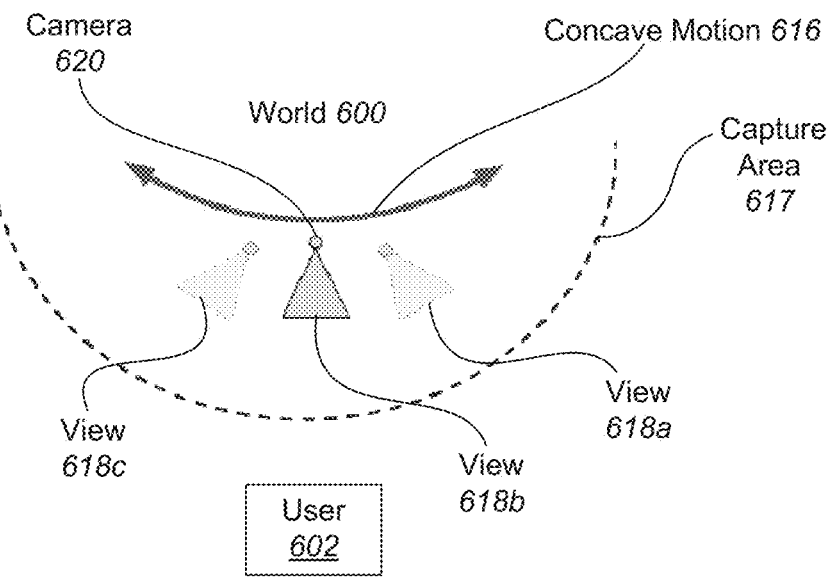

With reference to FIG. 6C, shown is an example of a front-facing, concave surround view being captured. As described in various examples, a front-facing camera refers to a device with a camera that faces towards the user, such as the camera on the front of a smart phone. For instance, front-facing cameras are commonly used to take "selfies" (i.e., self-portraits of the user).

In the present example embodiment, camera 620 is facing user 602. The camera follows a concave motion 606 such that the views 618a, 618b, and 618c diverge from each other in an angular sense. The capture area 617 follows a concave shape that includes the user at a perimeter.

Figure 6D:
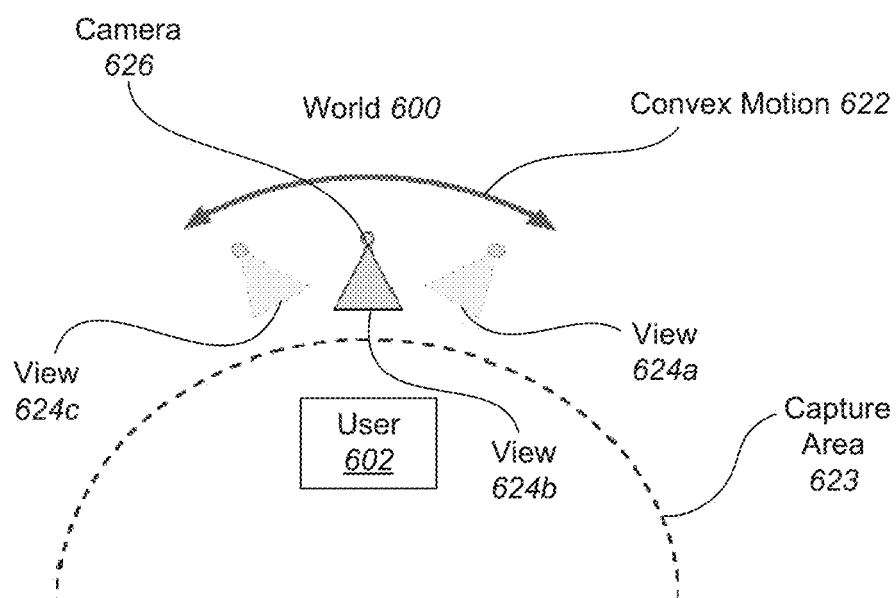

With reference to FIG. 6D, shown is an example of a front-facing, convex surround view being captured. In the present example embodiment, camera 626 is facing user 602. The camera follows a convex motion 622 such that the views 624*a*, 624*b*, and 624*c* converge towards the user 602. The capture area 617 follows a concave shape that surrounds the user 602.

Figure 6E:
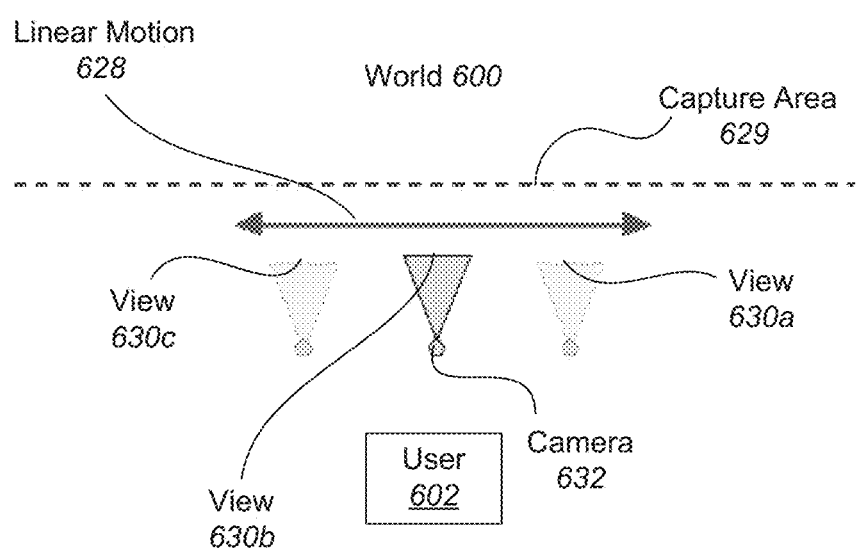

With reference to FIG. 6E, shown is an example of a back-facing, flat view being captured. In particular example embodiments, a locally flat surround view is one in which the rotation of the camera is small compared to its translation. In a locally flat surround view, the viewing angles remain roughly parallel, and the parallax effect dominates. In this type of surround view, there can also be an "object of interest", but its position does not remain fixed in the different views. Previous technologies also fail to recognize this type of viewing angle in the media-sharing landscape.

In the present example embodiment, camera 632 is facing away from user 602, and towards world 600. The camera follows a generally linear motion 628 such that the capture area 629 generally follows a line. The views 630*a*, 630*b*, and 630*c* have generally parallel lines of sight. An object viewed in multiple views can appear to have different or shifted background scenery in each view. In addition, a slightly different side of the object may be visible in different views. Using the parallax effect, information about the position and characteristics of the object can be generated in a surround view that provides more information than any one static image.

As described above, various modes can be used to capture images for a surround view. These modes, including locally concave, locally convex, and locally linear motions, can be used during capture of separate images or during continuous recording of a scene. Such recording can capture a series of images during a single session.

Figure 7A:
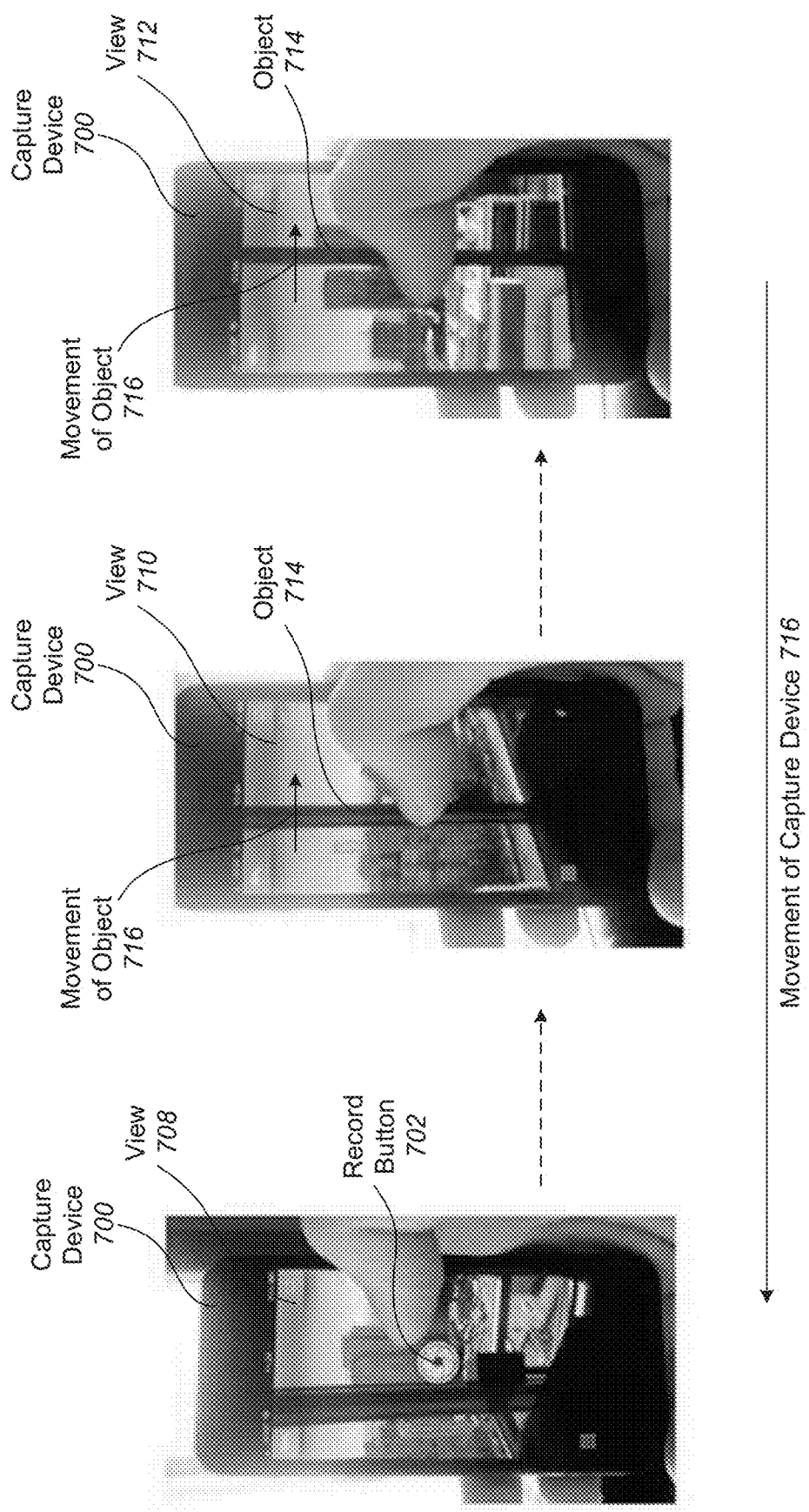
FIG. 7A illustrates one example of a process for recording data that can be used to generate a surround view.

According to various embodiments of the present disclosure, a surround view can be generated from data acquired in numerous ways. FIG. 7A illustrates one example of process for recording data that can be used to generate a surround view. In this example, data is acquired by moving a camera through space. In particular, a user taps a record button 702 on a capture device 700 to begin recording. As movement of the capture device 716 follows a generally leftward direction, an object 714 moves in a generally rightward motion across the screen, as indicated by movement of object 716. Specifically, the user presses the record button 702 in view 708, and then moves the capture device leftward in view 710. As the capture device moves leftward, object 714 appears to move rightward between views 710 and 712. In some examples, when the user is finished recording, the record button 702 can be tapped again. In other examples, the user can tap and hold the record button during recording, and release to stop recording. In the present embodiment, the recording captures a series of images that can be used to generate a surround view.

According to various embodiments, different types of panoramas can be captured in surround views, depending on the type of movement used in the capture process. In particular, dynamic panoramas, object panoramas, and selfie panoramas can be generated based on captured data. In some embodiments, the captured data can be recorded as described with regard to FIG. 7A.

Figure 7B:
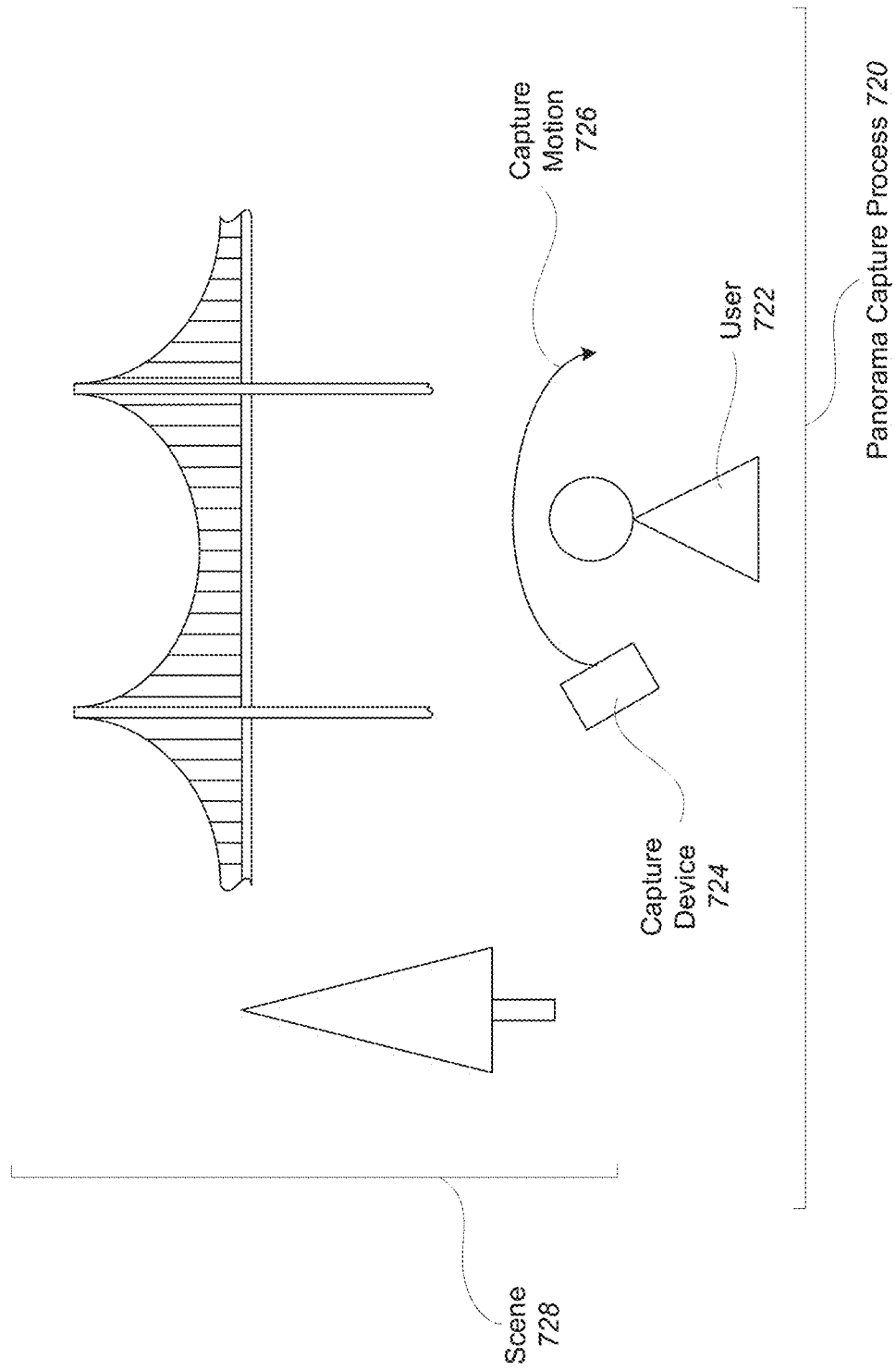
FIG. 7B illustrates one example of a dynamic panorama capture process.

FIGS. 7B-7F illustrate examples relating to dynamic panoramas that can be created with surround views. With particular reference to FIG. 7B, shown is one example of a dynamic panorama capture process 720. In the present example, a user 722 moves capture device 724 along capture motion 726. This capture motion 726 can include rotating, waving, translating, etc. the capture device 724. During this capture process, a panorama of scene 728 is generated and dynamic content within the scene is kept. For instance, moving objects are preserved within the panorama as dynamic content.

With reference to FIG. 7C, shown is a specific example of a dynamic panorama capture process 730 where a capture device 732 is rotated through an axis of rotation 734. In particular, capture device 732 is rotated about its center along an axis of rotation 734. This pure rotation captures a panorama of scene 736. According to various examples, this type of panorama can provide a "flat" scene that captures entities in the scene at a particular point in time. This "flat" scene can be a two-dimensional image, or can be an image projected on a cylinder, surface, etc.

Figure 7D:
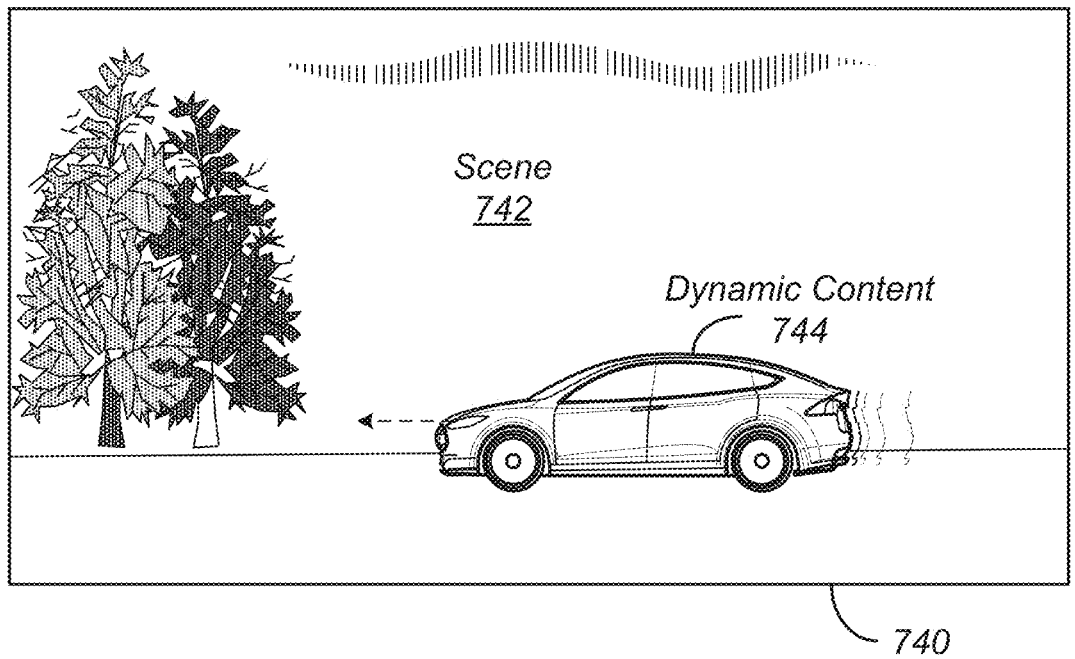
FIG. 7D illustrates one example of a dynamic panorama with dynamic content.

With reference to FIG. 7D, shown is one example of a dynamic panorama 740 with dynamic content 744. Once a panorama is captured, as described above with regard to FIGS. 7B-7C, a dynamic panorama 740 can be navigated by a user. In the present example, dynamic content 744 is animated when the user navigates through the dynamic panorama 740. For instance, as the user swipes across scene 742, the dynamic content 744 can be seen moving with respect to the scene 742.

Figure 7E:
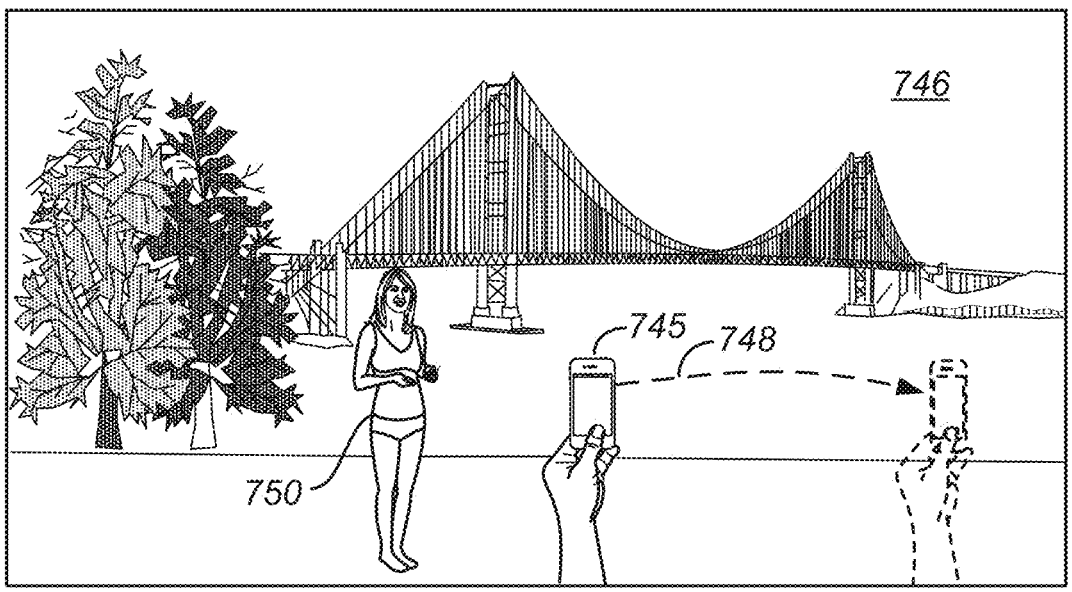
FIG. 7E illustrates one example of capturing a dynamic panorama with a 3D effect.

With reference to FIG. 7E, shown is one example of capturing a dynamic panorama with a 3D effect. In the present example, if a capture device is not rotated exactly around its camera center (as in FIG. 7C), a 3D effect can be obtained by moving different parts of the panorama at different speeds while the user navigates through the dynamic content. Although a nearby person or object 750 would create artifacts in a standard panorama capture process if the capture device is not rotated around its camera center (as in FIG. 7C), these "imperfections" can be used to create a 3D impression to the user by moving the object 750 at a different speed when swiping/navigating through a dynamic panorama. In particular, the capture device 745 shown uses a capture motion 748 that captures a distant scene 746 and a nearby person/object 750. The movements of the nearby person/object 750 can be captured as 3D motion within the surround view, while the distant scenery 746 appears to be static as the user navigates through the surround view, according to various embodiments.

Figure 7F:
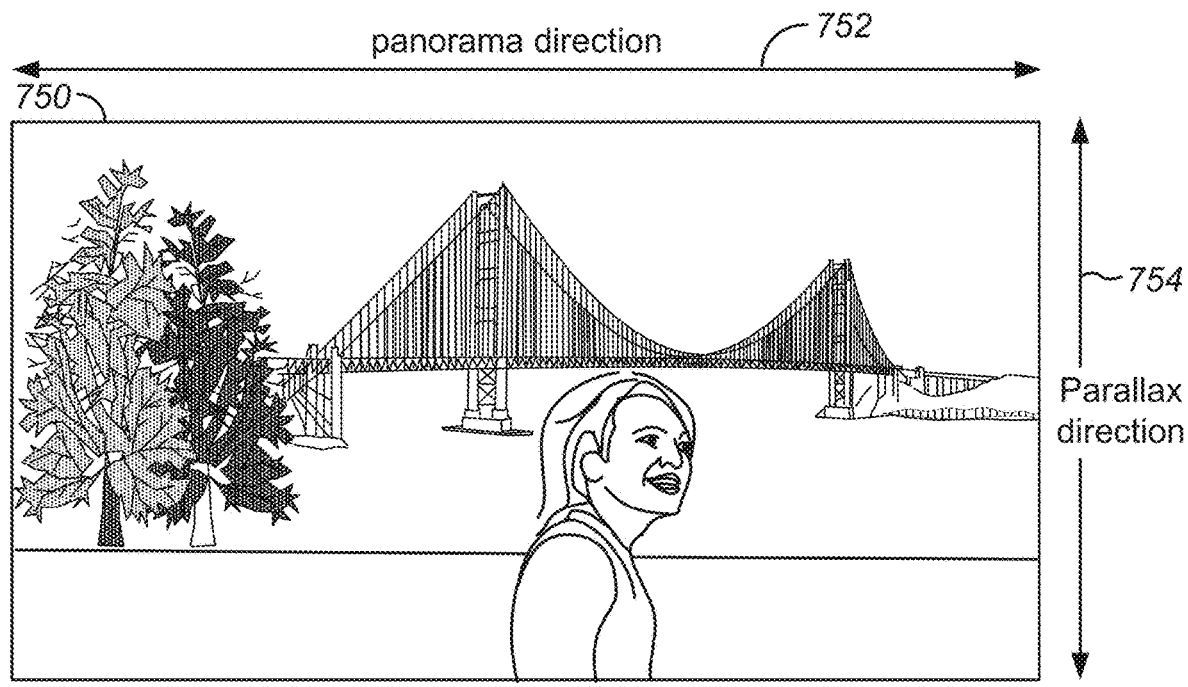
FIG. 7F illustrates one example of a dynamic panorama with parallax effect.

With reference to FIG. 7F, shown is one example of a dynamic panorama 750 with parallax effect. Three-dimensional effects can be presented by applying a parallax effect when swiping perpendicular to the panorama direction 752. In particular, when swiping perpendicular to the panorama direction, along the parallax direction 754, nearby objects are displaced along the parallax direction 754 while the scene at distance stays still or moves less than the nearby objects.

Figure 7G:
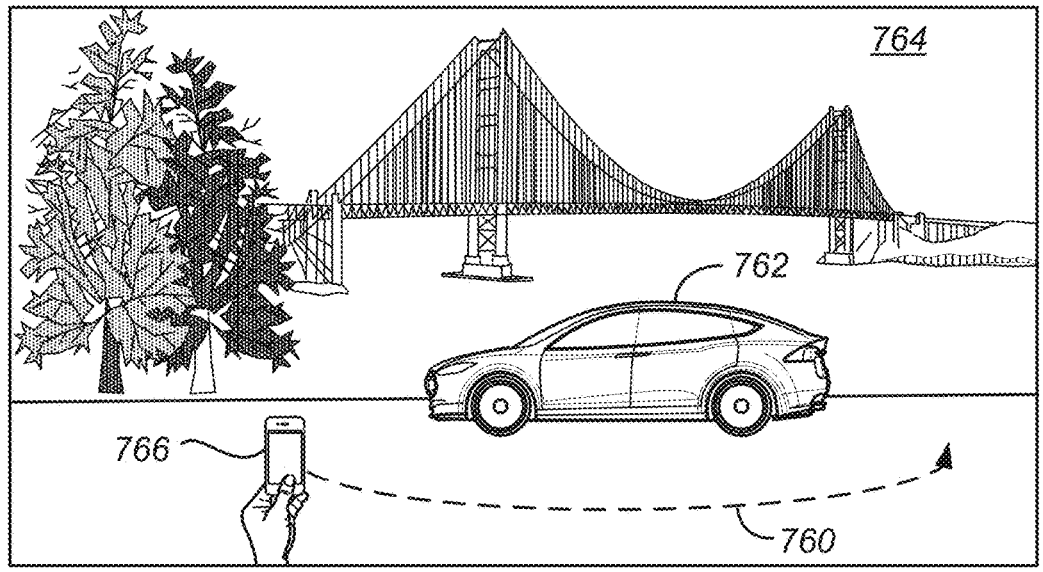
FIG. 7G illustrates one example of an object panorama capture process.

FIGS. 7G-7J illustrate examples relating to object panoramas that can be created with surround views. With reference to FIG. 7G, shown is one example of an object panorama capture process. In particular, a capture device 766 is moved around an object 762 along a capture motion 760. One particular example of a capture device 766 is a smartphone. The capture device 766 also captures a panoramic view of the background 764 as various views and angles of the object 762 are captured. The resulting surround view includes a panoramic view of object 762.

Figure 7H:
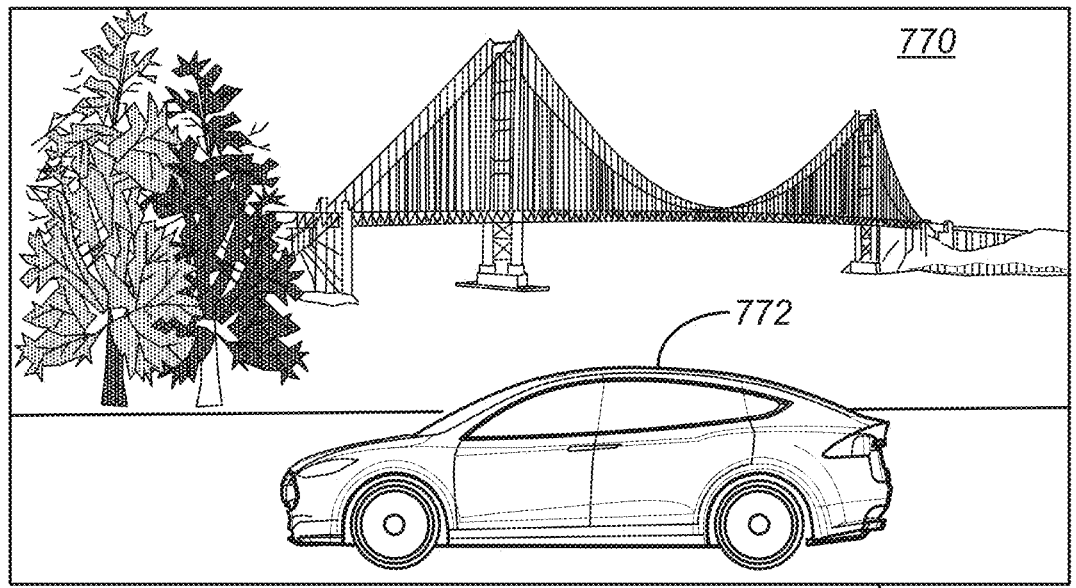
FIG. 7H illustrates one example of a background panorama with an object panorama projected on it.
Figure 17A:
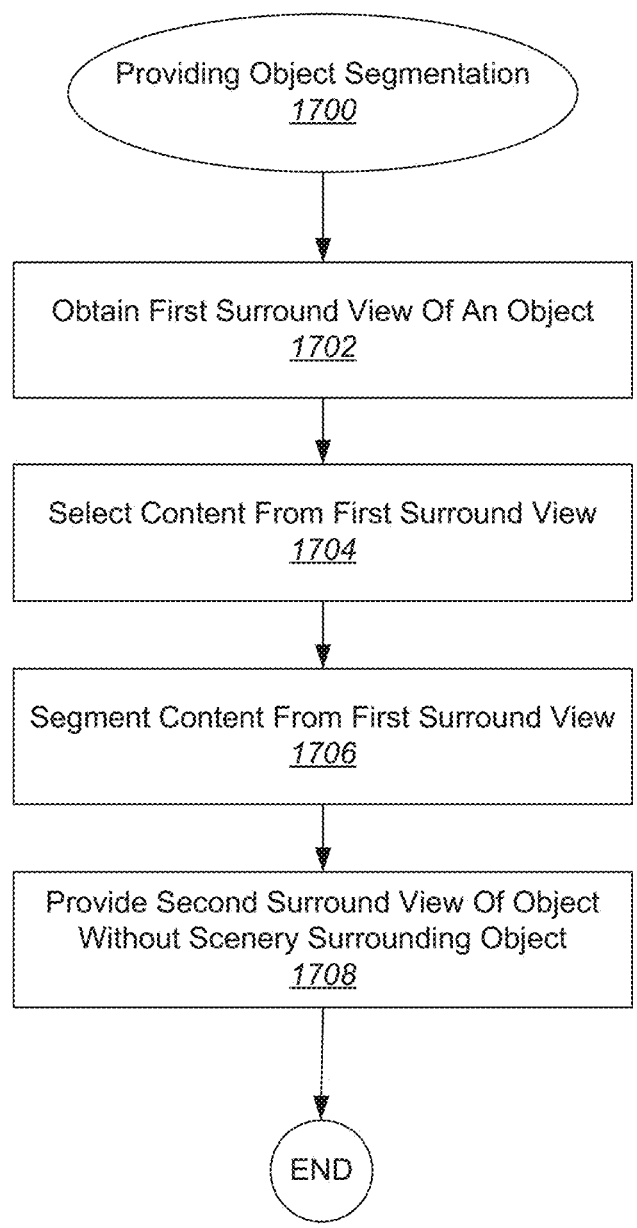
FIG. 17A illustrates one example of a process for providing object segmentation.

In some embodiments, a surround view can be created by projecting an object panorama onto a background panorama, an example of which is shown in FIG. 7H. In particular, a panorama 768 of this kind is built using background panorama 770 and projecting a foreground object panorama 772 onto the background panorama 770. In some examples, an object panorama can be segmented content taken from a surround view, as described in more detail with regard to FIGS. 17A-17B.

Figure 7I:
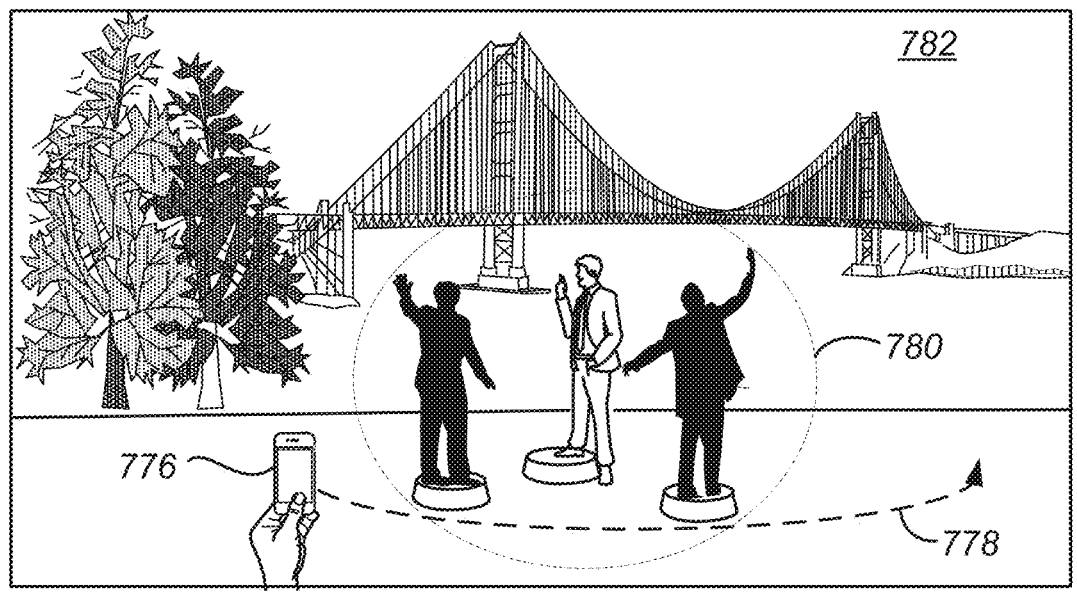
FIG. 7I illustrates one example of multiple objects constituting an object panorama.

According to various embodiments, multiple objects can make up an object panorama. With reference to FIG. 7I, shown is one example of a capture process for a group of objects 780 making up an object panorama. As shown, a capture device 776 can move around a foreground object, which can be a single object or a group of objects 780 located at a similar distance to the capture device. The capture device 776 can move around the object or group of objects 780 along a capture motion 778, such that various views and angles of the objects are captured. The resulting surround view can include an object panorama of the group of objects 780 with distant background 782 as the context.

Figure 7J:
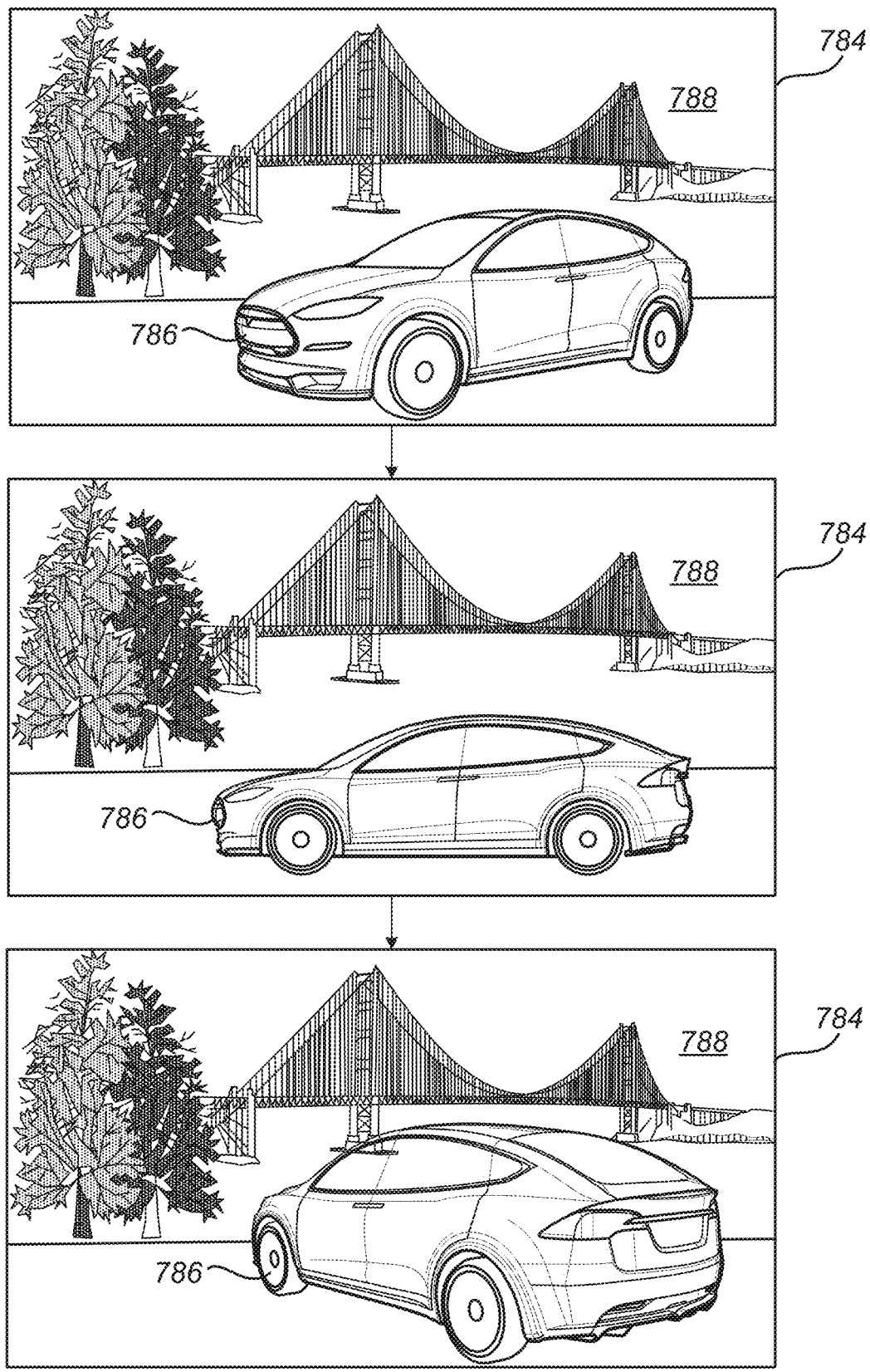
FIG. 7J illustrates one example of changing the viewing angle of an object panorama based on user navigation.

Object panoramas allow users to navigate around the object, according to various examples. With reference to FIG. 7J, shown is one example of changing the viewing angle of an object panorama based on user navigation. In this example, three views are shown of a surround view panorama 784. In the surround view panorama, a foreground object 786 is shown in front of a background panorama 788. As a user navigates the panorama by swiping or otherwise interacting with the surround view, the location of the object, the viewing angle of the object, or both can be changed. In the present example, the user can swipe in the direction of the main panorama axis. This navigation can rotate the foreground object 786 in this view. In some examples, the distant background panorama 788 may not change as the foreground object panorama rotates or otherwise moves.

According to various embodiments, object panoramas can also include parallax effects. These parallax effects can be seen when swiping/navigating perpendicular to the direction of the main panorama axis. Similar to FIG. 7F, three-dimensional effects can be presented when swiping perpendicular to the panorama direction. In particular, when swiping perpendicular to the panorama direction, along the parallax direction, nearby objects are displaced along the parallax direction while the scene at distance stays still or moves less than the nearby objects.

Although the previous examples relate to static content and background context in object panoramas, dynamic content can be integrated in the object panorama for either or both the foreground object and the background context. For instance, dynamic content can be featured in a manner similar to that described in conjunction with FIG. 7D. Similarly, dynamic context can also be included in object panoramas.

Figure 7K:
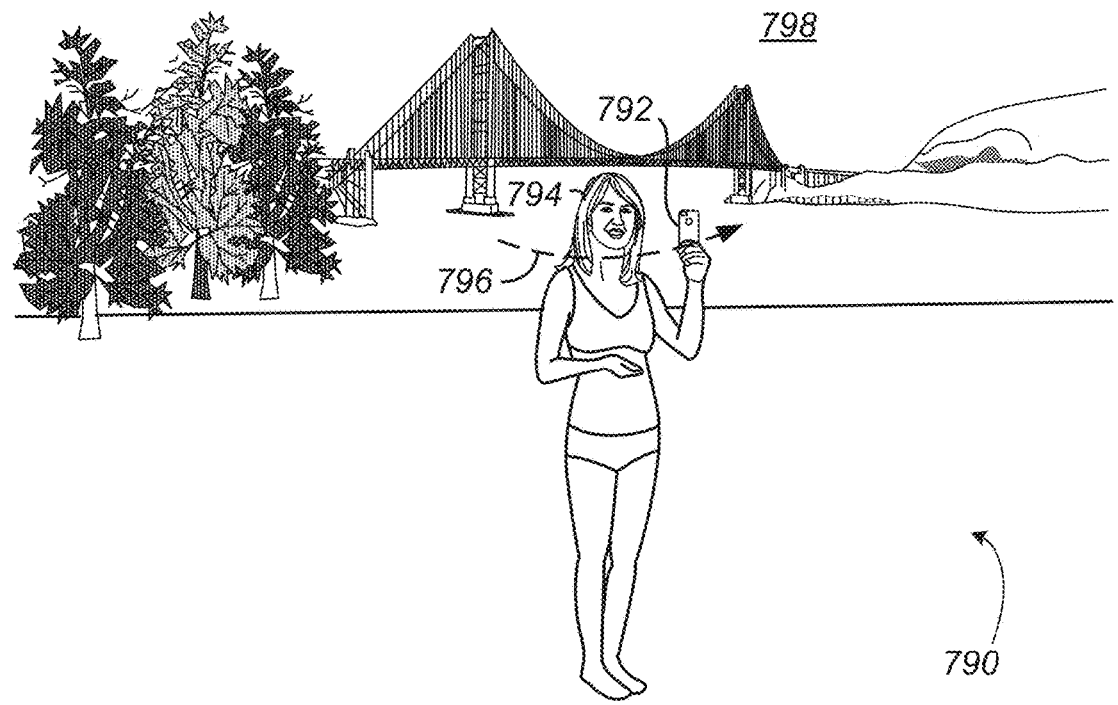
FIG. 7K illustrates one example of a selfie panorama capture process.
Figure 7L:
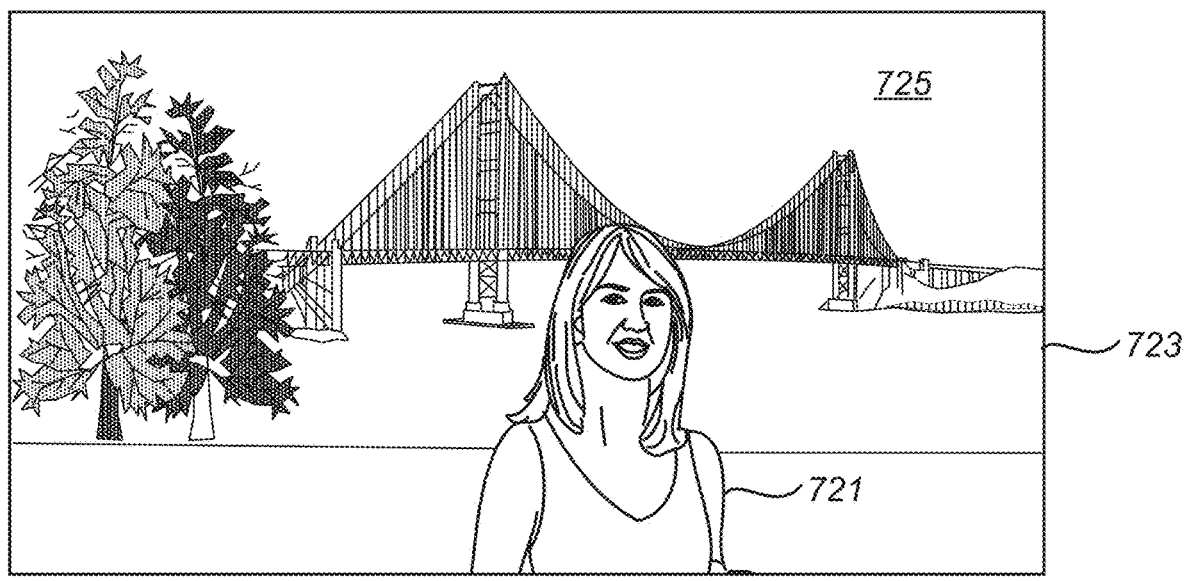
FIG. 7L illustrates one example of a background panorama with a selfie panorama projected on it.

Another type of panorama that can be included in surround views is a selfie panorama. In some examples, a selfie panorama can be segmented content taken from a surround view, as described in more detail with regard to FIGS. 17A-17B. FIGS. 7K-7L illustrate examples relating to selfie panoramas that can be created with surround views. With reference to FIG. 7K, shown is one example of a selfie panorama capture process 790. In particular, a user 794 moves a capture device 792 along capture motion 796 while capturing images of the user 794. In some examples, the capture device 792 can use a front-facing camera, such as one included on a smart phone. In other examples, a digital camera or other image recording device can be used. A selfie panorama is created with these images, with background 798 providing the context.

With reference to FIG. 7L, shown is one example of a background panorama with a selfie panorama projected on it. In the present example, a surround view panorama 723 is built from a background panorama 725 with a selfie panorama 721 projected on it. According to various examples, the selfie panorama can include a single person or multiple people, similar to the object or group of objects described in conjunction with FIG. 7I. In the present example, selfie panoramas can include dynamic content. For instance, the user can look at the capture device as the capture device moves or the user can keep still while moving the capture device. The user's movements can be captured while the selfie panorama 721 is recorded. These dynamic elements will be mapped into the panorama and can be displayed while interacting with the resulting selfie panorama 721. For instance, the user's blinks can be recorded and captured. Navigation of the selfie panorama can be done in a manner similar to that described in conjunction with FIG. 7J. In particular, the location and viewpoint of the person(s) in the selfie panorama 721 can be changed by the user by swiping/navigating in the direction of the main panorama axis. According to various embodiments, selfie panoramas 721 can also include parallax effects. These parallax effects can be seen when swiping/navigating perpendicular to the direction of the main panorama axis. In addition, similar to FIG. 7F, three-dimensional effects can be presented when swiping perpendicular to the panorama direction. In particular, when swiping perpendicular to the panorama direction, along the parallax direction, nearby objects are displaced along the parallax direction while the scene at distance stays still or moves less than the nearby objects.

Figure 7M:
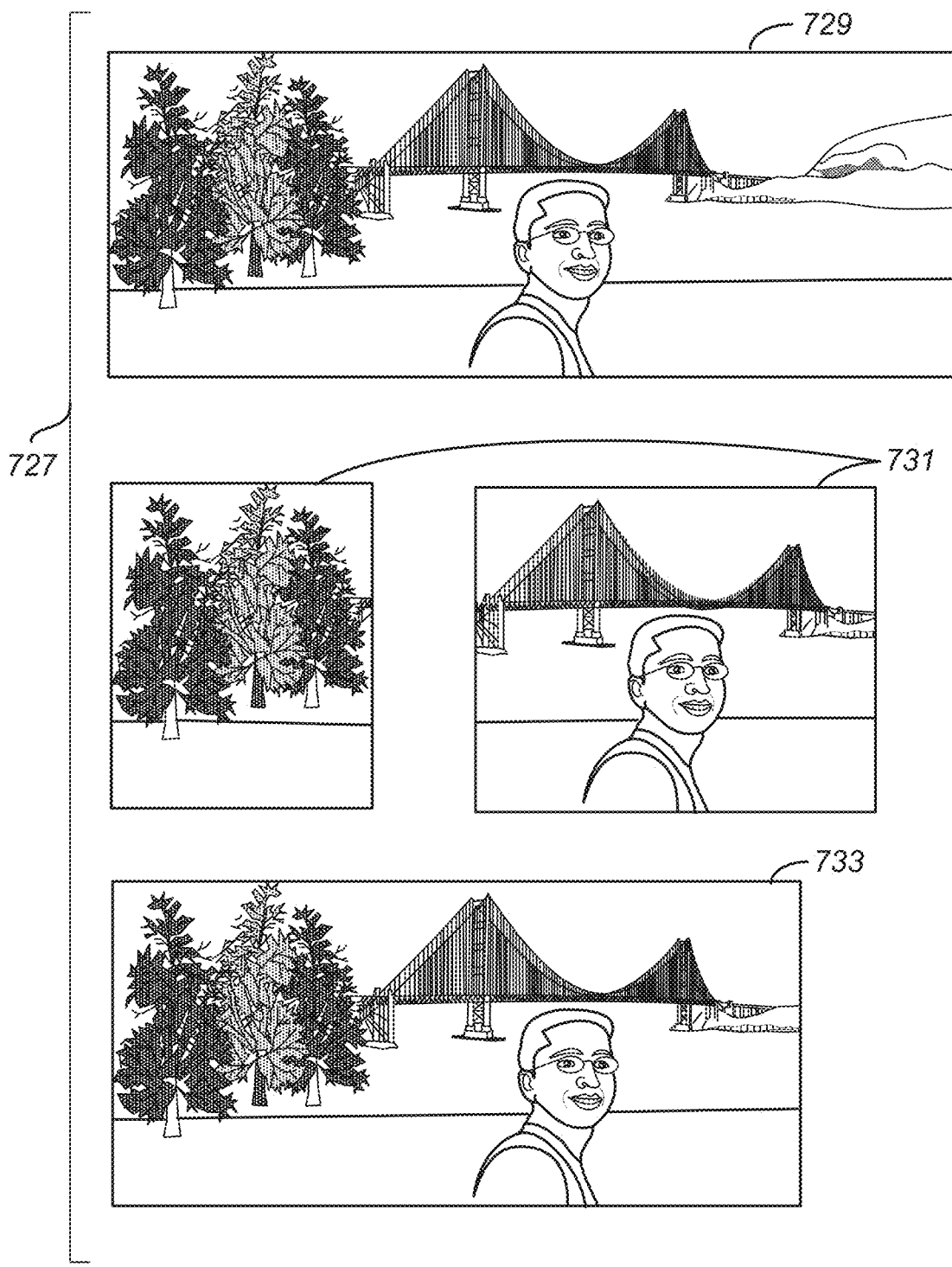
FIG. 7M illustrates one example of extended views of panoramas based on user navigation.

As described above, various types of panoramas can be created with surround views. In addition, surround views can be viewed and navigated in different ways. With reference to FIG. 7M, shown is one example of extended views of panoramas that are provided based on user navigation. In the present example, possible views 727 include a full panorama view 729, recording views 731, and extended view 733. A full panorama view 729 includes a full view of the information in a surround view. The recording views 731 include the visual data captured in images and/or recordings. The extended view 733 shows more than what is visible during one point in time in recording views 731 but less than the full panorama view 729. The portion of the panorama 729 that is visible in an extended view 733 is defined by user navigation. An extended view 733 is especially interesting for a selfie or object panorama, because the extended view follows the object/person in the panorama and shows a larger view than what was visible for the camera while recording. Essentially, more context is provided to the user in an extended view 733 during navigation of the surround view.

Figure 8:
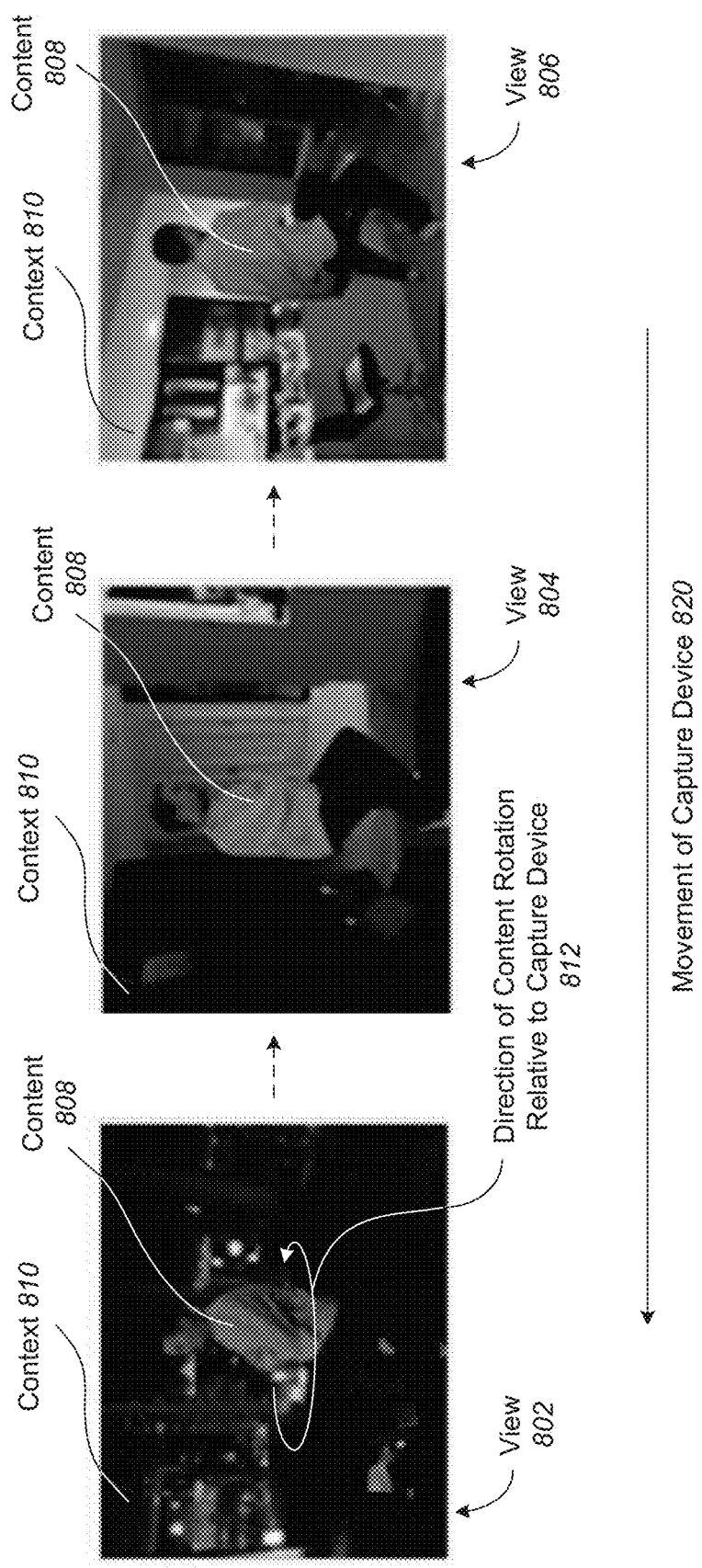
FIG. 8 illustrates an example of a surround view in which three-dimensional content is blended with a two-dimensional panoramic context.

According to various embodiments, once a series of images is captured, these images can be used to generate a surround view. With reference to FIG. 8, shown is an example of a surround view in which three-dimensional content is blended with a two-dimensional panoramic context. In the present example embodiment, the movement of capture device 820 follows a locally convex motion, such that the capture device moves around the object of interest (i.e., a person sitting in a chair). The object of interest is delineated as the content 808, and the surrounding scenery (i.e., the room) is delineated as the context 810. In the present embodiment, as the movement of the capture device 820 moves leftwards around the content 808, the direction of content rotation relative to the capture device 812 is in a rightward, counterclockwise direction. Views 802, 804, and 806 show a progression of the rotation of the person sitting in a chair relative to the room.

Figure 9:
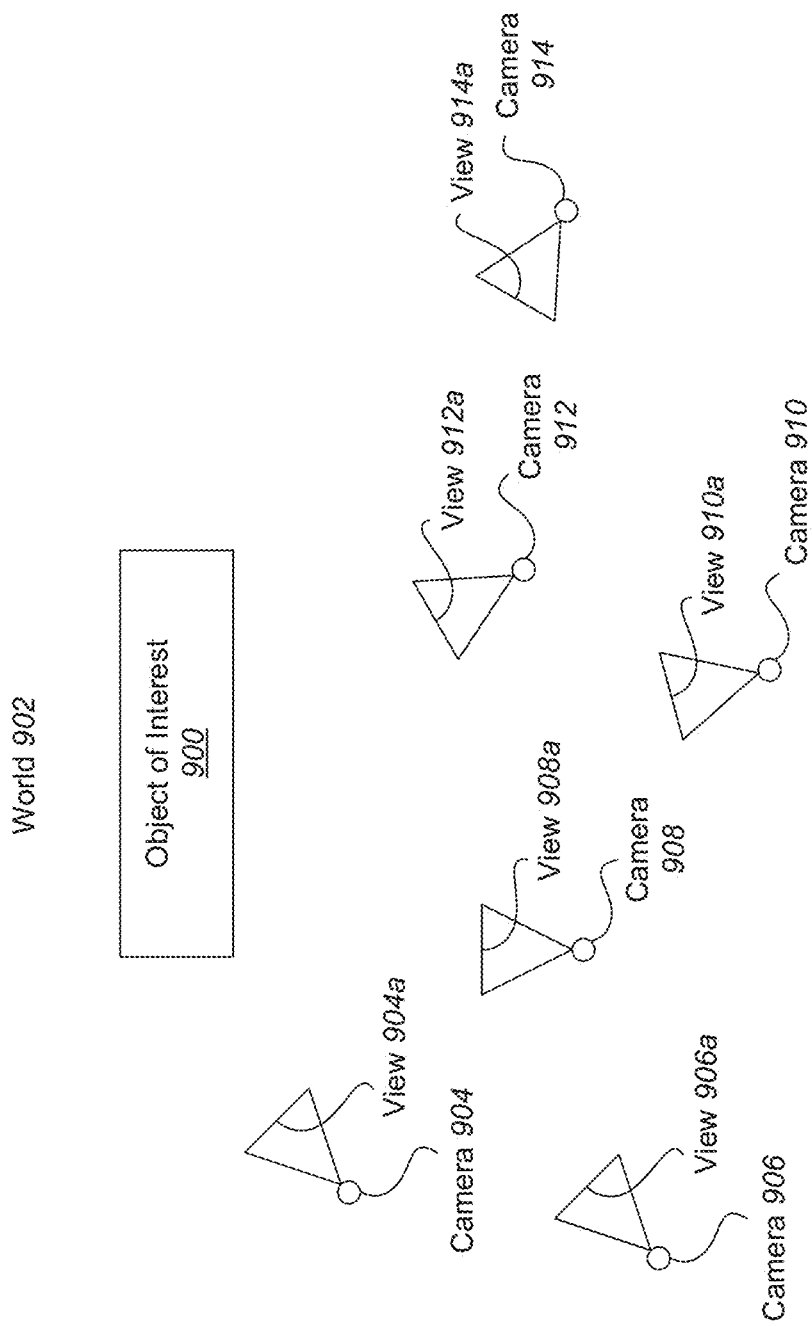
FIG. 9 illustrates one example of a space-time surround view being simultaneously recorded by independent observers.

According to various embodiments, a series of images used to generate a surround view can be captured by a user recording a scene, object of interest, etc. Additionally, in some examples, multiple users can contribute to acquiring a series of images used to generate a surround view. With reference to FIG. 9, shown is one example of a space-time surround view being simultaneously recorded by independent observers.

In the present example embodiment, cameras 904, 906, 908, 910, 912, and 914 are positioned at different locations. In some examples, these cameras 904, 906, 908, 910, 912, and 914 can be associated with independent observers. For instance, the independent observers could be audience members at a concert, show, event, etc. In other examples, cameras 904, 906, 908, 910, 912, and 914 could be placed on tripods, stands, etc. In the present embodiment, the cameras 904, 906, 908, 910, 912, and 914 are used to capture views 904a, 906a, 908a, 910a, 912a, and 914a, respectively, of an object of interest 900, with world 902 providing the background scenery. The images captured by cameras 904, 906, 908, 910, 912, and 914 can be aggregated and used together in a single surround view in some examples. Each of the cameras 904, 906, 908, 910, 912, and 914 provides a different vantage point relative to the object of interest 900, so aggregating the images from these different locations provides information about different viewing angles of the object of interest 900. In addition, cameras 904, 906, 908, 910, 912, and 914 can provide a series of images from their respective locations over a span of time, such that the surround view generated from these series of images can include temporal information and can also indicate movement over time.

Figure 10:
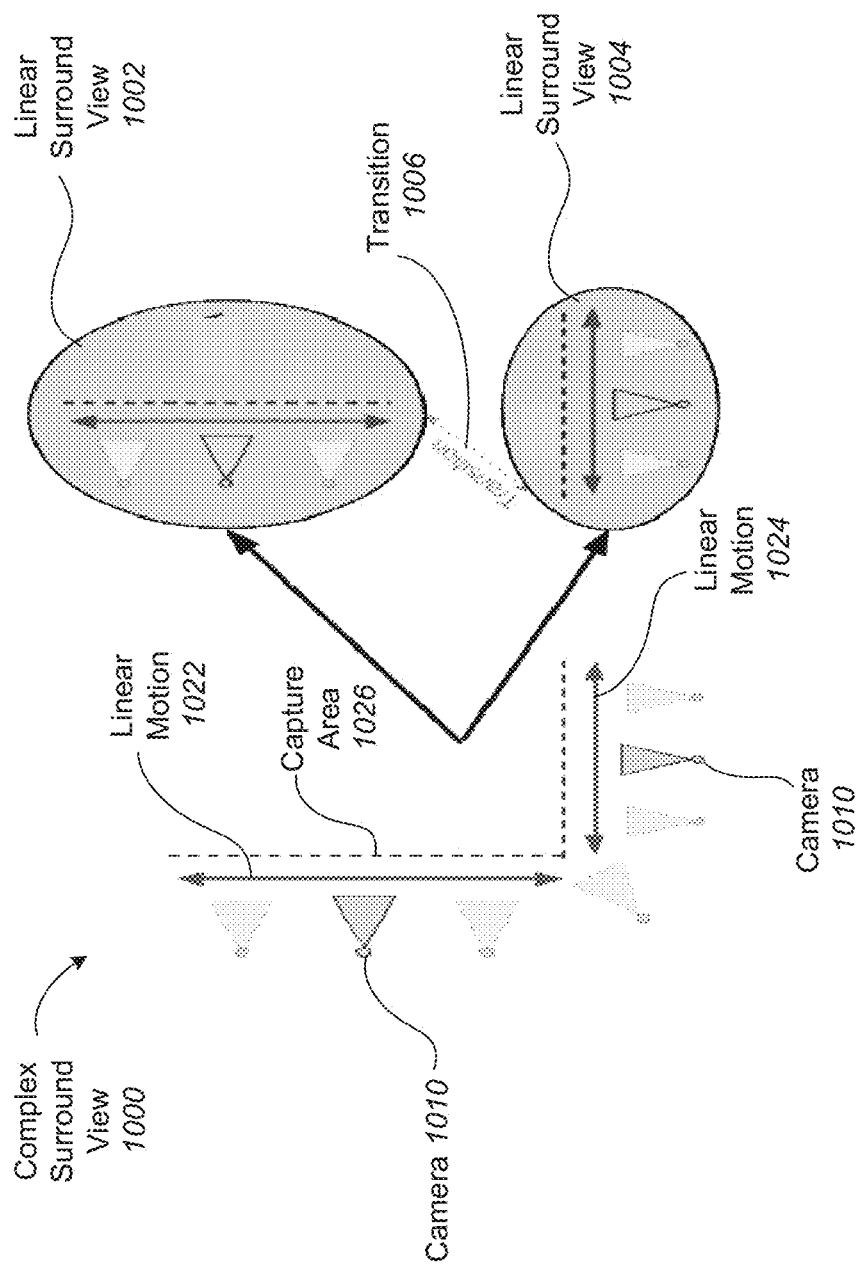
FIG. 10 illustrates one example of separation of a complex surround-view into smaller, linear parts.

As described above with regard to various embodiments, surround views can be associated with a variety of capture modes. In addition, a surround view can include different capture modes or different capture motions in the same surround view. Accordingly, surround views can be separated into smaller parts in some examples. With reference to FIG. 10, shown is one example of separation of a complex surround-view into smaller, linear parts. In the present example, complex surround view 1000 includes a capture area 1026 that follows a sweeping L motion, which includes two separate linear motions 1022 and 1024 of camera 1010. The surround views associated with these separate linear motions can be broken down into linear surround view 1002 and linear surround view 1004. It should be noted that although linear motions 1022 and 1024 can be captured sequentially and continuously in some embodiments, these linear motions 1022 and 1024 can also be captured in separate sessions in other embodiments.

In the present example embodiment, linear surround view 1002 and linear surround view 1004 can be processed independently, and joined with a transition 1006 to provide a continuous experience for the user. Breaking down motion into smaller linear components in this manner can provide various advantages. For instance, breaking down these smaller linear components into discrete, loadable parts can aid in compression of the data for bandwidth purposes. Similarly, non-linear surround views can also be separated into discrete components. In some examples, surround views can be broken down based on local capture motion. For example, a complex motion may be broken down into a locally convex portion and a linear portion. In another example, a complex motion can be broken down into separate locally convex portions. It should be recognized that any number of motions can be included in a complex surround view 1000, and that a complex surround view 1000 can be broken down into any number of separate portions, depending on the application.

Figure 11:
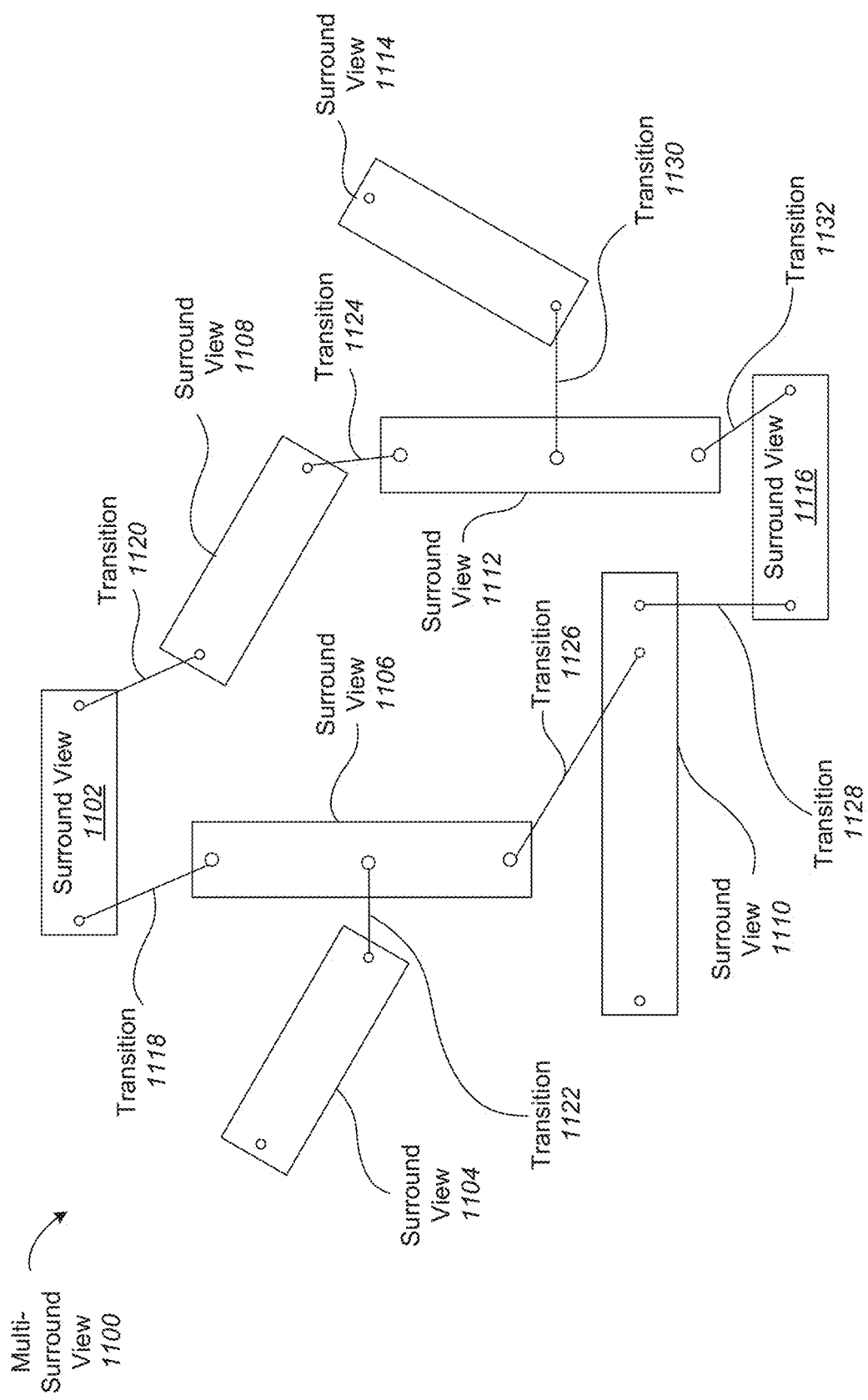
FIG. 11 illustrates one example of a combination of multiple surround views into a multi-surround view.

Although in some applications, it is desirable to separate complex surround views, in other applications it is desirable to combine multiple surround views. With reference to FIG. 11, shown is one example of a graph that includes multiple surround views combined into a multi-surround view 1100. In this example, the rectangles represent various surround views 1102, 1104, 1106, 1108, 1110, 1112, 1114, and 1116, and the length of each rectangle indicates the dominant motion of each surround view. Lines between the surround views indicate possible transitions 1118, 1120, 1122, 1124, 1126, 1128, 1130, and 1132 between them.

In some examples, a surround view can provide a way to partition a scene both spatially and temporally in a very efficient manner. For very large scale scenes, multi-surround view 1100 data can be used. In particular, a multi-surround view 1100 can include a collection of surround views that are connected together in a spatial graph. The individual surround views can be collected by a single source, such as a single user, or by multiple sources, such as multiple users. In addition, the individual surround views can be captured in sequence, in parallel, or totally uncorrelated at different times. However, in order to connect the individual surround views, there must be some overlap of content, context, or location, or of a combination of these features. Accordingly, any two surround views would need to have some overlap in content, context, and/or location to provide a portion of a multi-surround view 1100. Individual surround views can be linked to one another through this overlap and stitched together to form a multi-surround view 1100. According to various examples, any combination of capture devices with either front, back, or front and back cameras can be used.

In some embodiments, multi-surround views 1100 can be generalized to more fully capture entire environments. Much like "photo tours" collect photographs into a graph of discrete, spatially-neighboring components, multiple surround views can be combined into an entire scene graph. In some examples, this can be achieved using information obtained from but not limited to: image matching/tracking, depth matching/tracking, IMU, user input, and/or GPS. Within such a graph or multi-surround view, a user can switch between different surround views either at the end points of the recorded motion or wherever there is an overlap with other surround views in the graph. One advantage of multi-surround views over "photo tours" is that a user can navigate the surround views as desired and much more visual information can be stored in surround views. In contrast, traditional "photo tours" typically have limited views that can be shown to the viewer either automatically or by allowing the user to pan through a panorama with a computer mouse or keystrokes.

According to various embodiments, a surround view is generated from a set of images. These images can be captured by a user intending to produce a surround view or retrieved from storage, depending on the application. Because a surround view is not limited or restricted with respect to a certain amount of visibility, it can provide significantly more visual information about different views of an object or scene. More specifically, although a single viewpoint may be ambiguous to adequately describe a three-dimensional object, multiple views of the object can provide more specific and detailed information. These multiple views can provide enough information to allow a visual search query to yield more accurate search results. Because a surround view provides views from many sides of an object, distinctive views that are appropriate for search can be selected from the surround view or requested from a user if a distinctive view is not available. For instance, if the data captured or otherwise provided is not sufficient to allow recognition or generation of the object or scene of interest with a sufficiently high certainty, a capturing system can guide a user to continue moving the capturing device or provide additional image data. In particular embodiments, if a surround view is determined to need additional views to produce a more accurate model, a user may be prompted to provide additional images.

Figure 12:
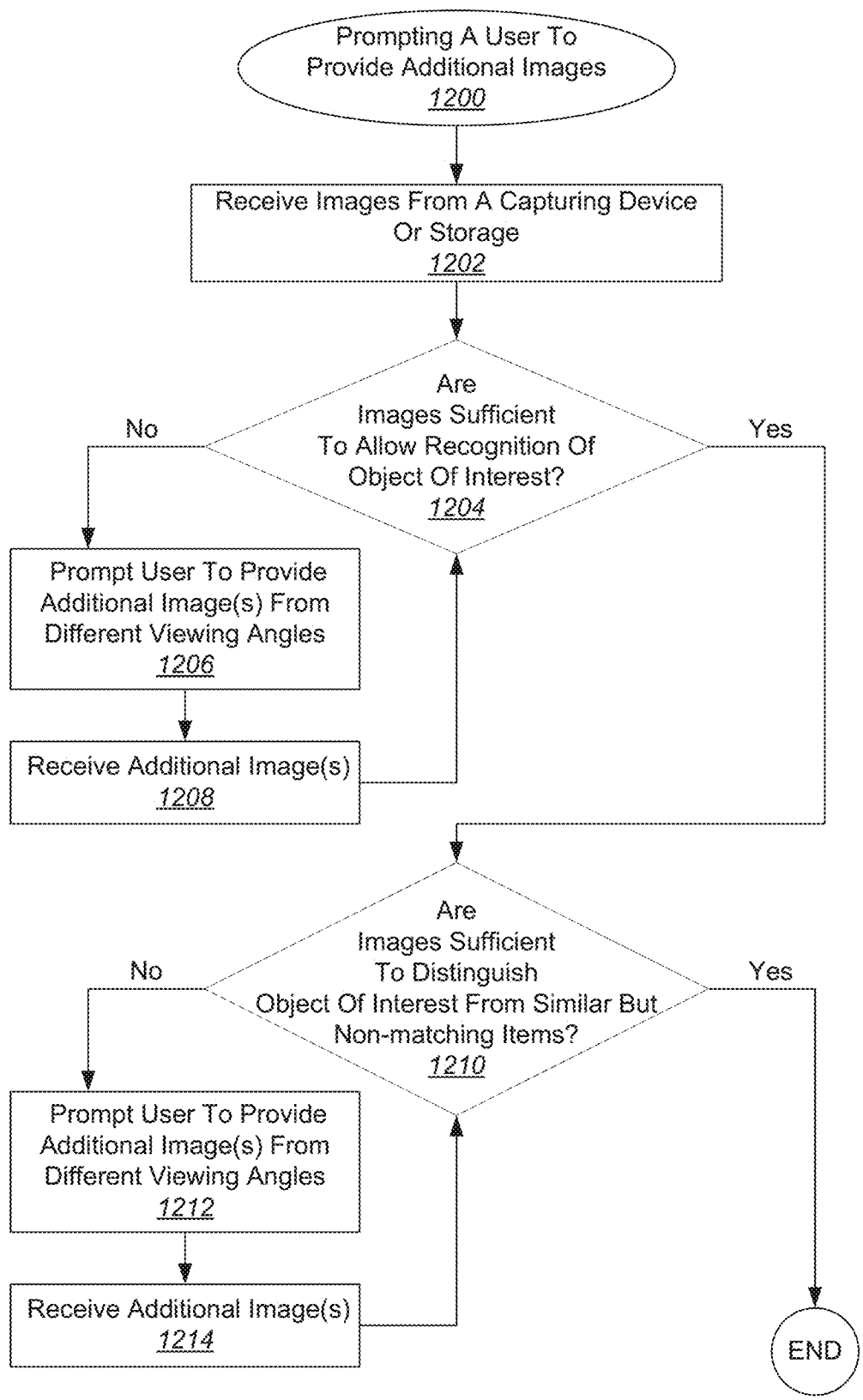
FIG. 12 illustrates one example of a process for prompting a user for additional views of an object of interest to provide a more accurate surround view.

With reference to FIG. 12, shown is one example of a process for prompting a user for additional images 1200 to provide a more accurate surround view. In the present example, images are received from a capturing device or storage at 1202. Next, a determination is made whether the images provided are sufficient to allow recognition of an object of interest at 1204. If the images are not sufficient to allow recognition of an object of interest, then a prompt is given for the user to provide additional image(s) from different viewing angles at 1206. In some examples, prompting a user to provide one or more additional images from different viewing angles can include suggesting one or more particular viewing angles. If the user is actively capturing images, the user can be prompted when a distinct viewing angle is detected in some instances. According to various embodiments, suggestions to provide one or more particular viewing angles can be determined based on the locations associated with the images already received. In addition, prompting a user to provide one or more additional images from different viewing angles can include suggesting using a particular capture mode such as a locally concave surround view, a locally convex surround view, or a locally flat surround view, depending on the application.

Next, the system receives these additional image(s) from the user at 1208. Once the additional images are received, a determination is made again whether the images are sufficient to allow recognition of an object of interest. This process continues until a determination is made that the images are sufficient to allow recognition of an object of interest. In some embodiments, the process can end at this point and a surround view can be generated.

Optionally, once a determination is made that the images are sufficient to allow recognition of an object of interest, then a determination can then be made whether the images are sufficient to distinguish the object of interest from similar but non-matching items at 1210. This determination can be helpful especially when using visual search, examples of which are described in more detail below with regards to FIGS. 19-22. In particular, an object of interest may have distinguishing features that can be seen from particular angles that require additional views. For instance, a portrait of a person may not sufficiently show the person's hairstyle if only pictures are taken from the front angles. Additional pictures of the back of the person may need to be provided to determine whether the person has short hair or just a pulled-back hairstyle. In another example, a picture of a person wearing a shirt might warrant additional prompting if it is plain on one side and additional views would show prints or other insignia on the sleeves or back, etc.

In some examples, determining that the images are not sufficient to distinguish the object of interest from similar but non-matching items includes determining that the number of matching search results exceeds a predetermined threshold. In particular, if a large number of search results are found, then it can be determined that additional views may be needed to narrow the search criteria. For instance, if a search of a mug yields a large number of matches, such as more than 20, then additional views of the mug may be needed to prune the search results.

If the images are not sufficient to distinguish the object of interest from similar but non-matching items at 1210, then a prompt is given for the user to provide additional image(s) from different viewing angles at 1212. In some examples, prompting a user to provide one or more additional images from different viewing angles can include suggesting one or more particular viewing angles. If the user is actively capturing images, the user can be prompted when a distinct viewing angle is detected in some instances. According to various embodiments, suggestions to provide one or more particular viewing angles can be determined based on the locations associated with the images already received. In addition, prompting a user to provide one or more additional images from different viewing angles can include suggesting using a particular capture mode such as a locally concave surround view, a locally convex surround view, or a locally flat surround view, depending on the application.

Next, the system receives these additional image(s) from the user at 1214. Once the additional images are received, a determination is made again whether the images are sufficient to distinguish the object of interest from similar but non-matching items. This process continues until a determination is made that the images are sufficient to distinguish the object of interest from similar but non-matching items. Next, the process ends and a surround view can be generated from the images.

Figure 13B:
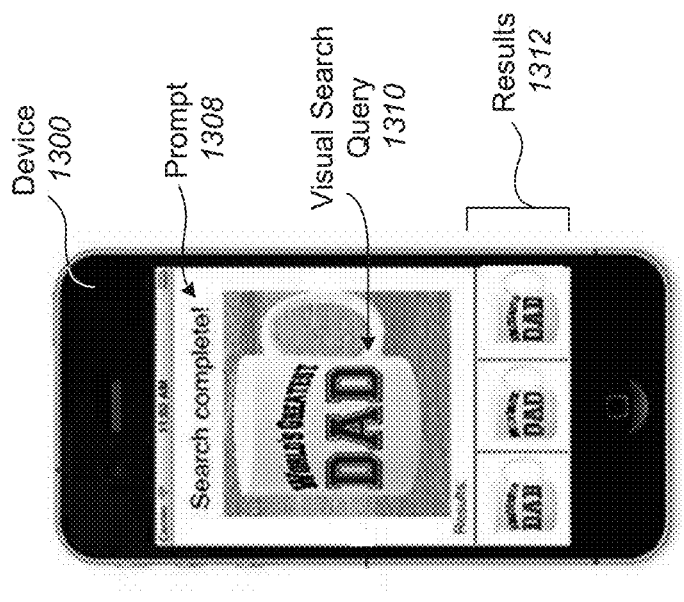
FIGS. 13A-13B illustrate an example of prompting a user for additional views of an object to be searched.
Figure 13A:
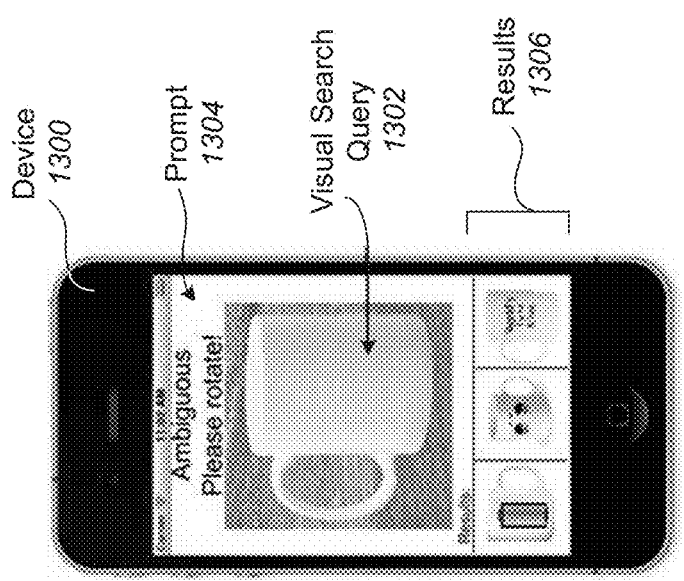

With reference to FIGS. 13A-13B, shown are examples of prompts requesting additional images from a user in order to produce a more accurate surround view. In particular, a device 1300 is shown with a search screen. In FIG. 13A, an example of a visual search query 1302 is provided. This visual search query 1302 includes an image of a white mug. The results 1306 include various mugs with a white background. In particular embodiments, if a large amount of search results is found, a prompt 1304 can be provided to request additional image data from the user for the search query.

In FIG. 13B, an example of another visual search query 1310 is provided in response to prompt 1304 in FIG. 13A. This visual search query 1310 provides a different viewpoint of the object and provides more specific information about the graphics on the mug. This visual search query 1310 yields new results 1312 that are more targeted and accurate. In some examples, an additional prompt 1308 can be provided to notify the user that the search is complete.

Once a surround view is generated, it can be used in various applications, in particular embodiments. One application for a surround view includes allowing a user to navigate a surround view or otherwise interact with it. According to various embodiments, a surround view is designed to simulate the feeling of being physically present in a scene as the user interacts with the surround view. This experience depends not only on the viewing angle of the camera, but on the type of surround view that is being viewed. Although a surround view does not need to have a specific fixed geometry overall, different types of geometries can be represented over a local segment of a surround view such as a concave, convex, and flat surround view, in particular embodiments.

In particular example embodiments, the mode of navigation is informed by the type of geometry represented in a surround view. For instance, with concave surround views, the act of rotating a device (such as a smartphone, etc.) can mimic that of rotating a stationary observer who is looking out at a surrounding scene. In some applications, swiping the screen in one direction can cause the view to rotate in the opposite direction. This effect is akin to having a user stand inside a hollow cylinder and pushing its walls to rotate around the user. In other examples with convex surround views, rotating the device can cause the view to orbit in the direction it is leaning into, such that the object of interest remains centered. In some applications, swiping the screen in one direction causes the viewing angle to rotate in the same direction: this creates the sensation of rotating the object of interest about its axis or having the user rotate around the object. In some examples with flat views, rotating or moving a device can cause the view to translate in the direction of the device's movement. In addition, swiping the screen in one direction can cause the view to translate in the opposite direction, as if pushing foreground objects to the side.

In some examples, a user may be able to navigate a multi-surround view or a graph of surround views in which individual surround views can be loaded piece by piece and further surround views may be loaded when necessary (e.g. when they are adjacent to/overlap the current surround view and/or the user navigates towards them). If the user reaches a point in a surround view where two or more surround views overlap, the user can select which of those overlapping surround views to follow. In some instances, the selection of which surround view to follow can be based on the direction the user swipes or moves the device.

Figure 14:
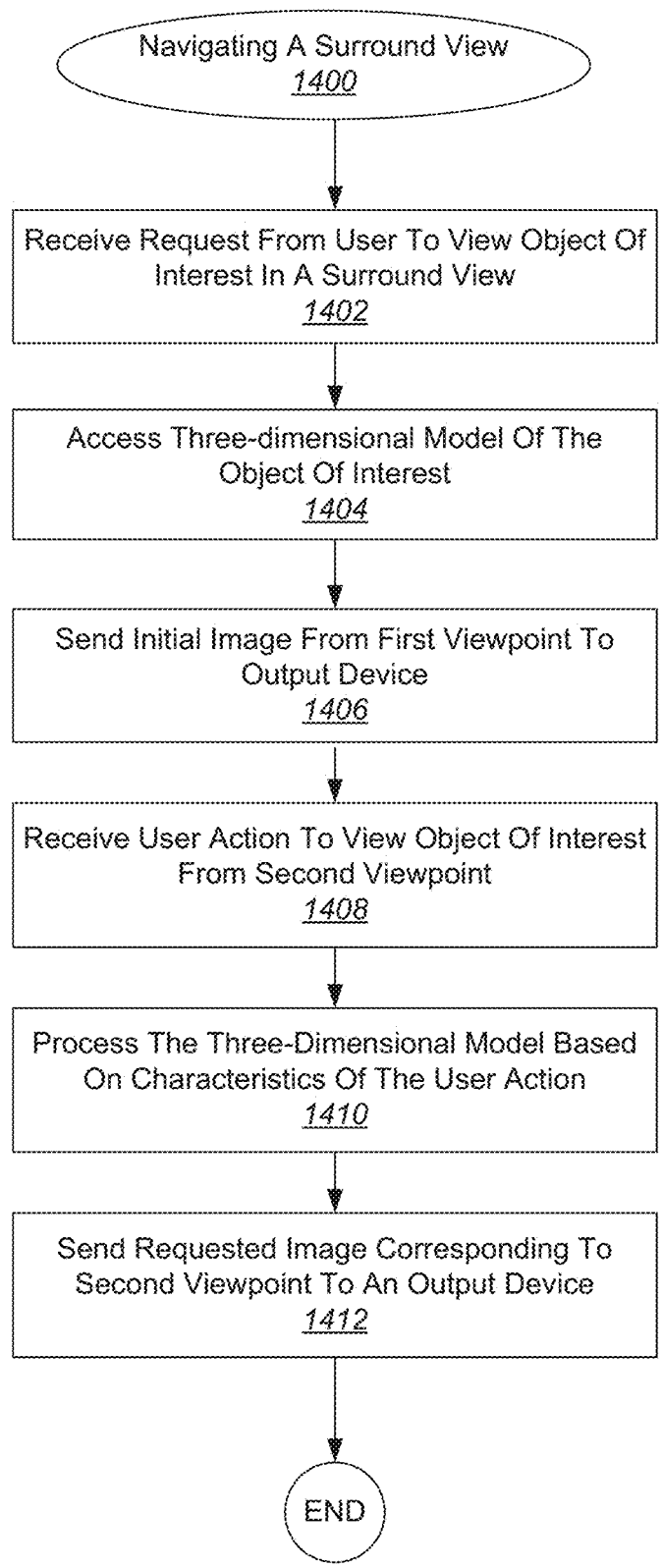
FIG. 14 illustrates one example of a process for navigating a surround view.

With reference to FIG. 14, shown is one example of a process for navigating a surround view 1400. In the present example, a request is received from a user to view an object of interest in a surround view at 1402. According to various embodiments, the request can also be a generic request to view a surround view without a particular object of interest, such as when viewing a landscape or panoramic view. Next, a three-dimensional model of the object is accessed at 1404. This three-dimensional model can include all or a portion of a stored surround view. For instance, the three-dimensional model can be a segmented content view in some applications. An initial image is then sent from a first viewpoint to an output device at 1406. This first viewpoint serves as a starting point for viewing the surround view on the output device.

In the present embodiment, a user action is then received to view the object of interest from a second viewpoint. This user action can include moving (e.g. tilting, translating, rotating, etc.) an input device, swiping the screen, etc., depending on the application. For instance, the user action can correspond to motion associated with a locally concave surround view, a locally convex surround view, or a locally flat surround view, etc. According to various embodiments, an object view can be rotated about an axis by rotating a device about the same axis. For example, the object view can be rotated along a vertical axis by rotating the device about the vertical axis. Based on the characteristics of the user action, the three-dimensional model is processed at 1410. For instance, movement of the input device can be detected and a corresponding viewpoint of the object of interest can be found. Depending on the application, the input device and output device can both be included in a mobile device, etc. In some examples, the requested image corresponds to an image captured prior to generation of the surround view. In other examples the requested image is generated based on the three-dimensional model (e.g. by interpolation, etc.). An image from this viewpoint can be sent to the output device at 1412. In some embodiments, the selected image can be provided to the output device along with a degree of certainty as to the accuracy of the selected image. For instance, when interpolation algorithms are used to generate an image from a particular viewpoint, the degree of certainty can vary and may be provided to a user in some applications. In other examples, a message can be provided to the output device indicating if there is insufficient information in the surround view to provide the requested images.

In some embodiments, intermediate images can be sent between the initial image at 1406 and the requested image at 1412. In particular, these intermediate images can correspond to viewpoints located between a first viewpoint associated with the initial image and a second viewpoint associated with the requested image. Furthermore, these intermediate images can be selected based on the characteristics of the user action. For instance, the intermediate images can follow the path of movement of the input device associated with the user action, such that the intermediate images provide a visual navigation of the object of interest.

Figure 15:
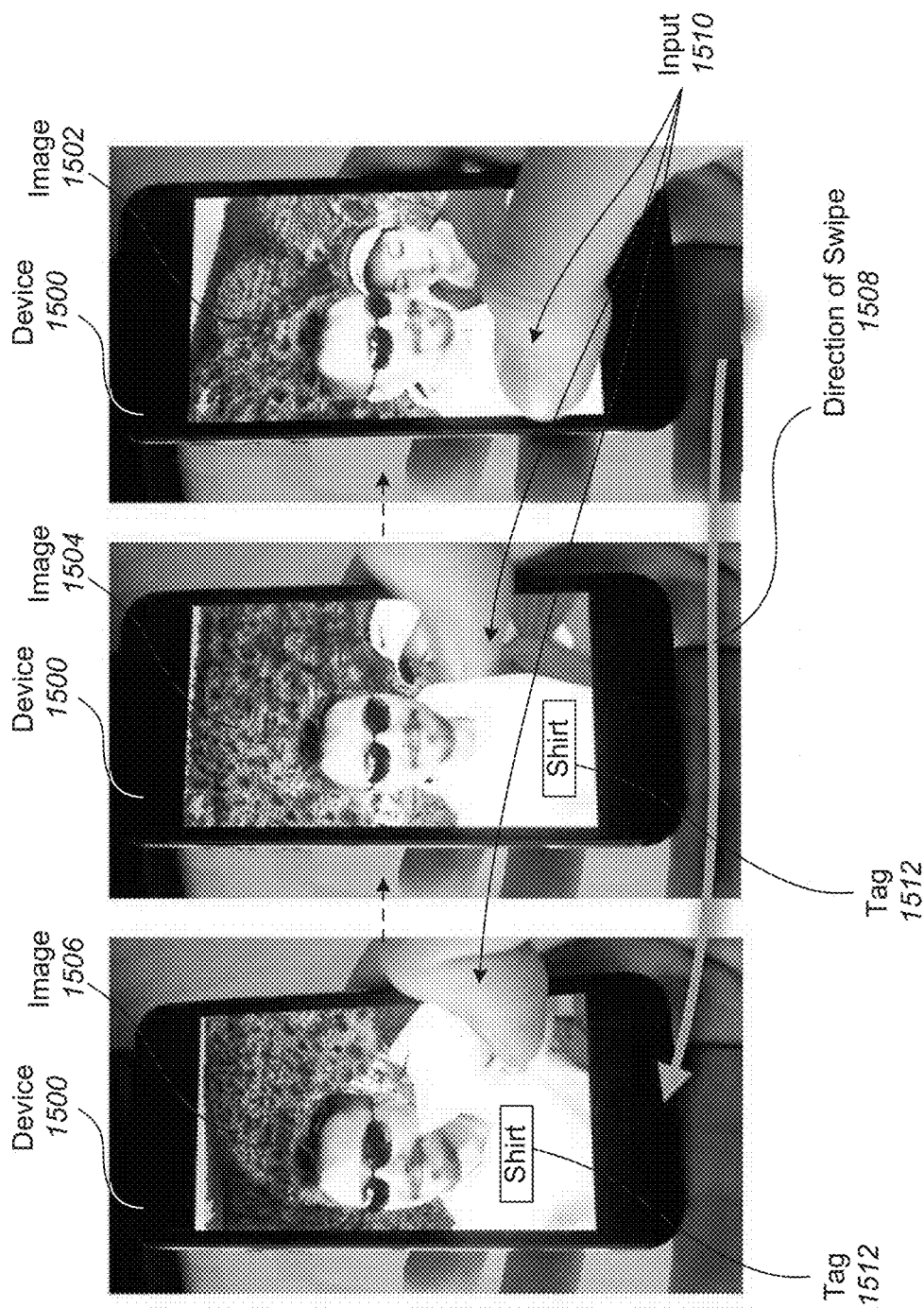
FIG. 15 illustrates an example of swipe-based navigation of a surround view.

With reference to FIG. 15, shown is an example of swipe-based navigation of a surround view. In the present example, three views of device 1500 are shown as a user navigates a surround view. In particular, the input 1510 is a swipe by the user on the screen of device 1500. As the user swipes from right to left, the object of interest moves relative to the direction of swipe 1508. Specifically, as shown by the progression of images 1506, 1504, and 1502, the input 1510 allows the user to rotate around the object of interest (i.e., the man wearing sunglasses).

In the present example, a swipe on a device screen can correspond to rotation of a virtual view. However, other input modes can be used in other example embodiments. For instance, a surround view can also be navigated by tilting a device in various directions and using the device orientation direction to guide the navigation in the surround view. In another example, the navigation can also be based on movement of the screen by the user. Accordingly, a sweeping motion can allow the user to see around the surround view as if the viewer were pointing the device at the object of interest. In yet another example, a website can be used to provide interaction with the surround view in a web-browser. In this example, swipe and/or motion sensors may be unavailable, and can be replaced by interaction with a mouse or other cursor or input device.

According to various embodiments, surround views can also include tagging that can be viewed during navigation. Tagging can provide identification for objects, people, products, or other items within a surround view. In particular, tagging in a surround view is a very powerful tool for presenting products to users/customers and promoting those elements or items. In one example, a tag 1512 can follow the location of the item that is tagged, such that the item can be viewed from different angles while the tag locations still stay valid. The tags 1512 can store different types of data, such as a name (e.g. user name, product name, etc.), a description, a link to a website/webshop, price information, a direct option for purchasing a tagged object, a list of similar objects, etc. In some examples, the tags can become visible when a user selects an item in a surround view. In other examples, the tags can be automatically displayed. In addition, additional information can be accessed by selecting a tag 1512 in some applications. For instance, when a user selects a tag, additional information can be displayed on screen such as a description, link, etc.

In some embodiments, a user can create a tag 1512 by selecting either a point or a region in one viewpoint of a surround view. This point or region is then automatically propagated into other viewpoints. Alternatively, tag locations can be automatically suggested to the user by an application based on different information, such as face detection, object detection, objects in focus, objects that are identified as foreground, etc. In some examples, object detection can be made from a database of known objects or object types/classes.

In the present example, tag 1512 identifies a shirt in the surround view. Of course, any text or title can be included, such as a name, brand, etc. This tag 1512 can be mapped to a particular location in the surround view such that the tag is associated with the same location or point in any view selected. As described above, tag 1512 can include additional information that can be accessed by tapping or otherwise selecting the tag, in some embodiments. Although tagging is shown in FIG. 15, it should be noted that surround views may not include tagging in some examples.

Figure 16A:
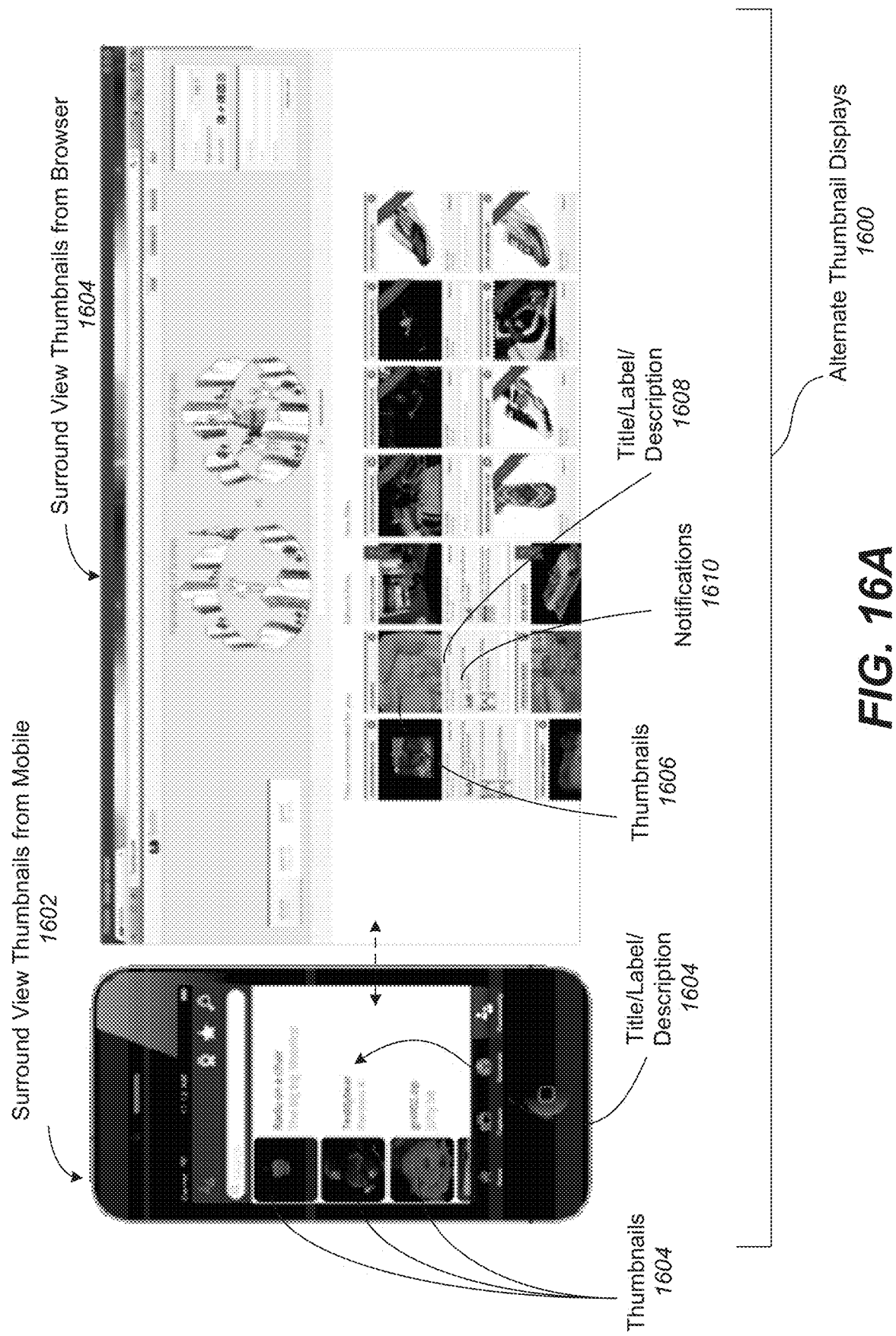
FIG. 16A illustrates examples of a sharing service for surround views, as shown on a mobile device and browser.

According to various embodiments, surround views can be stored and accessed in various ways. In addition, surround views can be used in many applications. With reference to FIG. 16A, shown are examples of a sharing service for surround views on a mobile device 1602 and browser 1604. The mobile device 1602 and browser 1604 are shown as alternate thumbnail displays 1600, because the surround views can be accessed by either interface, depending on the application. According to various embodiments, a set of surround views can be presented to a user in different ways, including but not limited to: a gallery, a feed, and/or a website. For instance, a gallery can be used to present a collection of thumbnails to a user. These thumbnails can be selected from the surround views either by the user or automatically. In some examples, the size of the thumbnails can vary based on characteristics such as, but not limited to: an automatically selected size that is based on the structure and size of the content it contains; and/or the popularity of the surround view. In another example, a feed can be used to present surround views using interactive thumbnails.

In the present example, surround view thumbnails from a mobile device 1602 include thumbnails 1604 and title/label/description 1604. The thumbnails 1604 can include an image from the surround view. The title/label/description 1604 can include information about the surround view such as title, file name, description of the content, labels, tags, etc.

Furthermore, in the present example, surround view thumbnails from a browser 1604 include thumbnails 1606, title/label/description 1608, and notifications 1610. The thumbnails 1606 can include an image from the surround view. The title/label/description 1608 can include information about the surround view such as title, file name, description of the content, labels, tags, etc. In addition, notifications 1610 can include information such as comments on a surround view, updates about matching content, suggested content, etc. Although not shown on the mobile version, notifications can also be included, but may be omitted in the interest of layout and space considerations in some embodiments. In some examples, notifications can be provided as part of a surround view application on a mobile device.

Figure 16B:
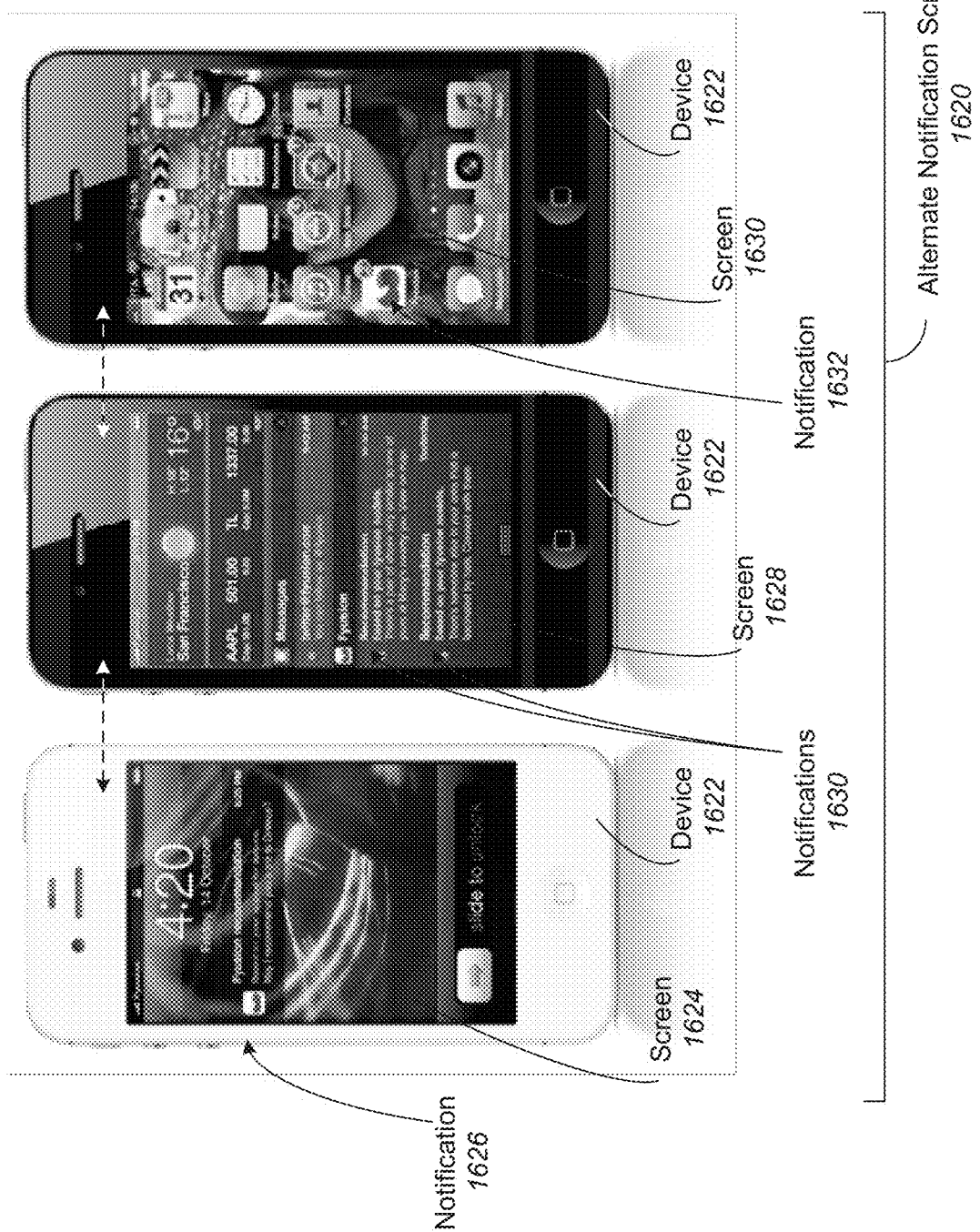
FIG. 16B illustrates examples of surround view-related notifications on a mobile device.

With reference to FIG. 16B, shown are examples of surround view-related notifications on a mobile device. In particular, alternative notification screens 1620 for a device 1622 are shown that include different formats for notifications. In some examples, a user can navigate between these screens depending on the user's preferences.

In the present example, screen 1624 includes a notification 1626 that includes a recommendation to the user based on content from recent surround views. In particular, the recommendation relates to a trip to Greece based on the application's finding that the user has an affinity for statues. This finding can be inferred from content found in the user's stored or recently browsed surround views, in some examples.

In the present example, screen 1628 includes notifications 1630 based on content from surround views that the user has stored, browsed, etc. For instance, one notification is a recommendation for a pair of shoes available at a nearby retailer that are similar to the user's shoes as provided in a surround view model. The recommendation also includes a link to a map to the retailer. This recommendation can be based on a surround view that the user has saved of a pair of shoes. The other notification is a recommendation to connect to another user that shares a common interest/hobby. In this example, the recommendation is based on the user's detected interest in hats. These recommendations can be provided automatically in some applications as "push" notifications. The content of the recommendations can be based on the user's surround views or browsing history, and visual search algorithms, such as those described with regard to FIGS. 19-22, can be used in some examples.

Screen 1630 shows another form of notification 1632 in the present example. Various icons for different applications are featured on screen 1630. The icon for the surround view application includes a notification 1632 embedded into the icon that shows how many notifications are waiting for the user. When the user selects the icon, the notifications can be displayed and/or the application can be launched, according to various embodiments.

Figure 17B:
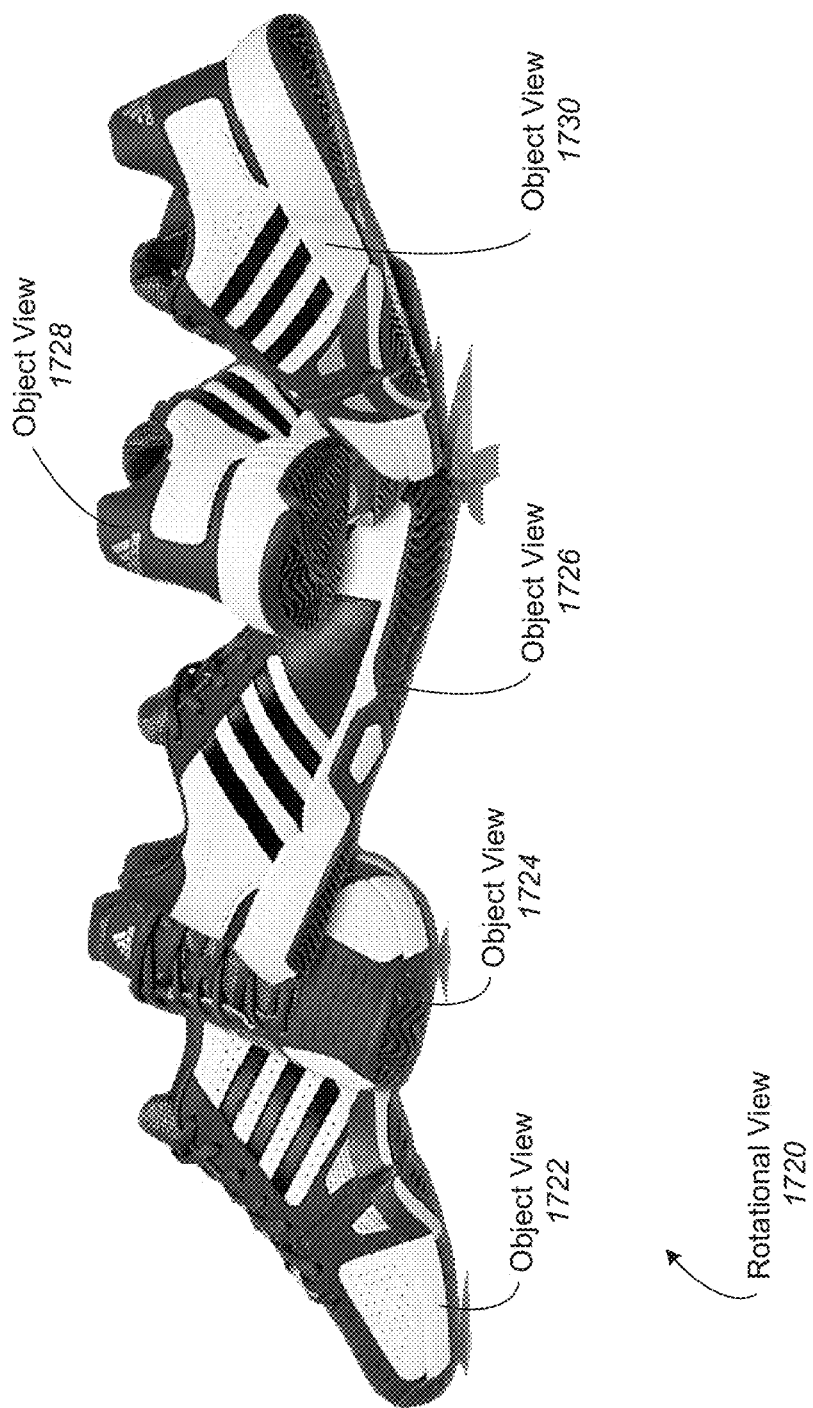
FIG. 17B illustrates one example of a segmented object viewed from different angles.

According to various embodiments of the present disclosure, surround views can be used to segment, or separate, objects from static or dynamic scenes. Because surround views include distinctive 3D modeling characteristics and information derived from image data, surround views provide a unique opportunity for segmentation. In some examples, by treating an object of interest as the surround view content, and expressing the remaining of the scene as the context, the object can be segmented out and treated as a separate entity. Additionally, the surround view context can be used to refine the segmentation process in some instances. In various embodiments, the content can be chosen either automatically or semi-automatically using user guided interaction. One important use for surround view object segmentation is in the context of product showcases in e-commerce, an example of which is shown in FIG. 17B. In addition, surround view-based object segmentation can be used to generate object models that are suited for training artificial intelligence search algorithms that can operate on large databases, in the context of visual search applications.

With reference to FIG. 17, shown is one example of a process for providing object segmentation 1700. At 1702, a first surround view of an object is obtained. Next, content is selected from the first surround view at 1704. In some examples, the content is selected automatically without user input. In other examples, the content is selected semi-automatically using user-guided interaction. The content is then segmented from the first surround view at 1706. In some examples, the content is segmented by reconstructing a model of the content in three-dimensions based on the information provided in the first surround view, including images from multiple camera viewpoints. In particular example embodiments, a mechanism for selecting and initializing a segmentation algorithm based on iterative optimization algorithms (such as graphical models) can be efficiently employed by reconstructing the object of interest, or parts of it, in three-dimensions from multiple camera viewpoints available in a surround view. This process can be repeated over multiple frames, and optimized until segmentation reaches a desired quality output. In addition, segmenting the content can include using the context to determine parameters of the content.

In the present example, once the content is segmented from the first surround view, a second surround view is generated that includes the object without the content or scenery surrounding the object. At 1708, this second surround view is provided. In some examples, the second surround view can then be stored in a database. This second surround view can be used in various applications. For instance, the segmented content includes a product for use in e-commerce. As illustrated in FIG. 17B, the segmented content can be used to show a product from various viewpoints. Another application includes using the second surround view as an object model for artificial intelligence training. In yet another application, the second surround view can be used in 3D printing. In this application, data from the second surround view is to a 3D printer.

Although the present example describes segmenting out content from a first surround view, it should be noted that context can also be segmented out in other examples. For instance, the background scenery can be segmented out and presented as a second surround view in some applications. In particular, the context can be selected from the first surround view and the context can be segmented from the first surround view, such that the context is separated into a distinct interactive model. The resulting surround view would then include the scenery surrounding an object but exclude the object itself. A segmented context model can also be used in various applications. For instance, data from the resulting surround view can be sent to a 3D printer. In some examples, this could be printed as a panoramic background on a flat or curved surface. If a context model is also printed, then the object of interest can be placed in front of the panoramic background to produce a three-dimensional "photograph" or model of the surround view. In another application, the segmented out context can be used as background to a different object of interest. Alternatively, a segmented out content can be placed in a new segmented out context. In these examples, providing an alternative content or context allows objects of interest to be placed into new backgrounds, etc. For instance, a surround view of a person could be placed in various background contexts, showing the person standing on a beach in one surround view, and standing in the snow in another surround view.

With reference to FIG. 17B, shown is one example of a segmented object viewed from different angles. In particular, a rotational view 1720 is shown of an athletic shoe. Object views 1722, 1724, 1726, 1728, and 1730 show the athletic shoe from various angles or viewpoints. As shown, the object itself is shown without any background or context. According to various embodiments, these different views of the segmented object can be automatically obtained from surround view content. One application of these types of rotational views is in e-commerce to show product views from different angles. Another application can be in visual search, according to various embodiments.

Figure 18:
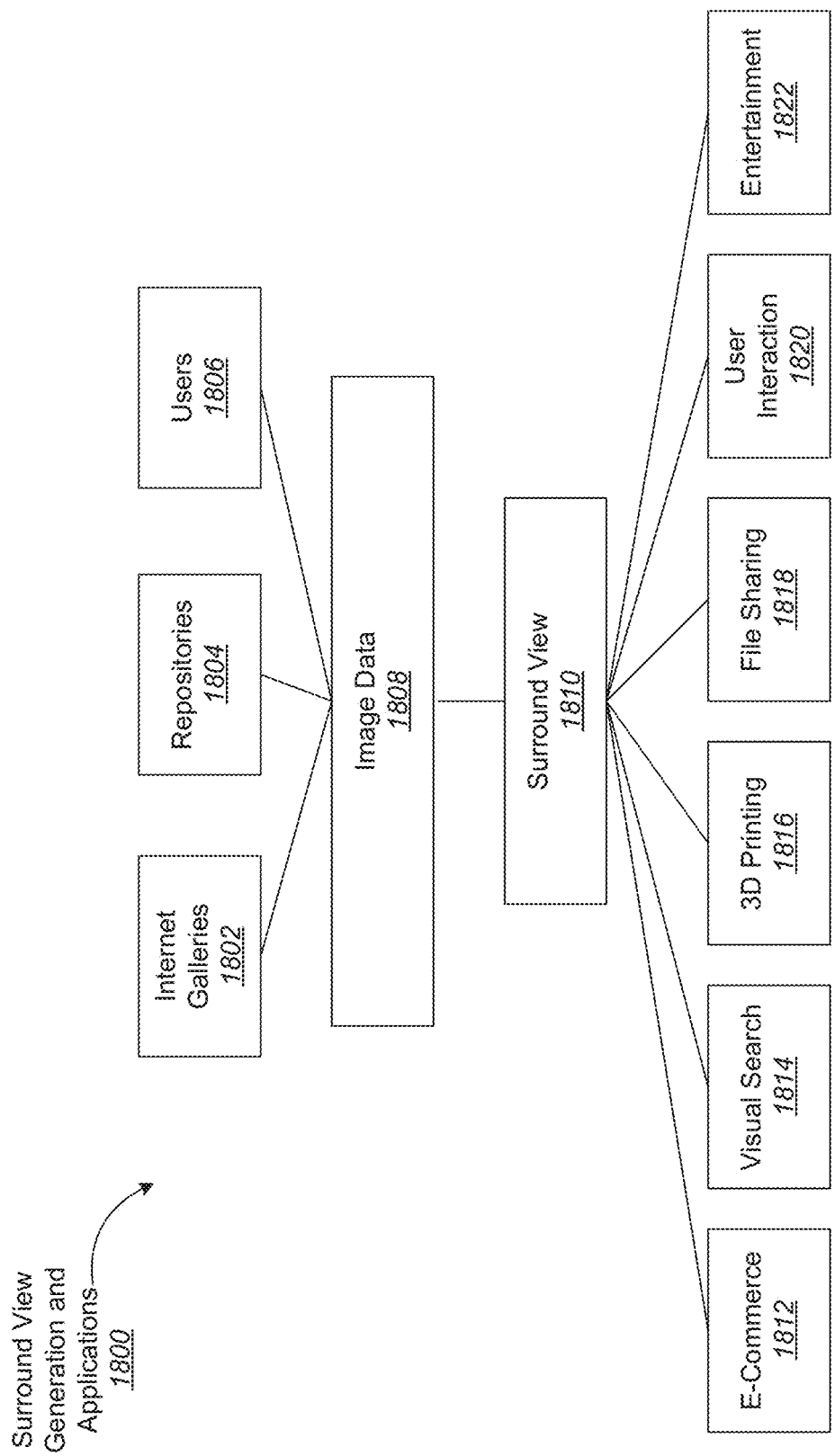
FIG. 18 illustrates one example of various data sources that can be used for surround view generation and various applications that can be used with a surround view.

According to various embodiments, surround views can be generated from data obtained from various sources and can be used in numerous applications. With reference to FIG. 18, shown is a block diagram illustrating one example of various sources that can be used for surround view generation and various applications that can be used with a surround view. In the present example, surround view generation and applications 1800 includes sources for image data 1808 such as internet galleries 1802, repositories 1804, and users 1806. In particular, the repositories can include databases, hard drives, storage devices, etc. In addition, users 1806 can include images and information obtained directly from users such as during image capture on a smartphone, etc. Although these particular examples of data sources are indicated, data can be obtained from other sources as well. This information can be gathered as image data 1808 to generate a surround view 1810, in particular embodiments.

In the present example, a surround view 1810 can be used in various applications. As shown, a surround view can be used in applications such as e-commerce 1812, visual search 1814, 3D printing 1816, file sharing 1818, user interaction 1820, and entertainment 1822. Of course, this list is only illustrative, and surround views can also be used in other applications not explicitly noted.

As described above with regard to segmentation, surround views can be used in e-commerce 1812. For instance, surround views can be used to allow shoppers to view a product from various angles. In some applications, shoppers can even use surround views to determine sizing, dimensions, and fit. In particular, a shopper can provide a self-model and determine from surround views whether the product would fit the model. Surround views can also be used in visual search 1814 as described in more detail below with regard to FIGS. 19-22. Some of the visual search applications can also relate to e-commerce, such as when a user is trying to find a particular product that matches a visual search query.

Another application of segmentation includes three-dimensional printing (3D printing) 1816. Three-dimensional printing has been recently identified as one of the future disruptive technologies that will improve the global economy in the next decade. According to various embodiments, content can be 3D printed from a surround view. In addition, the panoramic background context in a surround view can also be printed. In some examples, a printed background context can complement the final 3D printed product for users that would like to preserve memories in a 3D printed format. For instance, the context could be printed either as a flat plane sitting behind the 3D content, or as any other geometric shape (spherical, cylindrical, U shape, etc).

As described above with regard to FIG. 16A, surround views can be stored with thumbnail views for user access. This type of application can be used for file sharing 1818 between users in some examples. For instance, a site can include infrastructure for users to share surround views in a manner similar to current photo sharing sites. File sharing 1818 can also be implemented directly between users in some applications.

Also as described with regard to FIGS. 14 and 15, user interaction is another application of surround views. In particular, a user can navigate through a surround view for their own pleasure or entertainment. Extending this concept to entertainment 1822, surround views can be used in numerous ways. For instance, surround views can be used in advertisements, videos, etc.

Figure 19:
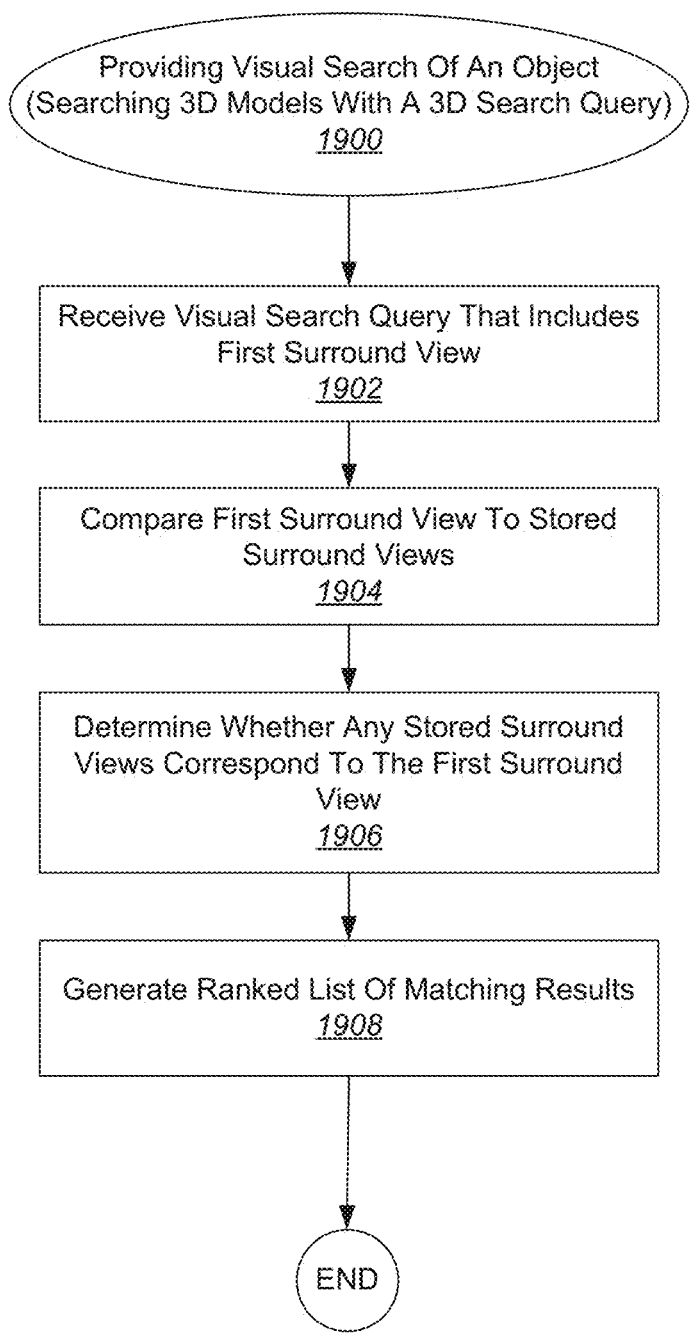
FIG. 19 illustrates one example of a process for providing visual search of an object, where the search query includes a surround view of the object and the data searched includes three-dimensional models.
Figure 20:
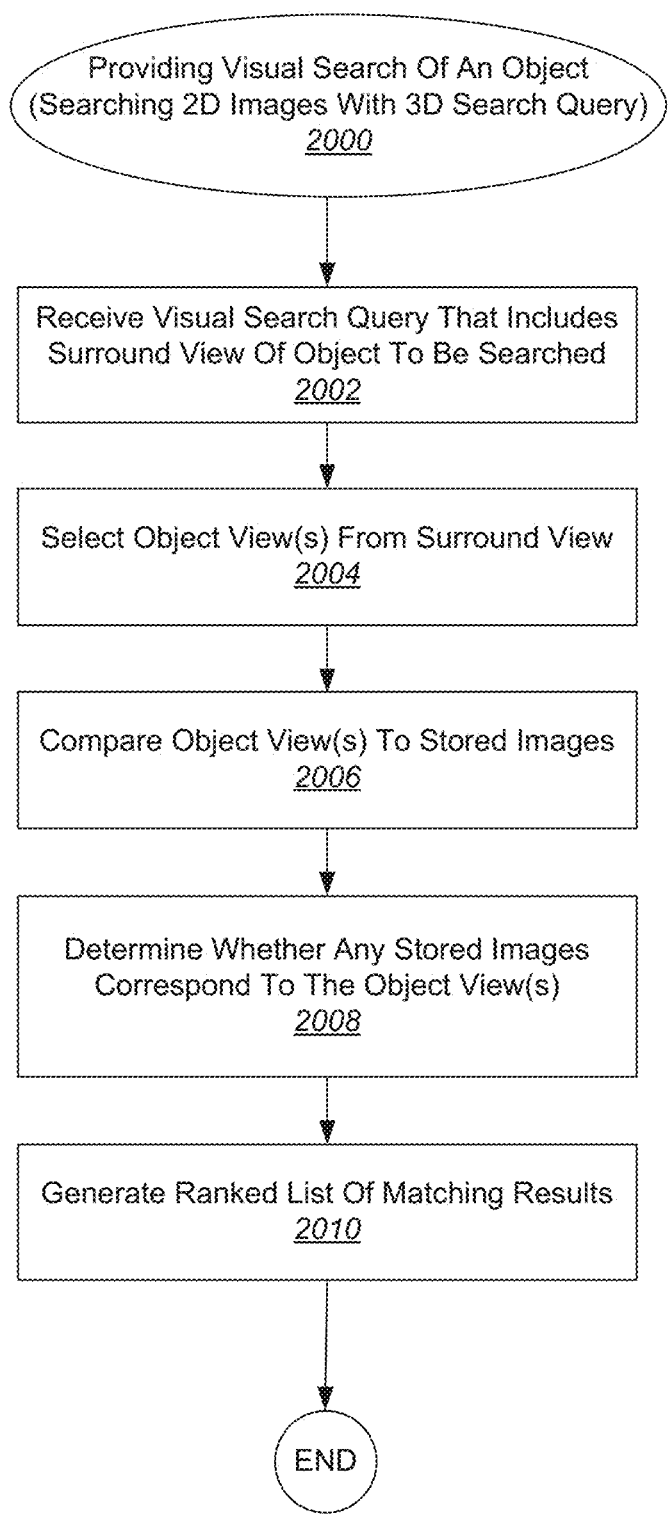
FIG. 20 illustrates one example of a process for providing visual search of an object, where the search query includes a surround view of the object and the data searched includes two-dimensional images.
Figure 22:
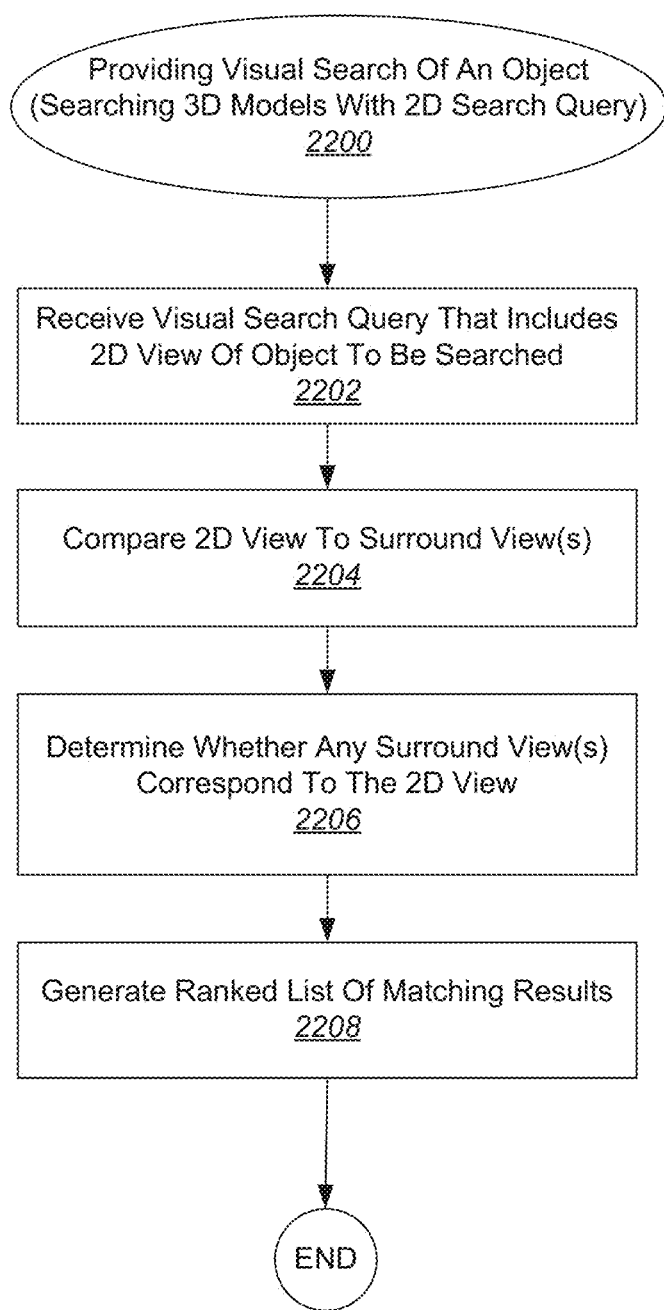
FIG. 22 illustrates an example of a process for providing visual search of an object, where the search query includes a two-dimensional view of the object and the data searched includes surround view(s).

As previously described, one application of surround views is visual search. FIGS. 19, 20, and 22 depict examples of visual search using surround views. According to various embodiments, using surround views can provide much higher discriminative power in search results than any other digital media representation to date. In particular, the ability to separate content and context in a surround view is an important aspect that can be used in visual search.

Existing digital media formats such as 2D images are unsuitable for indexing, in the sense that they do not have enough discriminative information available natively. As a result, many billions of dollars are spent in research on algorithms and mechanisms for extracting such information from them. This has resulted in satisfactory results for some problems, such as facial recognition, but in general the problem of figuring out a 3D shape from a single image is ill-posed in existing technologies. Although the level of false positives and negatives can be reduced by using sequences of images or 2D videos, the 3D spatial reconstruction methods previously available are still inadequate.

According to various embodiments, additional data sources such as location-based information, which are used to generate surround views, provide valuable information that improves the capability of visual recognition and search. In particular example embodiments, two components of a surround view, the context and the content, both contribute significantly in the visual recognition process. In particular example embodiments, the availability of three-dimensional information that the content offers can significantly reduce the number of hypotheses that must be evaluated to recognize a query object or part of a scene. According to various embodiments, the content's three-dimensional information can help with categorization (i.e., figuring out the general category that an object belongs to), and the two-dimensional texture information can indicate more about a specific instance of the object. In many cases, the context information in a surround view can also aid in the categorization of a query object, by explaining the type of scene in which the query object is located.

In addition to providing information that can be used to find a specific instance of an object, surround views are also natively suited for answering questions such as: "what other objects are similar in shape and appearance?" Similar to the top-N best matches provided in response to a web search query, a surround view can be used with object categorization and recognition algorithms to indicate the "closest matches," in various examples.

Visual search using surround views can be used and/or implemented in various ways. In one example, visual search using surround views can be used in object recognition for robotics. In another example, visual search using surround views can be used in social media curation. In particular, by analyzing the surround view data being posted to various social networks, and recognizing objects and parts of scenes, better # hashtags indices can be automatically generated. By generating this type of information, feeds can be curated and the search experience can be enhanced.

Another example in which visual search using surround views can be used is in a shopping context that can be referred to as "Search and Shop." In particular, this visual search can allow recognition of items that are similar in shape and appearance, but might be sold at different prices in other stores nearby. For instance, with reference to FIG. 21, a visual search query may yield similar products available for purchase.

In yet another example in which visual search using surround views can be used is in a shopping context that can be referred to as "Search and Fit." According to various embodiments, because surround view content is three-dimensional, precise measurements can be extracted and this information can be used to determine whether a particular object represented in a surround view would fit in a certain context (e.g., a shoe fitting a foot, a lamp fitting a room, etc.).

In another instance, visual search using surround views can also be used to provide better marketing recommendation engines. For example, by analyzing the types of objects that appear in surround views generated by various users, questions such as "what type of products do people really use in their daily lives" can be answered in a natural, private, and non-intrusive way. Gathering this type of information can facilitate improved recommendation engines, decrease and/or stop unwanted spam or marketing ads, thereby increasing the quality of life of most users. FIG. 16B shows one implementation in which recommendations can be provided according to various embodiments of the present disclosure.

With reference to FIG. 19, shown is one example of a process for providing visual search of an object 1900, where the search query includes a surround view of the object and the data searched includes three-dimensional models. At 1902, a visual search query that includes a first surround view is received. This first surround view is then compared to stored surround views at 1904. In some embodiments, this comparison can include extracting first measurement information for the object in the first surround view and comparing it to second measurement information extracted from the one or more stored surround views. For instance, this type of measurement information can be used for searching items such as clothing, shoes, or accessories.

Next, a determination is made whether any stored surround views correspond to the first surround view at 1906. In some examples, this determination is based on whether the subject matter in any of the stored surround views is similar in shape to the object in the first surround view. In other examples, this determination is based on whether any of the subject matter in the stored surround views is similar in appearance to the object in the first surround view. In yet other examples, this determination is based on whether any subject matter in the stored surround views include similar textures included in the first surround view. In some instances, this determination is based on whether any of the contexts associated with the stored surround views match the context of the first surround view. In another example, this determination is based on whether the measurement information associated with a stored surround view dimensionally fits the object associated with the first surround view. Of course any of these bases can be used in conjunction with each other.

Once this determination is made, a ranked list of matching results is generated at 1908. In some embodiments, generating a ranked list of matching results includes indicating how closely any of the stored surround views dimensionally fits the object associated with the first measurement information. According to various embodiments, this ranked list can include displaying thumbnails of matching results. In some examples, links to retailers can be included with the thumbnails. Additionally, information about the matching results such as name, brand, price, sources, etc. can be included in some applications.

Although the previous example includes using a surround view as a visual search query to search through stored surround views or three-dimensional models, current infrastructure still includes a vast store of two-dimensional images. For instance, the internet provides access to numerous two-dimensional images that are easily accessible. Accordingly, using a surround view to search through stored two-dimensional images for matches can provide a useful application of surround views with the current two-dimensional infrastructure.

With reference to FIG. 20, shown is one example of a process for providing visual search of an object 2000, where the search query includes a surround view of the object and the data searched includes two-dimensional images. At 2002, a visual search query that includes a first surround view is received. Next, object view(s) are selected from the surround view at 2004. In particular, one or more two-dimensional images are selected from the surround view. Because these object view(s) will be compared to two-dimensional stored images, selecting multiple views can increase the odds of finding a match. Furthermore, selecting one or more object views from the surround view can include selecting object views that provide recognition of distinctive characteristics of the object.

In the present example, the object view(s) are then compared to stored images at 2006. In some embodiments, one or more of the stored images can be extracted from stored surround views. These stored surround views can be retrieved from a database in some examples. In various examples, comparing the one or more object views to the stored images includes comparing the shape of the object in the surround view to the stored images. In other examples, comparing the one or more object views to the stored images includes comparing the appearance of the object in the surround view to the stored images. Furthermore, comparing the one or more object views to the stored images can include comparing the texture of the object in the surround view to the stored images. In some embodiments, comparing the one or more object views to the stored images includes comparing the context of the object in the surround view to the stored images. Of course any of these criteria for comparison can be used in conjunction with each other.

Next, a determination is made whether any stored images correspond to the object view(s) at 2008. Once this determination is made, a ranked list of matching results is generated at 2010. According to various embodiments, this ranked list can include displaying thumbnails of matching results. In some examples, links to retailers can be included with the thumbnails. Additionally, information about the matching results such as name, brand, price, sources, etc. can be included in some applications.

Figure 21:
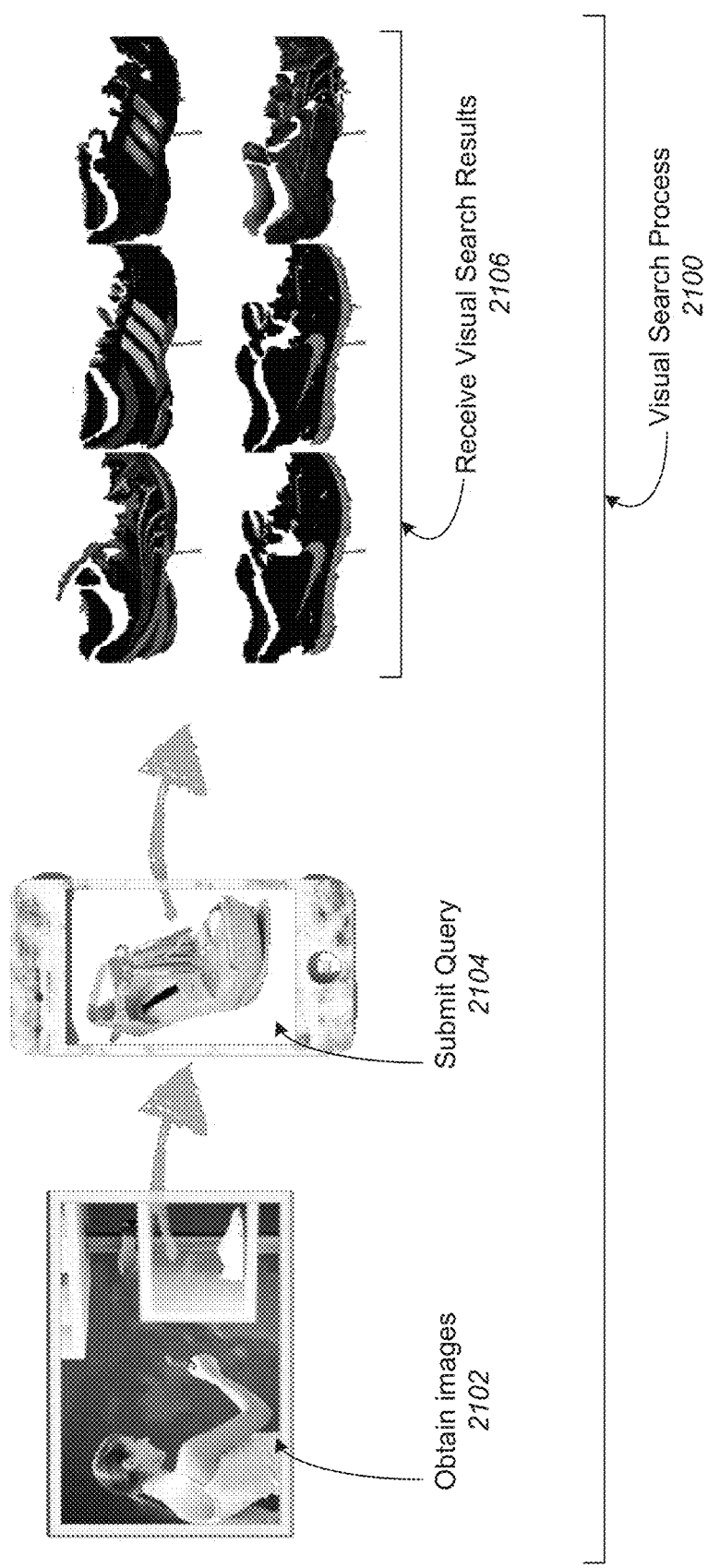
FIG. 21 illustrates an example of a visual search process.

With reference to FIG. 21, shown is an example of a visual search process 2100. In the present example, images are obtained at 2102. These images can be captured by a user or pulled from stored files. Next, according to various embodiments, a surround view is generated based on the images. This surround view is then used as a visual search query that is submitted at 2104. In this example, a surround view can be used to answer questions such as "which other objects in a database look like the query object." As illustrated, surround views can help shift the visual search paradigm from finding other "images that look like the query," to finding other "objects that look like the query," due to their better semantic information capabilities. As described with regard to FIGS. 19 and 20 above, the surround view can then be compared to the stored surround views or images and a list of matching results can be provided at 2106.

Although the previous examples of visual search include using surround views as search queries, it may also be useful to provide search queries for two-dimensional images in some embodiments. With reference to FIG. 22, shown is an example of a process for providing visual search of an object 2200, where the search query includes a two-dimensional view of the object and the data searched includes surround view(s). At 2202, a visual search query that includes a two-dimensional view of an object to be searched is received. In some examples, the two-dimensional view is obtained from an object surround view, wherein the object surround view includes a three-dimensional model of the object. Next, the two-dimensional view is compared to surround views at 2204. In some examples, the two-dimensional view can be compared to one or more content views in the surround views. In particular, the two-dimensional view can be compared to one or more two-dimensional images extracted from the surround views from different viewing angles. According to various examples, the two-dimensional images extracted from the surround views correspond to viewing angles that provide recognition of distinctive characteristics of the content. In other examples, comparing the two-dimensional view to one or more surround views includes comparing the two-dimensional view to one or more content models. Various criteria can be used to compare the images or models such as the shape, appearance, texture, and context of the object. Of course any of these criteria for comparison can be used in conjunction with each other.

With reference to FIG. 23, shown is a particular example of a computer system that can be used to implement particular examples of the present disclosure. For instance, the computer system 2300 can be used to provide surround views according to various embodiments described above. According to particular example embodiments, a system 2300 suitable for implementing particular embodiments of the present disclosure includes a processor 2301, a memory 2303, an interface 2311, and a bus 2315 (e.g., a PCI bus). The interface 2311 may include separate input and output interfaces, or may be a unified interface supporting both operations. When acting under the control of appropriate software or firmware, the processor 2301 is responsible for such tasks such as optimization. Various specially configured devices can also be used in place of a processor 2301 or in addition to processor 2301. The complete implementation can also be done in custom hardware. The interface 2311 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 2300 uses memory 2303 to store data and program instructions and maintained a local side cache. The program instructions may control the operation of an operating system and/or one or more applications, for example. The memory or memories may also be configured to store received metadata and batch requested metadata.

Because such information and program instructions may be employed to implement the systems/methods described herein, the present disclosure relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Figure 24A:
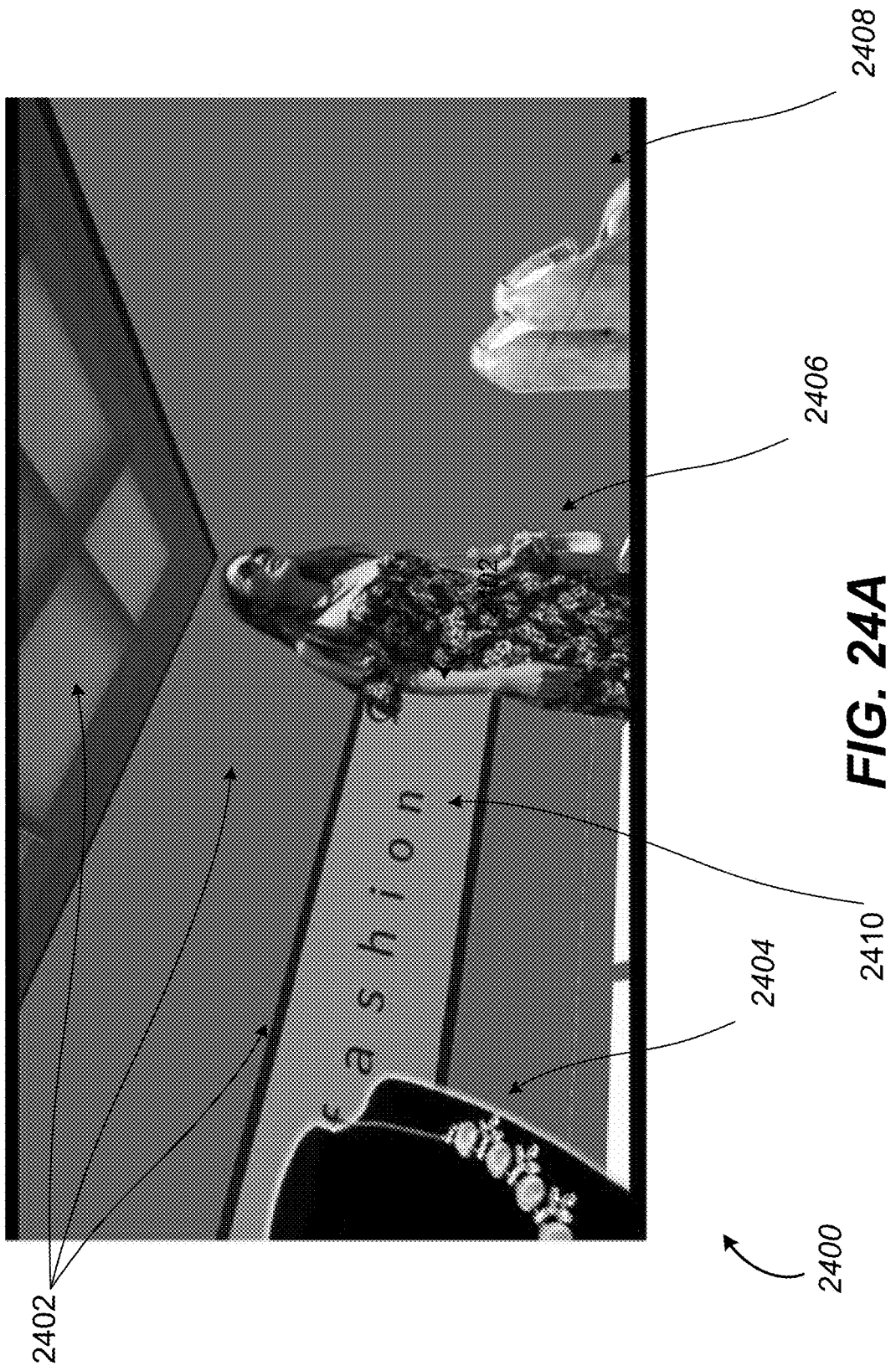
FIGS. 24A-C illustrate example screenshots of a virtual reality environment from different angles, in accordance with various embodiments of the present disclosure.
Figure 24B:
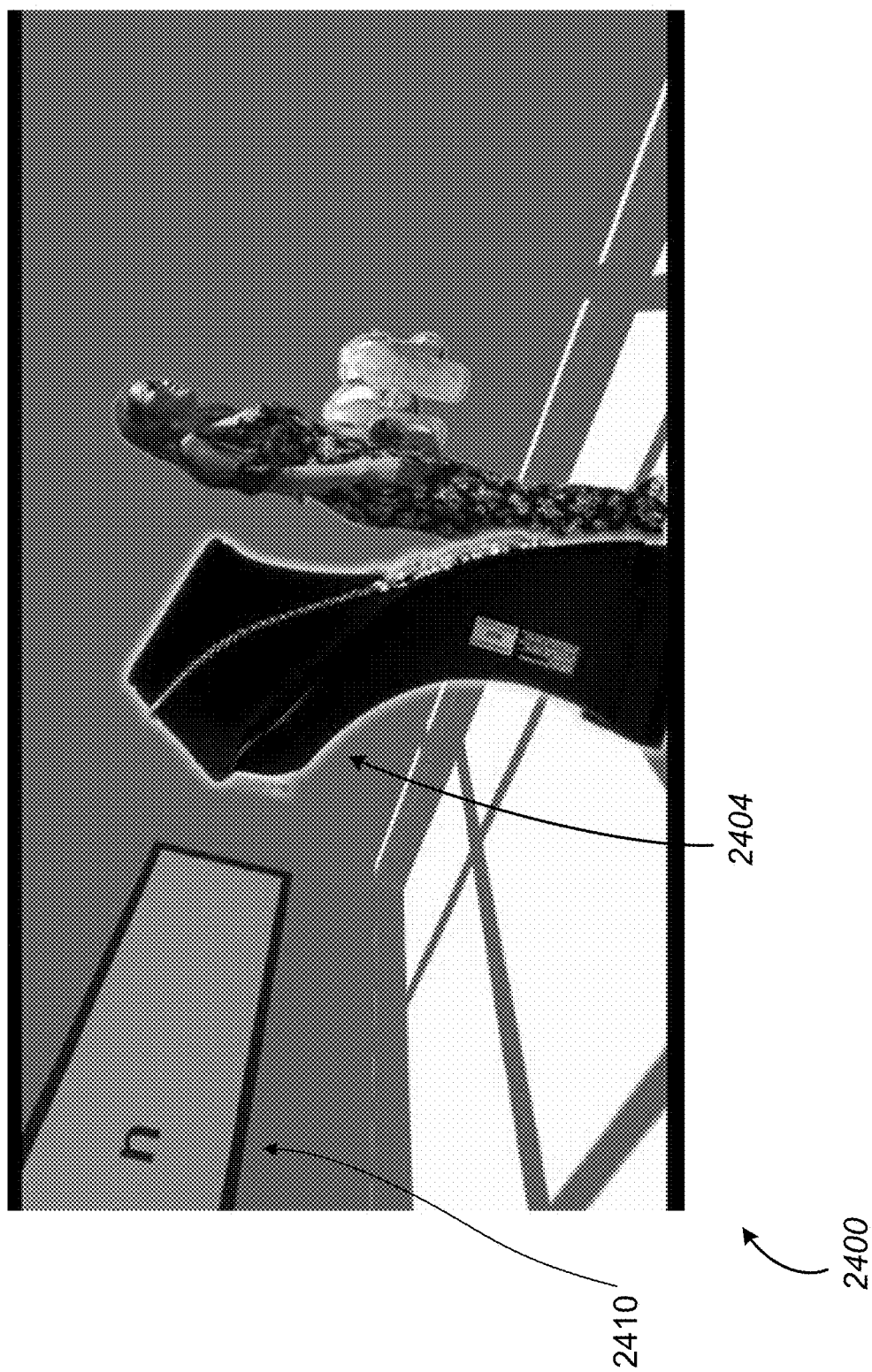
Figure 24C:
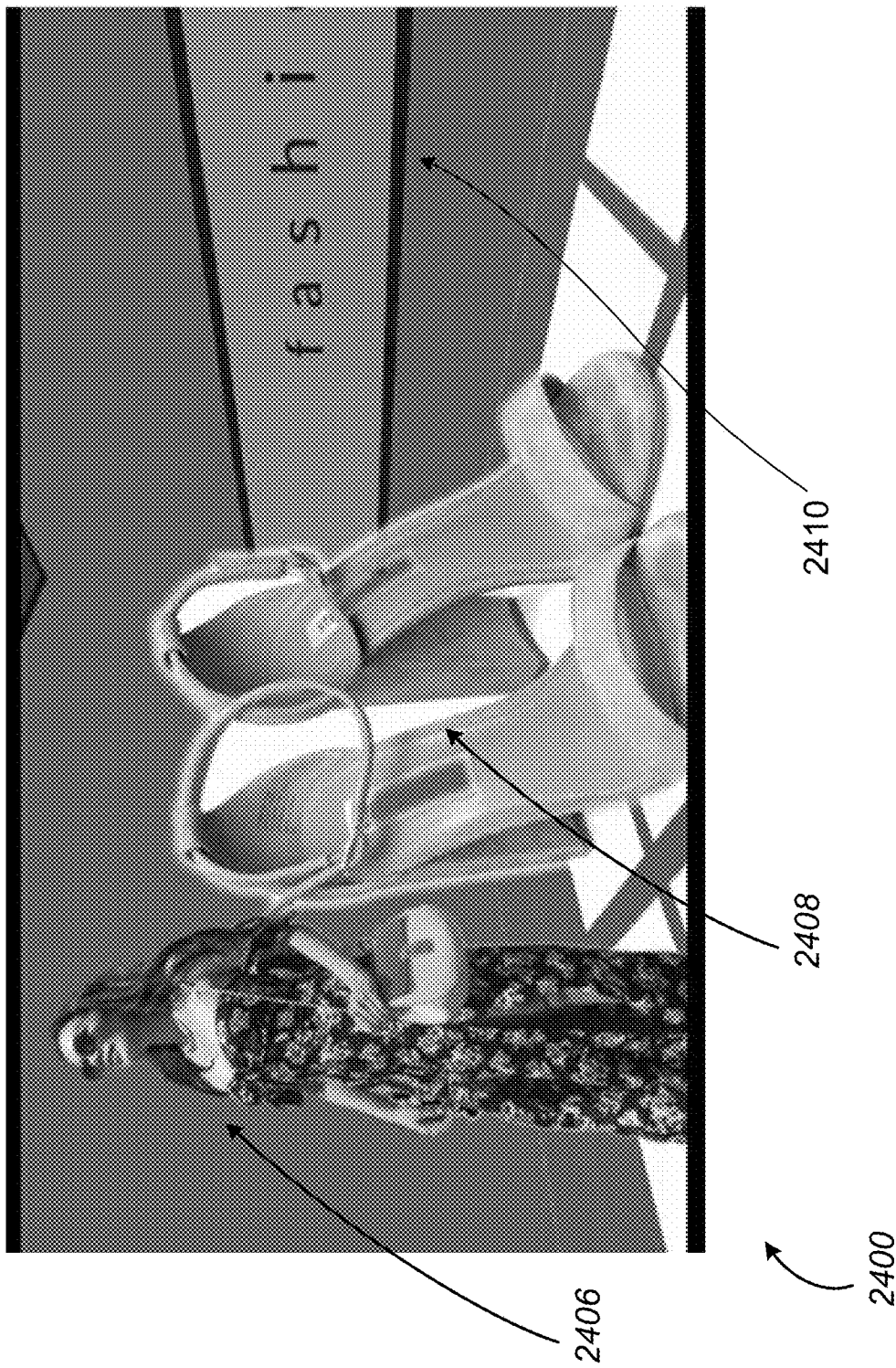

FIGS. 24A-C illustrate example views of a virtual reality environment 2400 from different angles, in accordance with various embodiments of the present disclosure. In FIGS. 24A-C, there are three content models within a virtual reality fashion environment 2400. One content model is a necklace on a display bust 2404 located on the left of another content model 2406 of a woman in a dress wearing sun glasses and holding a purse. The woman model 2406 is located directly to the right of the necklace display bust 2404 in FIG. 24A. Last, the third content model is a pair of high heel shoes 2408. In addition to the three content models, virtual reality fashion environment 2400 also includes a context model 2402 as a background corresponding to a design room that includes walls, a "fashion" billboard 2410, a floor, and ceiling. Once a user engages with the VR system, the user is "placed in" or "enters" VR environment 2400/design room 2402. FIGS. 24A-24C convey what a user sees as the user moves around. FIG. 24A shows a potential "starting point" for the user once the user "enters" the room 2402. FIG. 24B shows a view of virtual reality room 2402 after the user has moved around to the left of the starting point towards the necklace bust 2404 and then turned toward the objects in the center of the room. As demonstrated in FIG. 24B, the objects remain in their respective positions as the user moves about the room. In some embodiments, this is accomplished using zoom and shifting functions to emulate the user moving around, while maintaining static object locations relative to the dimensions of the room. The rotations to different angles are provided using the functions of the MIDMR, as provided herein. Thus, the objects occupy a three dimensional space within the virtual reality environment 2400. The user can circle around the objects and view the objects from different angles. FIG. 24C provides an example view of the user moving toward the right of the woman model 2406 toward the pair of high heel shoes 2408. As demonstrated, the shoes 2408 appear bigger because the user has walked toward the shoes relative to the user's original starting position. As previously mentioned, in some embodiments, this is accomplished using a zoom function. In some embodiments, although the objects appear to be three dimensional objects, each view of the objects, determined via sensors (e.g. gyroscopic equipment, GPS, triangulation, laser and motion detectors, etc.) in the VR system, is generated using an actual image of the object obtained using the techniques and systems described above. In such embodiments, as described above the object models are made directly through fusing different images together in a seamless or near seamless manner. In other embodiments, three dimensional models are actually created via fusing of the images as described elsewhere in the application.

As demonstrated in FIGS. 24A-C, as the user moves about the room, the context models also present different views in conjunction with the user's detected movements. For example, in FIG. 24B, the "fashion" billboard 2410 is closer to the user as compared to the view provided in FIG. 24A and only the portion closer to the right wall is visible in FIG. 24B. Should the user turn or pivot to the left, the billboard 2410 would come more into view. As described above, the content models can be generated separately from the context models or they can be generated together from a real world scene. In some embodiments, the context models are replaced with a real-time dynamic real world environment, or augmented reality (AR). In such embodiments, the virtual reality room 2402 is replaced with the real world using constant sensor feedback, e.g. a camera, GPS, etc. The locations of the objects are still static relative to the "background" (i.e., the real world) and the user moves about the "room" by moving through the real world.

Figure 25A:
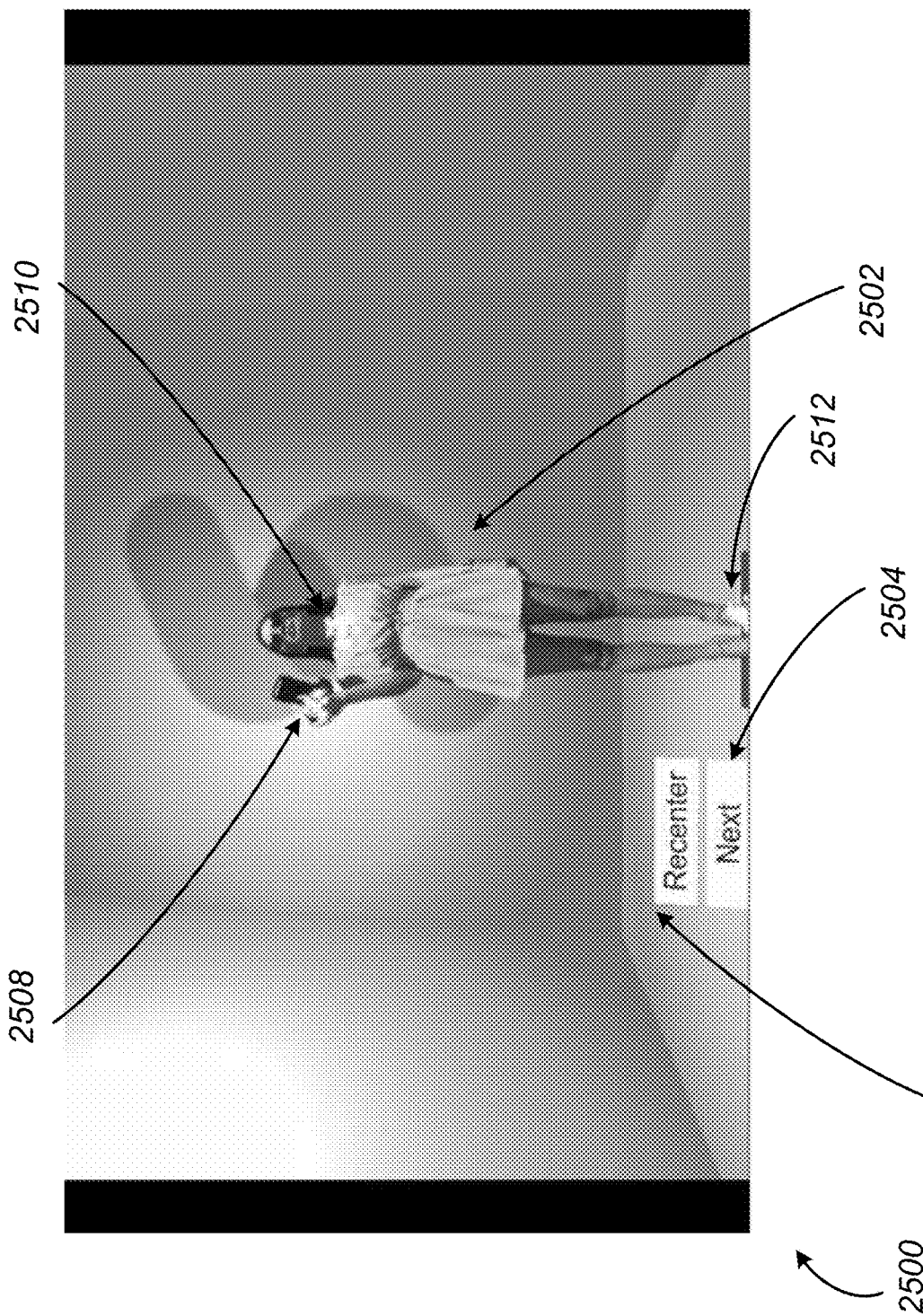
FIGS. 25A-G illustrate example screenshots of a virtual reality environment with content model manipulation, in accordance with various embodiments of the present disclosure.
Figure 25B:
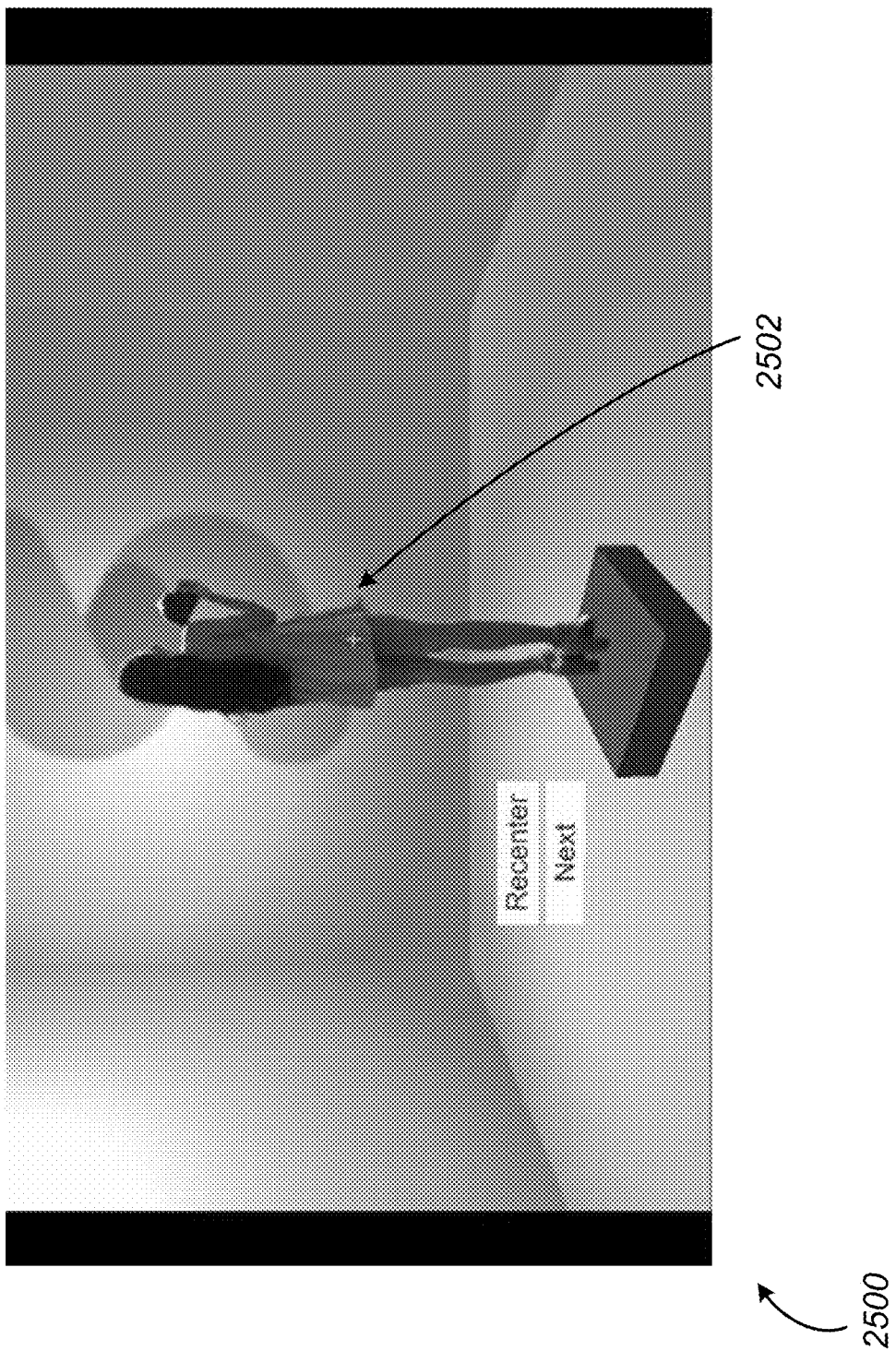
Figure 25C:
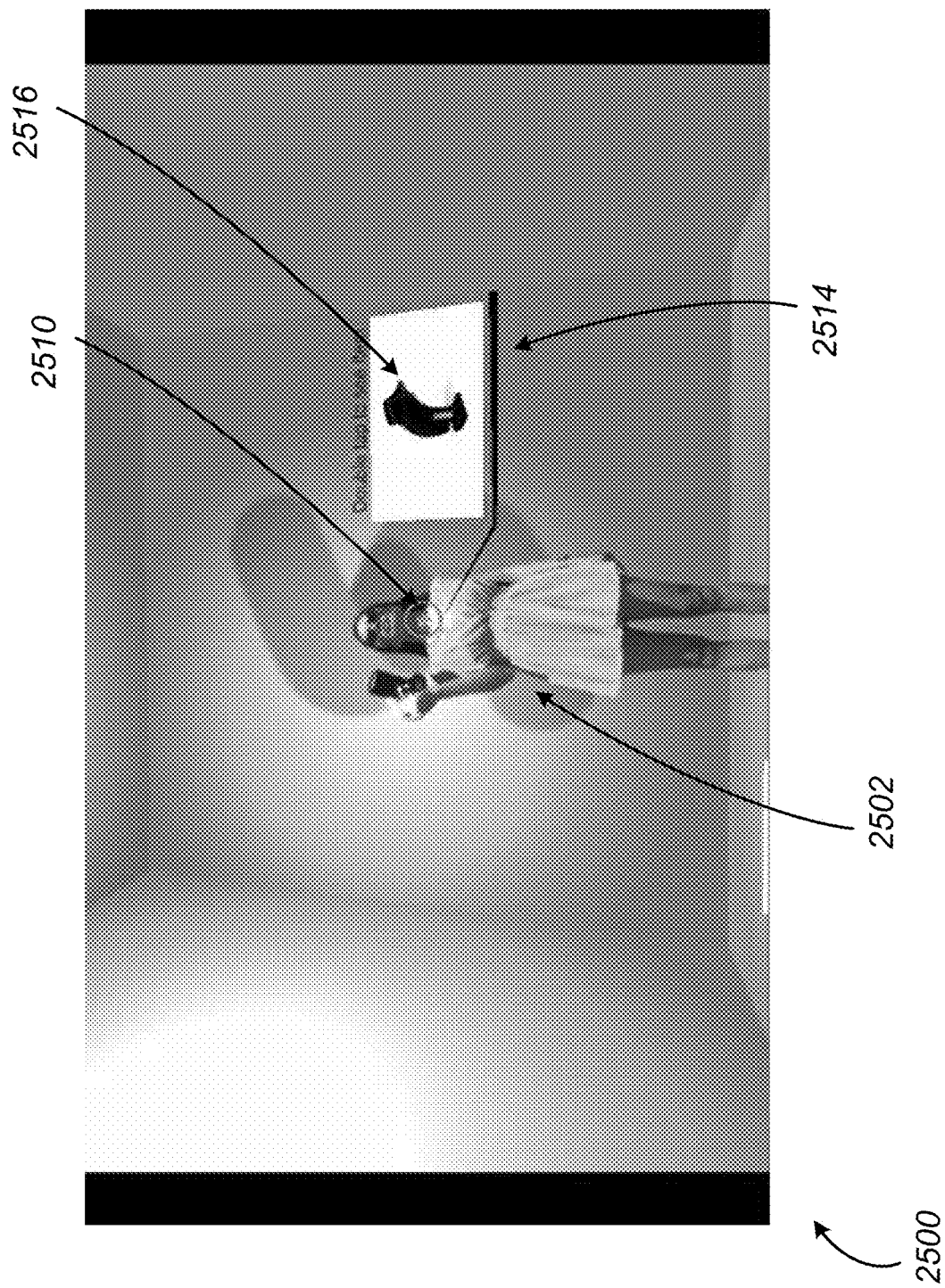
Figure 25D:
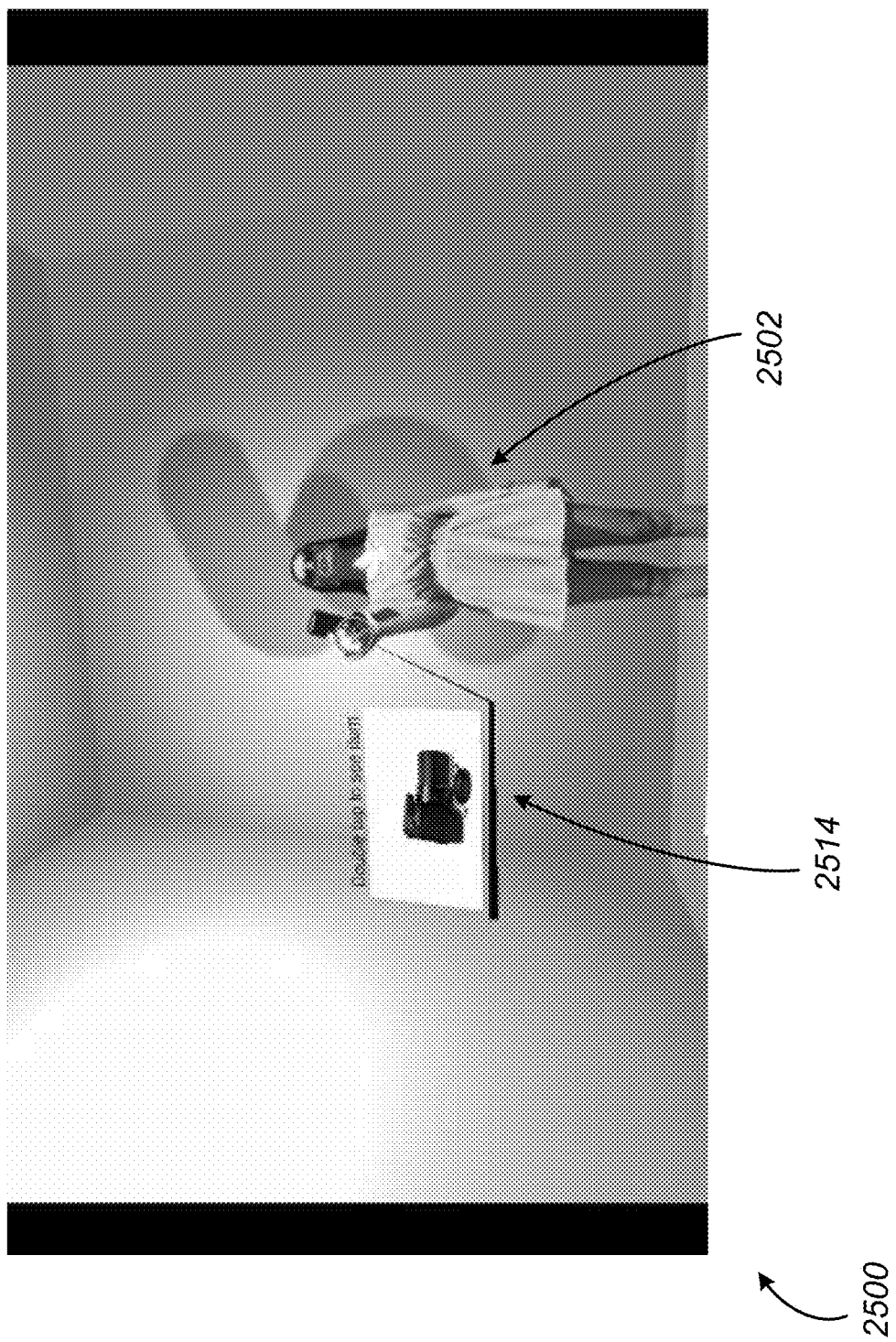
Figure 25E:
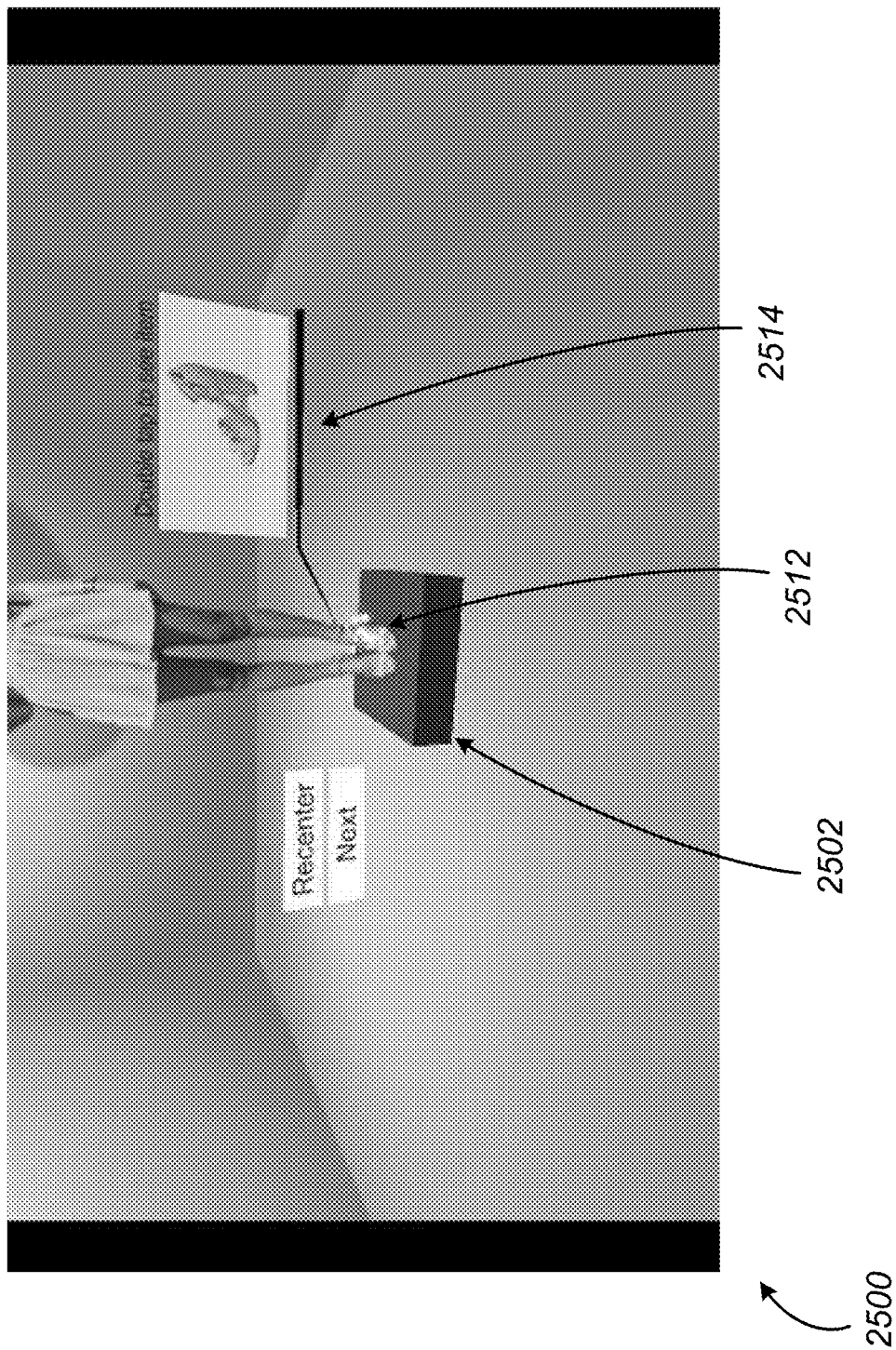
Figure 25F:
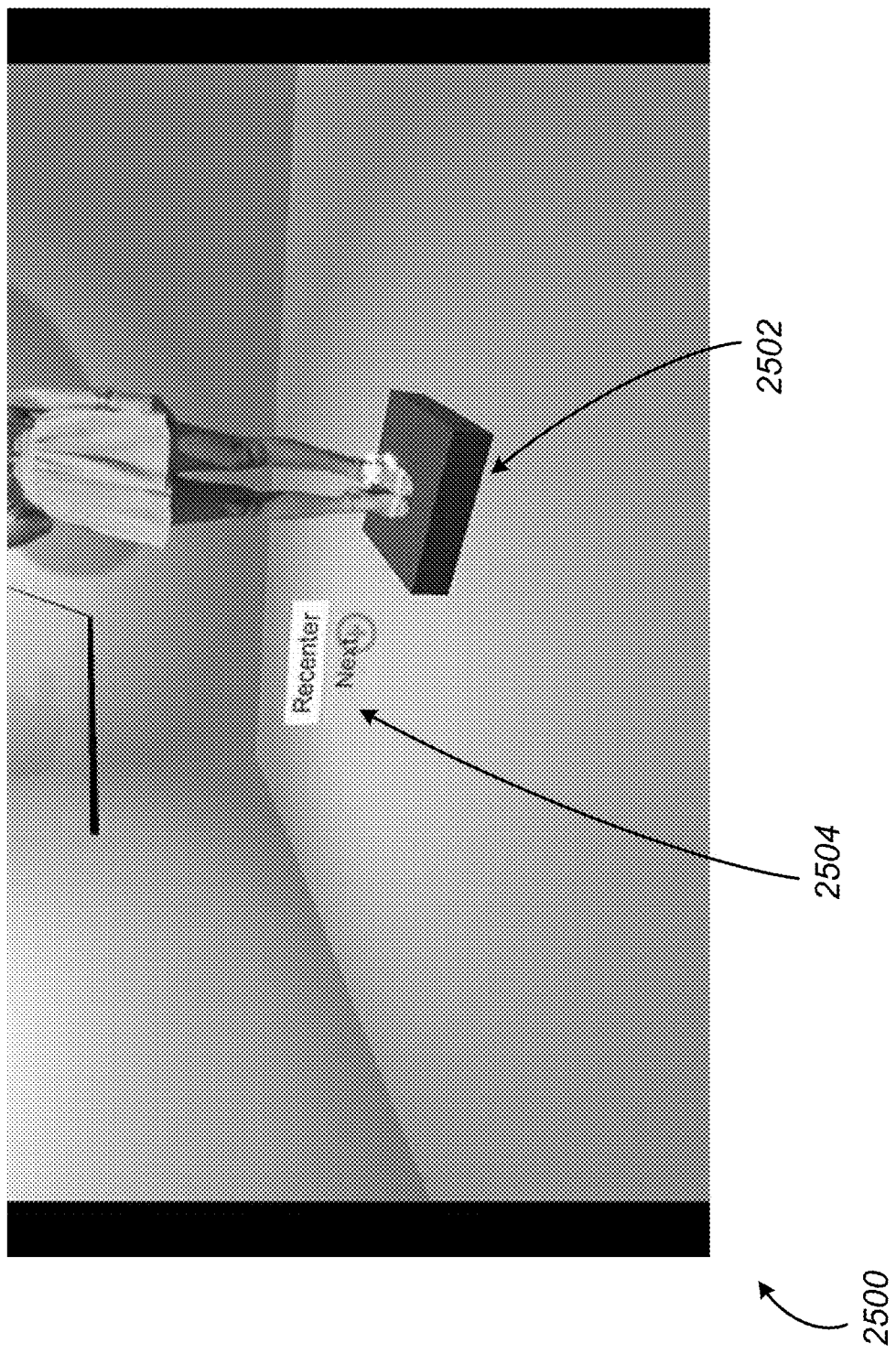
Figure 25G:
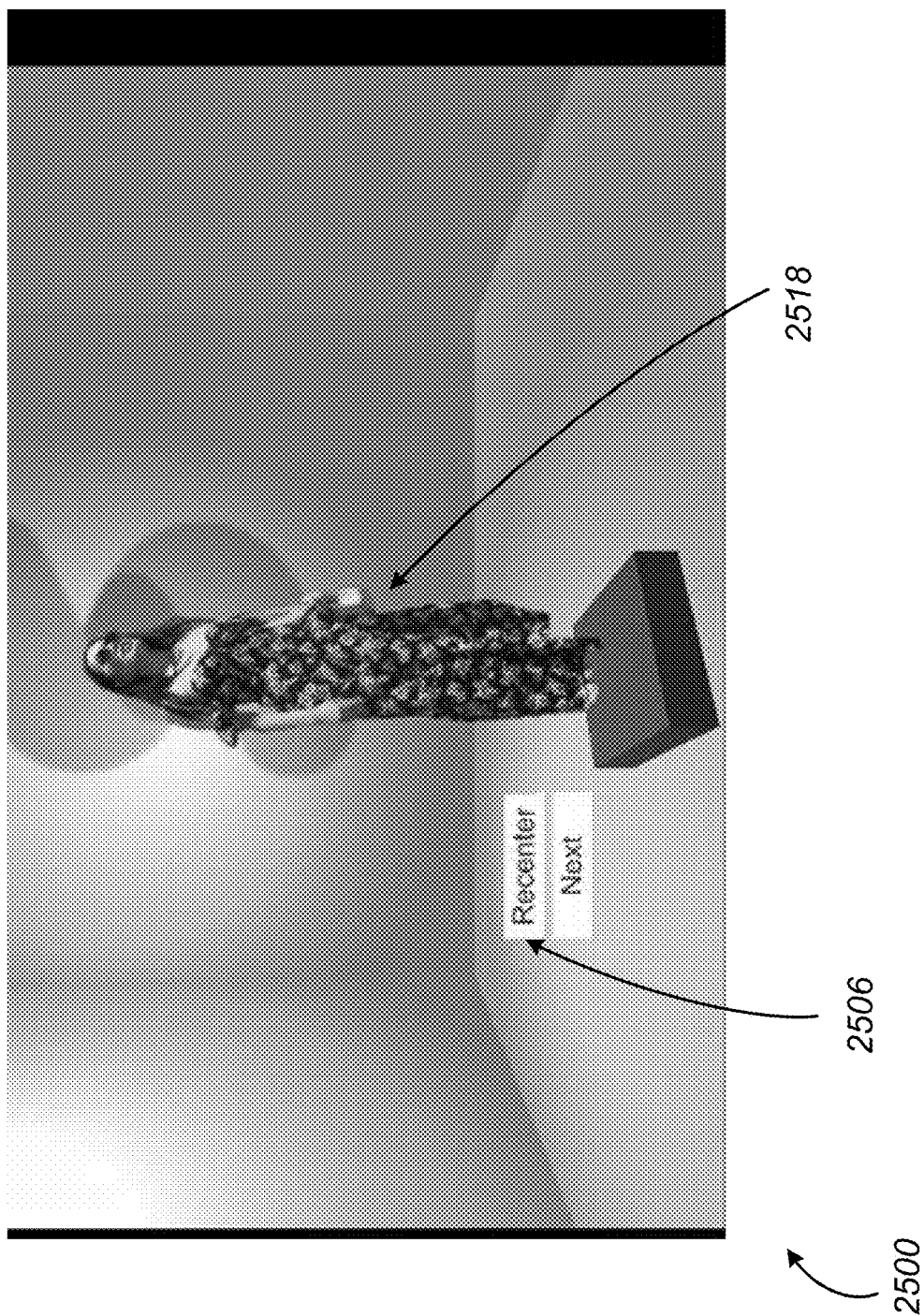

FIGS. 25A-G illustrate example views of a virtual reality environment 2500 with content model manipulation, in accordance with various embodiments of the present disclosure. As described above, in various embodiments, the virtual reality system provides for techniques and mechanisms for manipulating content models within the virtual reality environment. In such embodiments, rather than walking around a content model through the virtual reality space, the user can directly access different views of the content model by directly interacting with, manipulating, and/or rotating the content model. FIG. 25A shows content model 2502 in a virtual reality setting. The content model 2502 is capable of being manipulated by the user. For example the user can rotate the model as shown in FIG. 25B. The actions for rotating the model can be similar to how the user would rotate an object in the real world. In some embodiments, sensors in the virtual reality system can sense the motion and detect predetermined motions stored in memory of the system. Once the user performs such predetermined actions within a threshold vicinity of the content model, the system registers the detected predetermined motion and applies the effect to the content model accordingly. The virtual reality room 2500 also includes action tabs such as "Next," for moving to the next content model being stored (as depicted in FIGS. 25F and 25G), and "Recenter," for recentering the content model after manipulating the content model away from the original starting point. In FIG. 25F, content model 2502 has been manipulated to display the feet of the model. The user selects the "Next" button 2504 revealing content model 2518. As shown in FIG. 25G, the user has also selected the "Recenter" button to reset the view from the content model's feet (as show in FIG. 25F) to the original full body view.

As shown in FIG. 25A, the content model 2502 has several embedded objects fixed on specific locations on the content model. The objects in this example are depicted as a camera 2508, a necklace 2510, and shoes 2512. In some embodiments, visual indicators, such as glittering lights (depicted in FIG. 25A as a cluster of white dots), indicate the presence of embedded objects. In some embodiments, the embedded objects are fixed to the content model 2502 and are affected by the user's manipulations to content model 2502. For example, FIG. 25B shows that the content model 2502 has been rotated by the user about 180 degrees. Similarly, the embedded objects also rotate with the content model. As shown in FIG. 25B, the embedded objects are no longer showing as accessible (no glittering lights) once they have rotated out of view. In some embodiments, the embedded objects are accessible regardless of the angle of rotation/view. However, in other embodiments, the embedded objects are embedded in specific locations of content model 2502 and thus can only be visible if content model 2502 is rotated in such a way as to expose the embedded objects into view.

In some embodiments, the embedded objects are selectable by the user. In such embodiments, once selected, a pop-up window 2514 appears in the virtual reality environment, as shown in FIGS. 25C-E. In some embodiments, the pop-up window 2514 depicts an enlarged view of the embedded object 2510. In some embodiments, the pop-up window produces a second multi-view interactive digital media representation 2516 of the embedded object 2510. In other words, the pop-up window 2514 can also be another virtual reality window/room where a content model 2516 of the embedded object 2510 can also be manipulated by the user. Such embodiments may contain multiple surround view layers that make up the virtual reality environment 2500. As shown in FIGS. 25D and 25E, multiple different embedded objects can be selected by the user and each selection leads to another pop-up window 2514. In some embodiments, the pop-up windows 2514 are flat and fixed in the virtual reality space. In such embodiments, if the pop-up window 2514 is displayed and the user rotates the content model, the pop-up window also rotates with the content model. In other embodiments, window 2514 also provides a multi-view representation of the embedded object such that rotation of the content model leaves the window open, directly facing the user, but rotates the MIDMR of the embedded object inside the pop-up window.

In some embodiments, the user can use gloves with sensors, or a pointing device. In some embodiments, the user can use remote controls or mobile devices to perform such actions. In some embodiments, constant motion detectors surround the user of the virtual reality system and register the motions of the user without the user having to wear any devices other than a head set, goggles, or the basic virtual reality engagement gear. As with virtual reality room 2400 in FIGS. 24A-C, virtual reality room 2500 in FIGS. 25A-G can also be presented in AR format, where the background or "room" is the real world.

Figure 26A:
FIGS. 26A-M illustrate example screenshots of a virtual reality environment with multiple interactive layers, in accordance with various embodiments of the present disclosure.
Figure 26B:
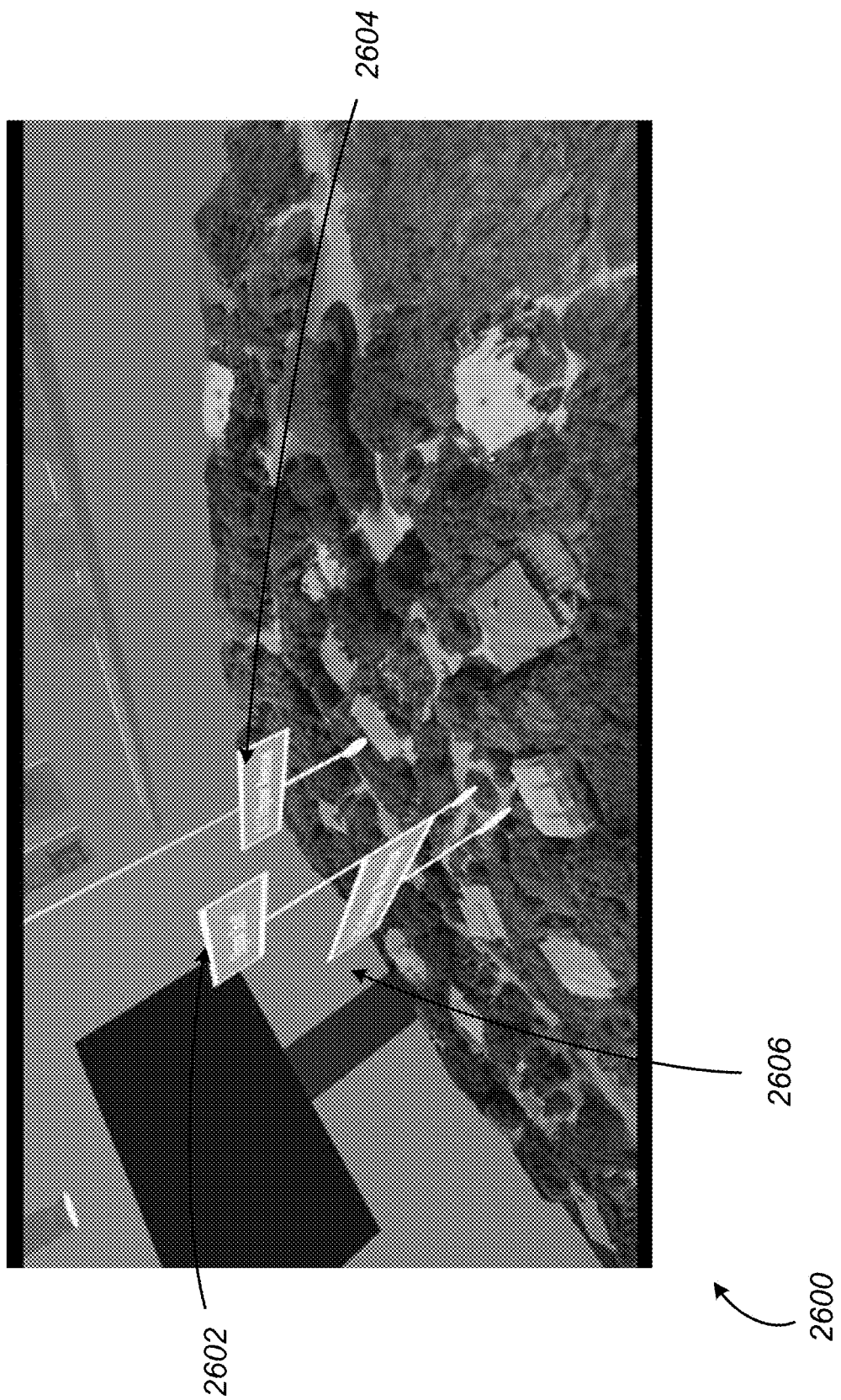
Figure 26C:
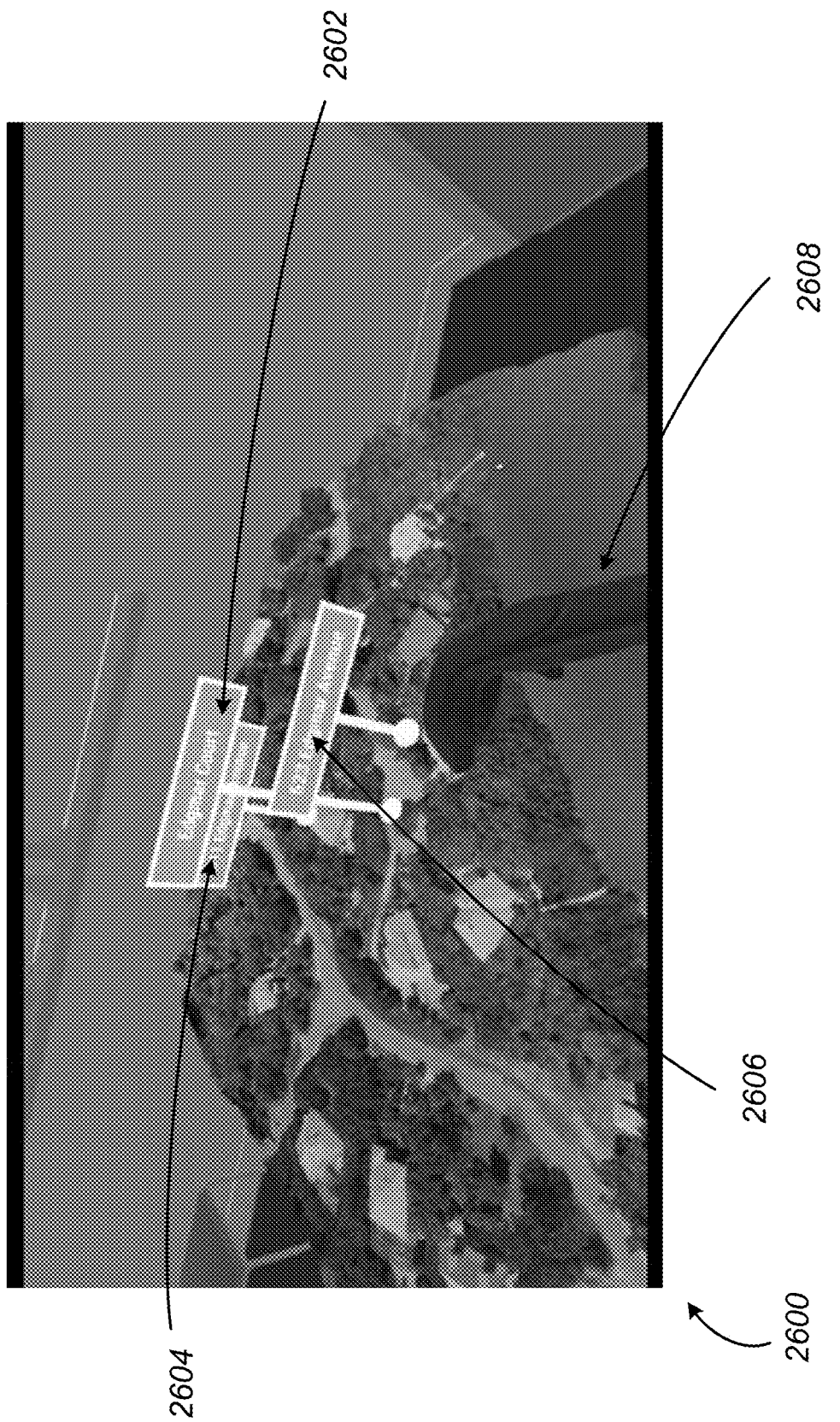
Figure 26D:
Figure 26E:
Figure 26F:
Figure 26G:
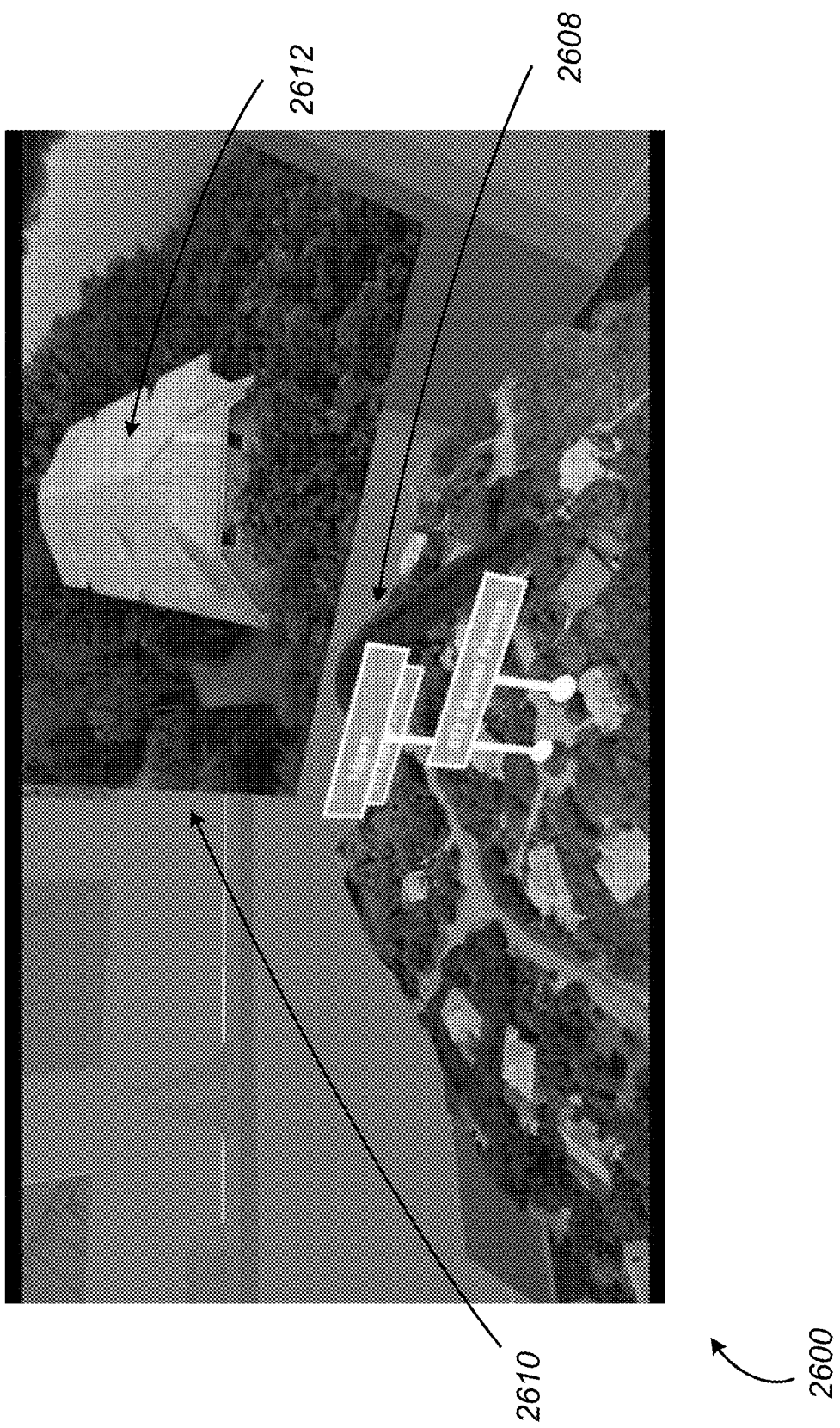
Figure 26H:
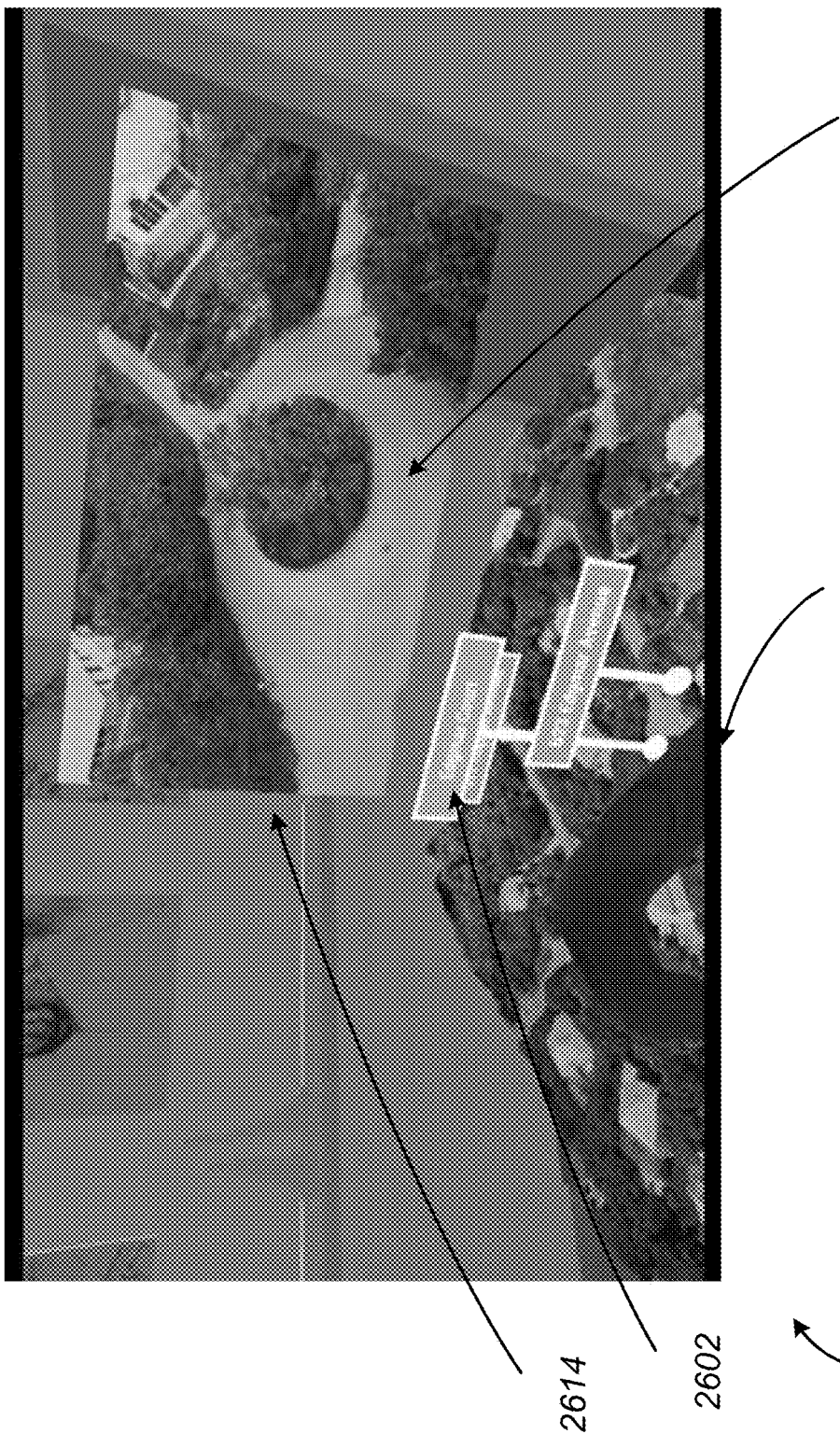
Figure 26I:
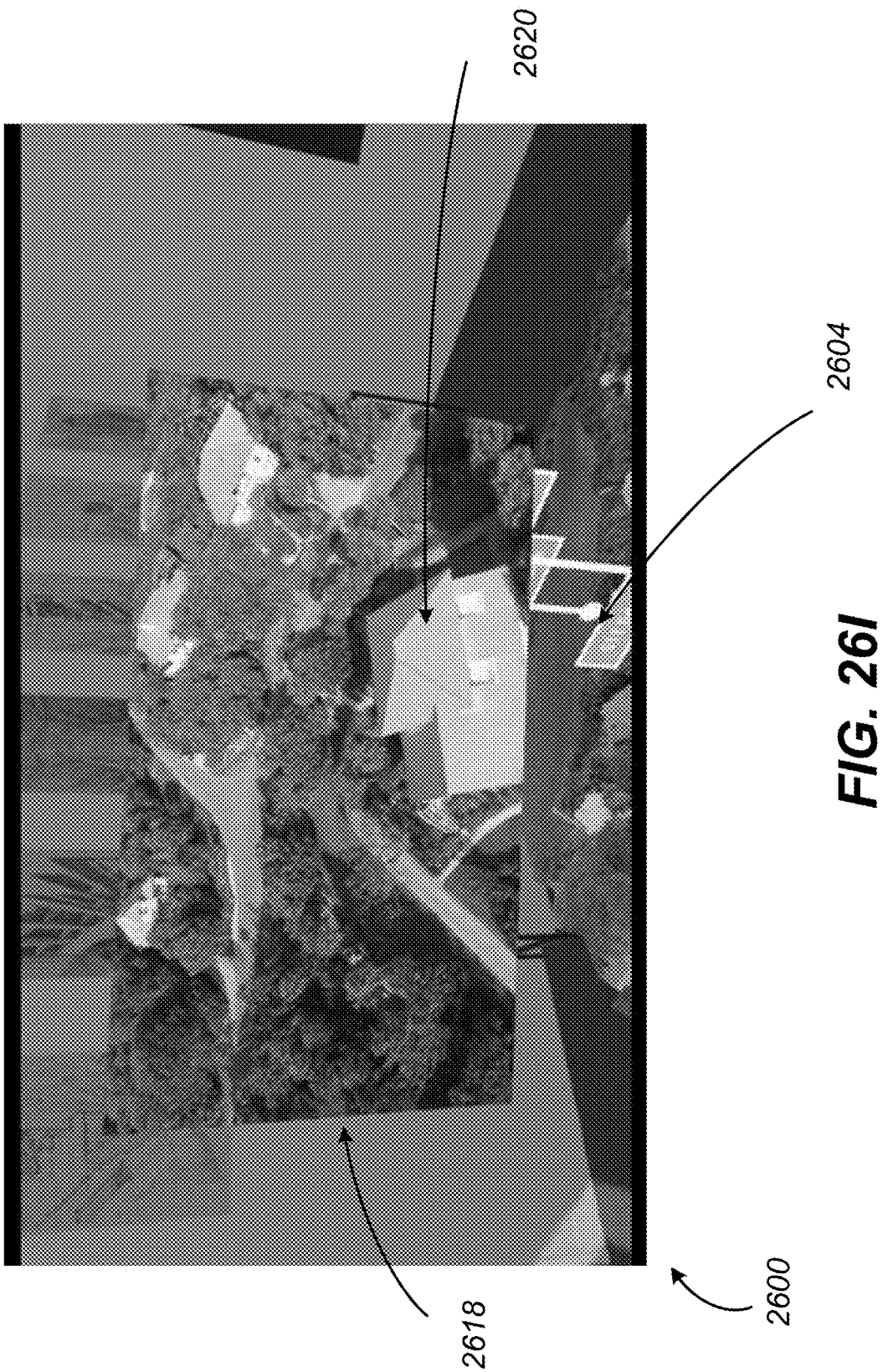
Figure 26J:
Figure 26K:
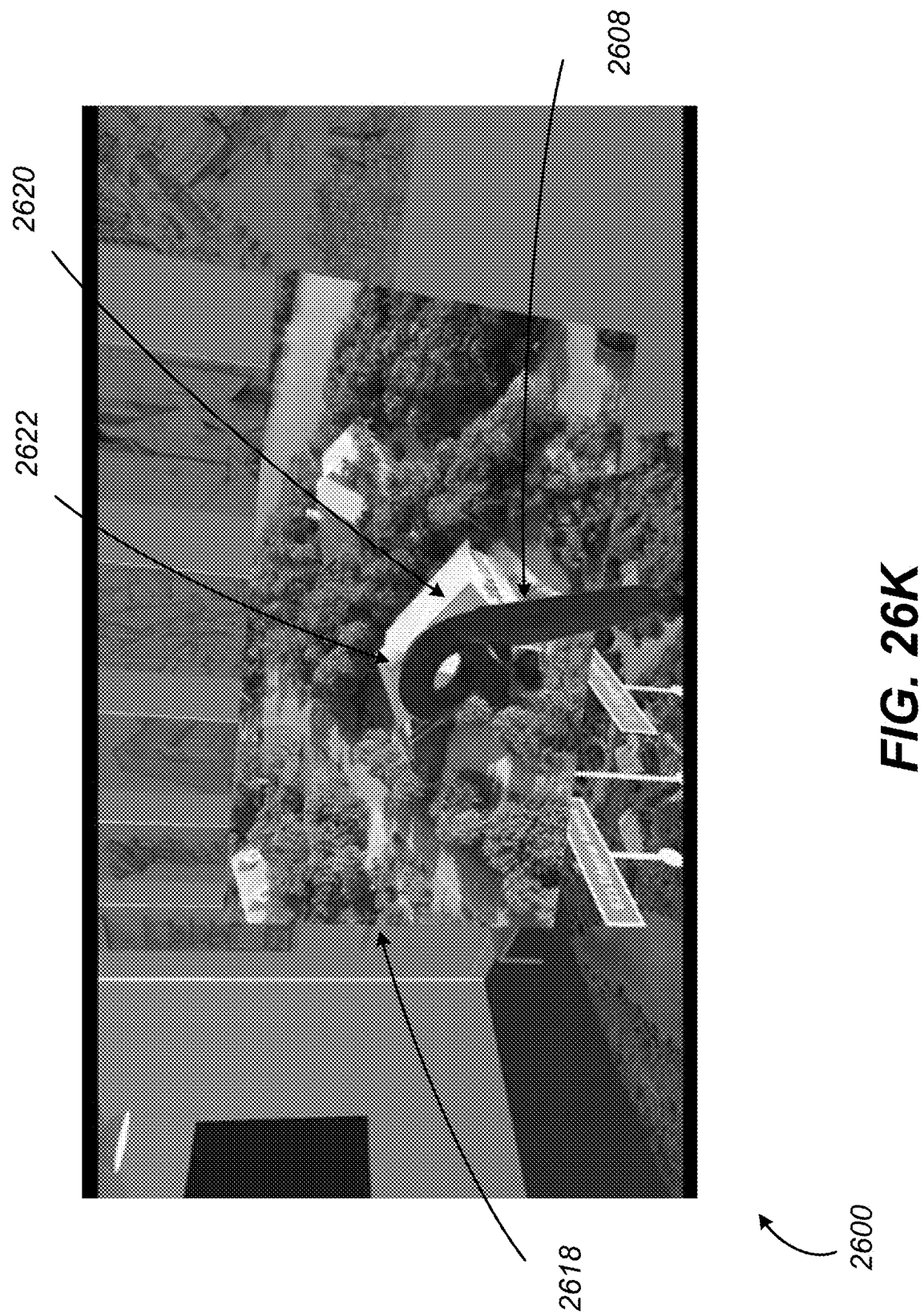
Figure 26L:
Figure 26M:
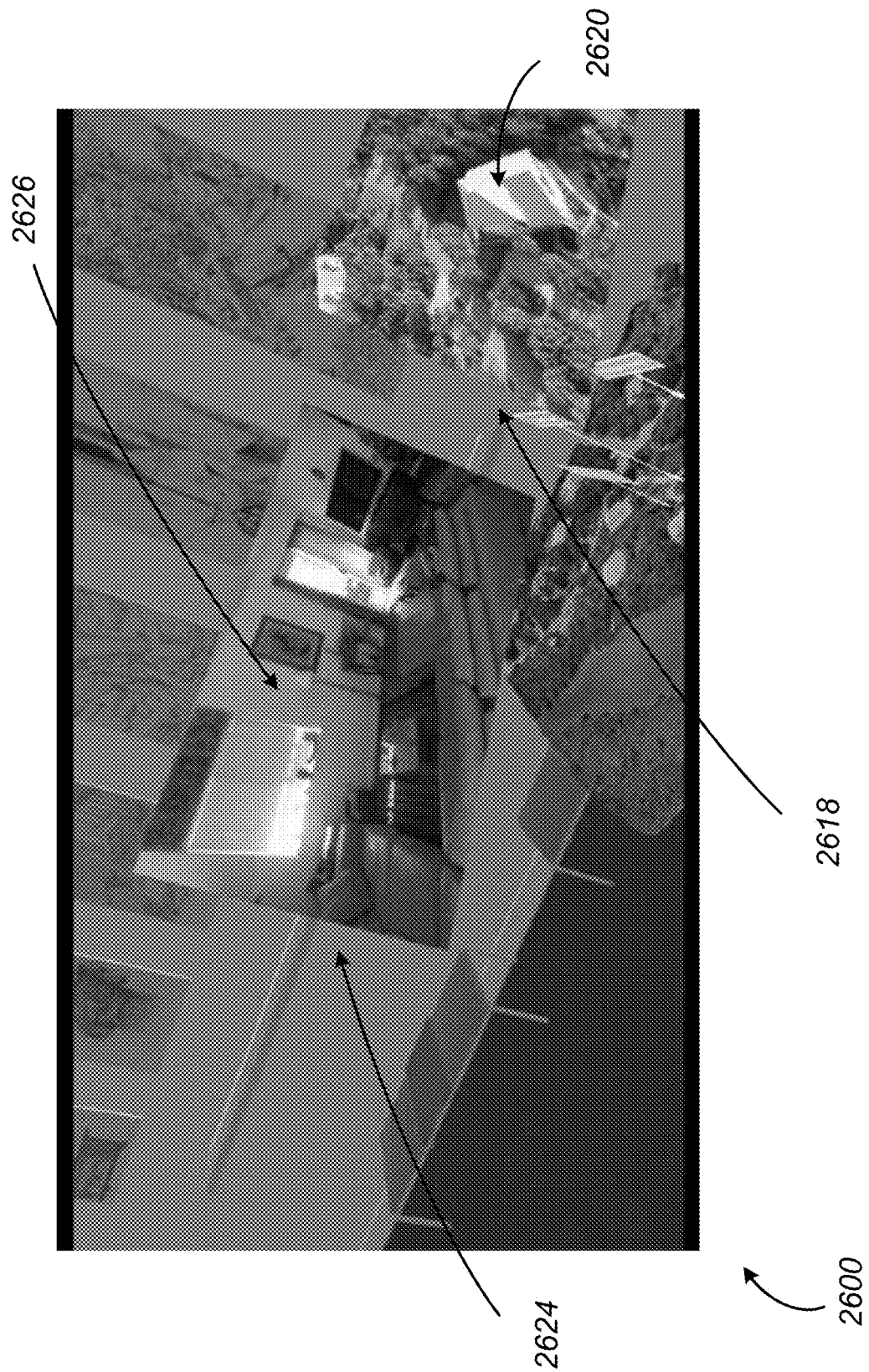

FIGS. 26A-M illustrate example views of a virtual reality environment with multiple interactive layers, in accordance with various embodiments of the present disclosure. FIG. 26A shows an example model 2600. In this example the content model 2600 is a real estate model. The real estate content model 2600 constitutes multiple layers, including a first layer and also includes several embedded objects 2602 (Edmar Court), 2604 (511 Edmar Avenue), and 2606 (623 Edmar Avenue) within the first layer. As demonstrated in FIG. 26B, both the real estate content model 2600 and the embedded objects 2602, 2604, and 2606 can be viewed at different angles through walking around the real estate content model 2600. In FIG. 26C, a selection device 2608 is used to select the embedded object 2606 (623 Edmar Avenue), as shown in FIG. 26D. The selection of the embedded object causes a new window 2610 to appear, as shown in FIG. 26E. The new window 2610 displays yet another content model 2612, this time of a pink house. The pink house model 2612 is also a content model and thus has multiple surround views as demonstrated by walking around the real estate content model 2600 yet again, as shown in FIG. 26F. The window 2610 containing the pink house model 2612 is a second layer embedded within the first layer of the real estate content model 2600. In FIG. 26G, the user moves the selection device one more time toward object 2602 (Edmar Court) and selects object 2602 (as shown in FIG. 26H). In FIG. 26H, window 2610 for object 2606 (623 Edmar Avenue) is replaced by a window 2614 displaying Edmar circle 2616 because both object 2602 (Edmar Court) and object 2606 (623 Edmar Avenue) are embedded objects leading to second layer windows 2614 and 2610. In some embodiments, opening up a second layer window while another second layer window is open does not necessarily close/replace the already open second layer window. FIG. 26I demonstrates the user selecting object 2604 (511 Edmar Avenue), which in turn pops up yet another window 2618 displaying a white house content model 2620. As with window 2610 corresponding to object 2606 (623 Edmar Avenue), window 2614 containing Edmar Court 2616 disappears because object 2604 (511 Edmar Avenue) produces a second layer window 2618. Because the content model 2620 in window 2618 has yet another embedded object, a green circle 2622 appears to notify the user of the presence of the embedded object, shown in FIG. 26J. In FIGS. 26K-L, the user uses the selection device 2608 to select the green dot/embedded object 2622 and a third window 2624 appears (FIG. 26L). Since the third window 2624 is a third layer window corresponding to an embedded object 2622 located within the second layer, second layer window 2618 displaying model house 2620 (511 Edmar Avenue) does not disappear. As demonstrated in FIG. 26M, the third layer window contains yet another content model 2626 (interior of 511 Edmar Avenue house), which itself is a panoramic style MIDMR. In some embodiments, the interior content model 2626 is a convex type MIDMR while the other models (e.g., 2620) is a concave type MIDMR.

MIDMR Enhancement

In particular example embodiments, various algorithms can be employed during capture of MIDM data, regardless of the type of capture mode employed. These algorithms can be used to enhance MIDMRs and the user experience. For instance, automatic frame selection, stabilization, view interpolation, image rotation, infinite smoothing, filters, and/or compression can be used during capture of MIDM data. In some examples, these enhancement algorithms can be applied to image data after acquisition of the data. In other examples, these enhancement algorithms can be applied to image data during capture of MIDM data.

According to particular example embodiments, automatic frame selection can be used to create a more enjoyable MIDM view. Specifically, frames are automatically selected so that the transition between them will be smoother or more even. This automatic frame selection can incorporate blur- and overexposure—detection in some applications, as well as more uniformly sampling poses such that they are more evenly distributed.

In some example embodiments, image stabilization can be used for MIDM in a manner similar to that used for video. In particular, keyframes in a MIDMR can be stabilized for to produce improvements such as smoother transitions, improved/enhanced focus on the content, etc. However, unlike video, there are many additional sources of stabilization for MIDM, such as by using IMU information, depth information, computer vision techniques, direct selection of an area to be stabilized, face detection, and the like.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor.

In some examples, depth information, if available, can be used to provide stabilization for MIDM. Because points of interest in a MIDMR are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it. Furthermore, content can also be selected automatically by using a foreground/background differentiation based on depth. In various examples, the content can stay relatively stable/visible even when the context changes.

According to various examples, computer vision techniques can also be used to provide stabilization for MIDM. For instance, keypoints can be detected and tracked. However, in certain scenes, such as a dynamic scene or static scene with parallax, no simple warp exists that can stabilize everything. Consequently, there is a trade-off in which certain aspects of the scene receive more attention to stabilization and other aspects of the scene receive less attention. Because MIDM is often focused on a particular object of interest, MIDM can be content-weighted so that the object of interest is maximally stabilized in some examples.

Another way to improve stabilization in MIDM includes direct selection of a region of a screen. For instance, if a user taps to focus on a region of a screen, then records a convex series of images, the area that was tapped can be maximally stabilized. This allows stabilization algorithms to be focused on a particular area or object of interest.

In some examples, face detection can be used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, mouth) can be used as areas to stabilize, rather than using generic keypoints.

According to various examples, view interpolation can be used to improve the viewing experience. In particular, to avoid sudden "jumps" between stabilized frames, synthetic, intermediate views can be rendered on the fly. This can be informed by content-weighted keypoint tracks and IMU information as described above, as well as by denser pixel-to-pixel matches. If depth information is available, fewer artifacts resulting from mismatched pixels may occur, thereby simplifying the process. As described above, view interpolation can be applied during capture of MIDM in some embodiments. In other embodiments, view interpolation can be applied during MIDM generation.

In some embodiments, IMU data such as tilt, direction, acceleration, etc. may be used to detect captured frames that are "out of line" or deviating from a detected capture trajectory. For example, a 360 degree capture of an object may be desired with a smooth concave trajectory. IMU may be used to predict a trajectory and can be used to discard frames or prevent capture of frames that are too far out of the predicted trajectory beyond a certain threshold (or "out of line" threshold). For example, embodiments, if a sudden or rapid movement is detected and associated with a captured frame, such captured frame may be determined to be out of the trajectory line. As another example, such trajectory monitoring capability may eliminate a captured frame in which the object is too close or too far as compared to previously captured frames along a trajectory. In various embodiments, the "out of line" threshold may be determined via a combination of x,y translation of pixels and rotational movement of image frames in addition to the IMU data. For example, position of keypoints in captured image frames may be tracked over time in addition to the IMU data.

Such use of both translation and rotation are not implemented in existing methods of image stabilization or interpolation. Additionally, existing methods of video stabilization use optical stabilization in the lens. This video stabilization, which occurs post-processing, includes shifting, but does not include scaling. Thus, larger frames are required because stabilization without scaling may cause the edge of each video frame to be unaligned and unsmooth.

However, the methods and systems described herein may implement scaling for stabilization of artificial frames interpolated between captured frames. In one example embodiment, similarity 2D parameters, including x,y translation, a 2D rotation, and a 2D scale, may be used to determine the translation between frames. Such parameters may include 1 rotation variable, 2 translation variables, and 2 scaling variables. By using a combination of translation, rotation, and scale, the methods and systems described herein is able to account for movement toward and away from an object. In certain systems, if only keypoints are matched, then images may be interpolated along a camera translation using a least squares regression analysis. In other systems, keypoints may be matched using a random sample consensus (RANSAC) algorithm as described further in this description. Thus, the described methods and systems result in a set of images that have been stabilized along a smooth trajectory.

In some examples, view interpolation may be implemented as infinite smoothing, which may also be used to improve the viewing experience by creating a smoother transition between displayed frames, which may be actual or interpolated, as described above. Infinite smoothing may include determining a predetermined amount of possible transformations between frames. A Harris corner detector algorithm may be implemented to detect salient features to designate as keypoints in each frame, such as areas of large contrast, areas with minimum ambiguity in different dimensions, and/or areas with high cornerness. A predetermined number keypoints with the highest Harris score may then be selected. a RANSAC (random sample consensus) algorithm may then be implemented to determine a number of the most common occurring transformations possible based on all possible transformations of the keypoints between frames. For example, a smooth flow space of eight possible transformations and/or motions for various pixels between frames may be discretized. Different transformations may be assigned to different pixels in a frame. Such keypoint detection, keypoint tracking, and RANSAC algorithms may be run offline. In some embodiments, infinite smoothing algorithms may be run in real time on the fly. For example, as the user navigate to a particular translation position, and if that translation position does not already correspond to an existing and/or captured image frame, the system may generate an appropriate artificial image frame corresponding to the particular translation position using the optimal transformation chosen from the possible transformation candidates.

In various embodiments, infinite smoothing and other methods of view interpolation described herein may generate a smooth view around an object or panoramic scene with fewer stored image frames. In some embodiments, a MIDMR may only require 10 or fewer stored image frames from which artificial frames may be interpolated. However in some embodiments, up to 100 stored image frames may be required. In yet other embodiments, up to 1000 stored image frames may be required. The number of stored image frames may depend on the angle range of camera translation. However, in such embodiments, the number of stored image frames required for a given angle of camera translation is less with the system and methods described herein, than for conventional and existing methods of image stitching. In some embodiments, up to 25 degrees of a concave camera rotation around an object may be generated between two stored image frames with sufficient overlapping imagery. In some embodiments, even greater degrees of such camera rotation may be generated from just two stored image frames. In various embodiments, the angle range of such camera rotation between two stored frames may depend upon the size of and amount of overlap in between the two stored frames.

According to various embodiments, MIDMRs provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with MIDM that allow the MIDM to be indexed with a high degree of efficiency and accuracy; and the ability of the user to interact and change the viewpoint of the MIDMR. In particular example embodiments, the characteristics described above can be incorporated natively in the MIDMR, and provide the capability for use in various applications. For instance, MIDM can be used to enhance various fields such as e-commerce, visual search, 3D printing, file sharing, user interaction, and entertainment.

Although MIDMR produced with described methods and systems may have some characteristics that are similar to other types of digital media such as panoramas, according to various embodiments, MIDMRs include additional features that distinguish them from these existing types of digital media. For instance, existing methods of generating panorama involve combining multiple overlapping images together by matching similar and/or matching points and/or areas in each image and simply stitching the matching points and/or areas together. Overlapping areas are discarded and the stitched image is then mapped to a sphere or cylinder. Thus such panoramas generated by existing methods have distorted edges and lack parallax, causing scenes with foreground and background to lack an impression of depth and look unrealistic.

Furthermore, a stitched panorama comprises one large image after overlapping images are stitched. MIDMRs, as described herein, comprise a series of images that are presented to the user as a user interacts with the MIDMR or viewing device. The information in the overlaps of the series of images, including interpolation information for generating artificial frames in between captured frames, is stored. Matching keypoints are identified to compute intermediate frames and linear blending is implemented to transform an image between two capture frames. To compute intermediate frames, transformations are implemented, such as homography which may be used for stabilization, as well as scaling, which allows interpolated keypoints in images to match up. No part of any image frame is discarded. This causes parallax to be visible in MIDMRs generated by systems and methods described herein, in contrast to existing panoramas, Additionally, a MIDMR can represent moving data. Nor is a MIDMR is not limited to a specific cylindrical, spherical or translational movement. Furthermore, unlike a stitched panorama, a MIDMR can display different sides of the same object. Additionally, various motions can be used to capture image data with a camera or other capture device.

Infinite Smoothing

Figure 27:
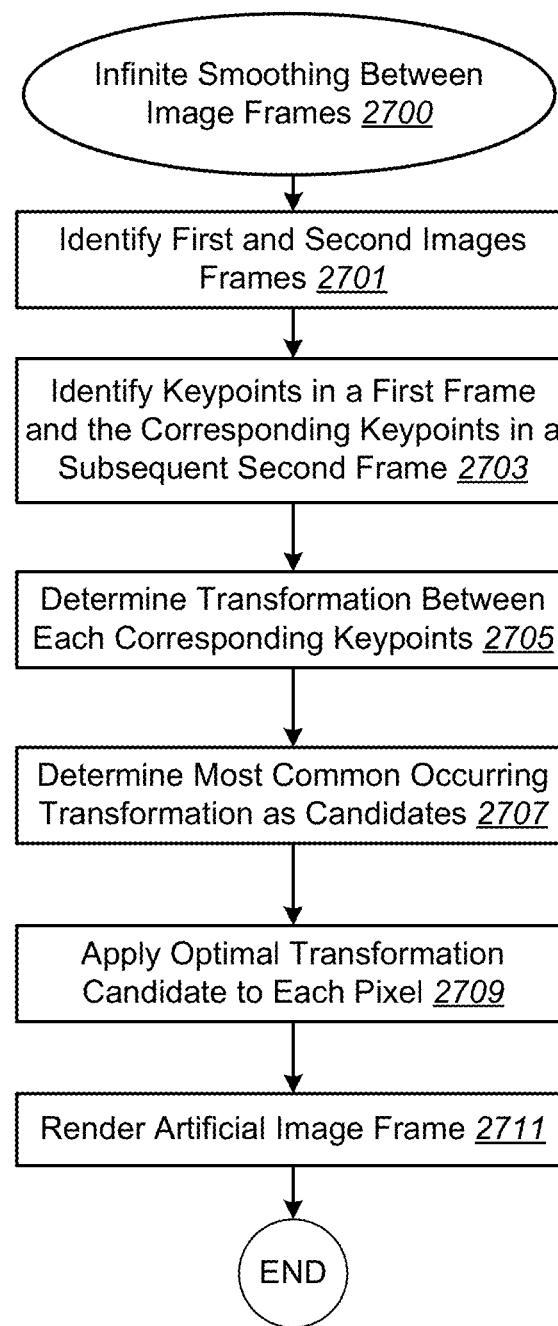
FIG. 27 illustrates an example of a method for infinite smoothing between image frames, in accordance with one or more embodiments.

In various embodiments, MIDMRs are enhanced using infinite smoothing techniques. FIG. 27 illustrates an example method for infinite smoothing between image frames, in accordance with one or more embodiments. With reference to FIG. 27, shown is an example of a method 2700 for infinite smoothing between image frames, in accordance with one or more embodiments. In various embodiments, method 2700 may be implemented to parameterize a transformation, such as T_AB, for interpolation of those parameters during runtime.

At step 2701, first and second image frames are identified. In some embodiments, the first and second image frames may be part of a sequence of images captured. In various embodiments, the image frames may be consecutively captured images in time and/or space. In some embodiments, the first and second image frames may be adjacent image frames, such as frame N and frame N+1. The method 2700 described herein may be implemented to render any number of frames between N and N+1 based on the position of the user, user selection, and/or viewing device.

A random sample consensus (RANSAC) algorithm may be implemented to determine the possible transformation candidates between the two image frames. As described herein, transformation candidates may be identified from keypoints tracked from a first frame to a second frame. Various transformations may be calculated from various different parameters gathered from various combinations of keypoints. At step 2703, keypoints in the first frame and corresponding keypoints in the second frame are identified. In some embodiments, the first frame includes an image that was captured before the image in the second frame. In other embodiments, the first frame may include an image captured after the image in the second frame. In various embodiments, keypoints may be identified using a Harris-style corner detector algorithm or other keypoint detection method. In other embodiments, various other corner detection algorithms may be implemented, such as a Moravec corner detection algorithm, a Förstner corner detector, etc. Such corner detector algorithm may be implemented to detect salient features to designate as keypoints in each frame, such as areas of large contrast, areas with minimum ambiguity in different dimensions, and/or areas with high cornerness. A predetermined number keypoints with the highest Harris score may then be selected. For example, 1,000 keypoints may be identified and selected on the first frame. The corresponding 1,000 keypoints on the second frame can then be identified using a Kanade-Lucas-Tomasi (KLT) feature tracker to track keypoints between the two image frames.

At step 2705, a transformation is determined for each corresponding keypoint in each image frame. In some embodiments, a set of two keypoint correspondences are used to determine a transformation. Various parameters may be used to calculate the transformation between corresponding keyframes by a predetermined algorithm. In one example embodiment, similarity 2D parameters, including x,y translation, a 2D rotation, and a 2D scale, may be used to determine the translation. Other parameters that may be used include 2D translation (x and y translation), 2D Euclidean parameters (2D rotation and x,y translation), affine, homography, etc. The RANSAC algorithm may repeatedly select corresponding keyframes between image frames to determine the transformation. In some embodiments, corresponding keyframes may be selected randomly. In other embodiments, corresponding keyframes may be selected by location.

Once all transformations have been calculated for each keyframe correspondence, the most common occurring transformations are determined as candidates at step 2707.

According to various embodiments, keypoints may be grouped based on the associated transformation calculated at step 2705. In some embodiments, each transformation determined at step 2705 is applied to all keypoints in an image, and the number of inlier keypoints for which the transformation is successful is determined. In other words, keypoints that experience the same transformation between the first and second image frames are grouped together as inlier keypoints. In some embodiments, a predetermined number of transformations with the most associated inlier keypoints are selected to be transformation candidates. In some embodiments, the image intensity difference between a transformed image and the second image may also be calculated for each transformation determined at step 2705 and applied to the keypoints. In some embodiments, image intensity difference is only calculated if a transformation results in a larger number of inlier keypoints than a previous determined transformation. In various embodiments, the transformations are ranked based on the corresponding number of resulting inlier keypoints and/or image intensity difference.

In various embodiments, a predetermined number of highest ranking transformations are selected to be transformation candidates. In some embodiments, the remaining transformations determined at step 2705 are discarded. Any number of transformation candidates may be selected. However, in some embodiments, the number of transformations selected as transformation candidates is a function of processing power. In some embodiments, processing time may increase linearly with increased number of candidates. In an example embodiment, eight possible transformation candidates with the most associated keypoints are selected. However, in other example embodiments, fewer than eight possible transformation candidates may be selected to decrease required processing time or memory. In some embodiments, steps 2703, 2705, and 2707 are run offline. In some embodiments, steps 2703, 2705, and 2707 are run in real-time, as image frames are captured.

At step 2709, the optimal transformation candidate is applied to each pixel. Each pixel in an image may experience a different transformation between frames. In some embodiments, each of the transformation candidates is applied to each pixel. The transformation candidate that results in the least difference between frames may be selected. In some embodiments, each of the transformation candidates is applied to a group, or "community," of pixels. For example, a community of pixels may comprise a 7×7 (−3, +3) group of pixels. Once an optimal transformation is applied to each pixel, an artificial image may be rendered at step 2711. In various embodiments, steps 2709 and 2711 may be performed during runtime when the user is viewing the sequence of images. In such embodiments, the transformation may be a function of frame number of the frame between N and N+1. The number of frames between N and N+1 may be determined based on various considerations, such as the speed of movement and/or the distance between frames N and N+1. Because method 2700 may generate any number of frames between frames N and N+1, the user may perceive a smooth transition as the user view different viewpoints of the three-dimensional model of an object of interest, as an image frame may be rendered for virtually any viewpoint position the user is requesting to view. Furthermore, because the artificial image frames may be rendered based on the calculated transformation parameters, storage of such artificial image frames is not required. This enhances the functioning of image processing computer systems by reducing storage requirements.

Method 2700 may then be implemented for the transition between each image frame in the sequence. Various embodiments of method 2700 may provide advantages over existing methods of rendering artificial images, such as alpha blending. Especially in the case of concave MIDMRs, existing methods result in artifacts or ghosting effect from improperly aligned image frames. This occurs because unlike convex MIDMRs, concave and/or flat MIDMRs do not experience a single transformation for all pixels and/or keypoints. Method 2700 provides a process for determining the optimal transformation out of multiple transformation candidates to apply to a pixel. Additionally, method 2700 may generate image frames that are seen, as well as portions of image frames that are unseen. Thus, motion between two discretized image frames may be generated by selecting the frame that includes the least amount of conflict.

Stereoscopic Pairs for AR and VR

Figure 28:
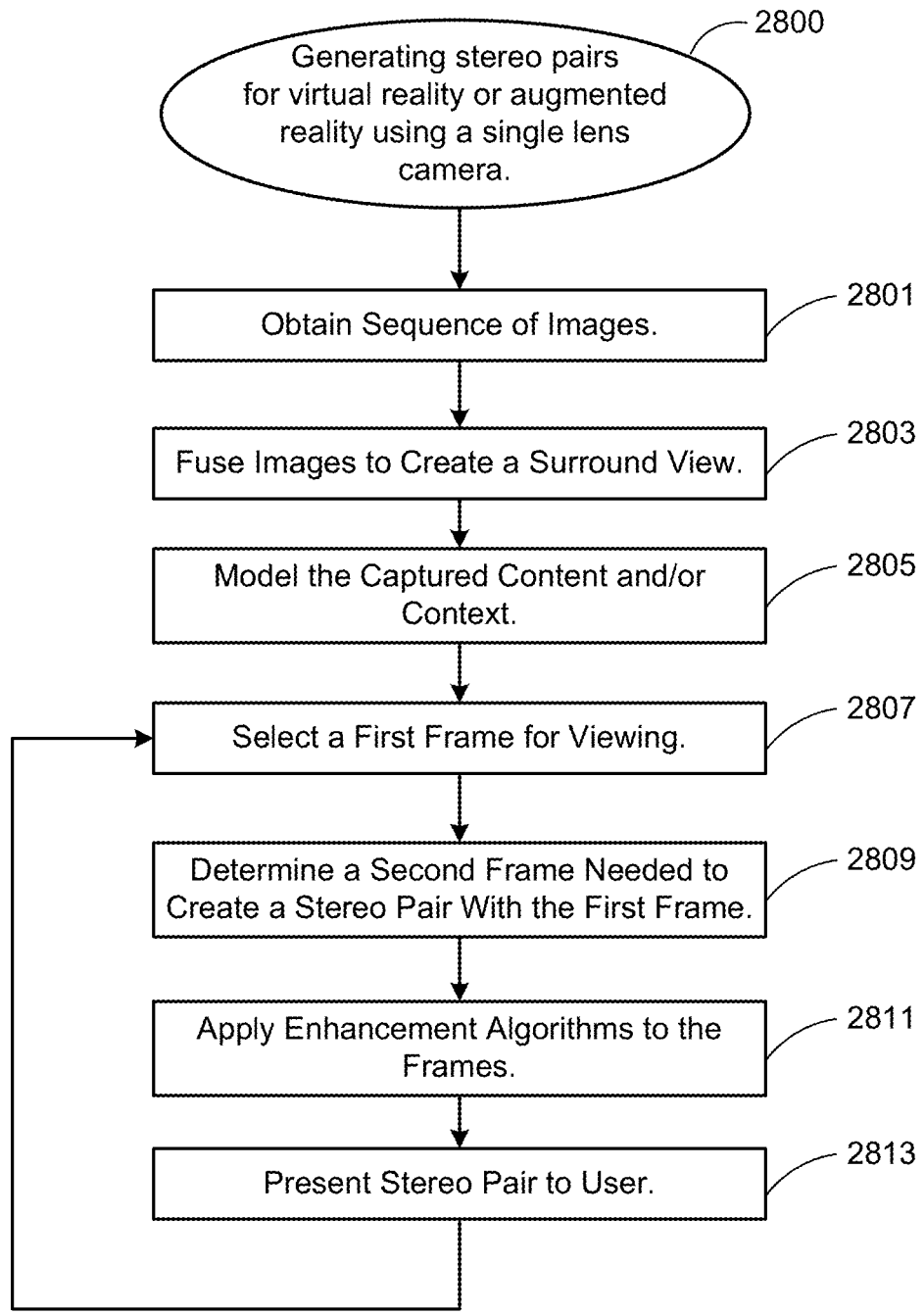
FIG. 28 illustrates an example method for generating stereo pairs for virtual reality or augmented reality using a single lens camera, in accordance with one or more embodiments.

As described above, MIDMRs can be used in an AR or VR setting. FIG. 28 illustrates a With reference to FIG. 28, shown is an example method 2800 for generating stereo pairs for virtual reality or augmented reality using a single lens camera, in accordance with one or more embodiments. At step 2801, a sequence of images is obtained. In some embodiments, the sequence of images may be multiple snapshots and/or video captured by a camera. In some embodiments, the camera may comprise a single lens for capturing sequential images one at a time. In some embodiments, the captured image may include 2D images, such as 2D images 104. In some embodiments, other data may also be obtained from the camera and/or user, including location information.

At step 2803, the sequence of images is fused to create a MIDMR. For example, the images and other data captured in step 2801 may be fused together at a sensor fusion block. At step 2805, the captured content and/or context is modeled. As previously described, the data that has been fused together in step 2803 may then be used for content modeling and/or context modeling. As such, a MIDMR with a three-dimensional view of an object and/or the context may be provided and accessed by a user. Various enhancement algorithms may be employed to enhance the user experience. For instance, automatic frame selection, stabilization, view interpolation, image rotation, infinite smoothing, filters, and/or compression can be used during capture of MIDM data. In some examples, these enhancement algorithms can be applied to image data after acquisition of the data. In other examples, these enhancement algorithms can be applied to image data during capture of MIDM data. In some embodiments, the enhancement algorithms may be applied during a subsequent step, such as at step 2811, described below.

At step 2807, a first frame is selected for viewing. In some embodiments, a first frame may be selected by receiving a request from a user to view an object of interest in a MIDMR. In some embodiments, the request may also be a generic request to view a MIDMR without a particular object of interest. In some embodiments, a particular first frame may be specifically selected by the user. In some embodiments, the first frame may be designated for viewing by either the right eye or the left eye. In the present example, the first frame selected at step 2807 is designated for viewing by the left eye.

At step 2809, a second frame needed to create a stereo pair with the first frame is determined. The second frame may be designated for viewing by the other eye of the user, which is not designated to the first frame. Thus, in the present example, the second frame determined at step 2809 is designated for viewing by the right eye. In various embodiments, the second frame may be selected based on a desired angle of vergence at the object of interest and/or focal point. Vergence refers to the simultaneous movement of both eyes in opposite directions to obtain or maintain single binocular vision. When a creature with binocular vision looks at an object, the each eye must rotate around a vertical axis so that the projection of the image is in the center of the retina in both eyes. To look at an object closer by, the eyes rotate towards each other (convergence), while for an object farther away they rotate away from each other (divergence). Exaggerated convergence is called cross eyed viewing (focusing on one's nose for example). When looking into the distance, the eyes diverge until parallel, effectively fixating the same point at infinity (or very far away). As used herein, the angle of vergence refers to the angle between the lines of sight of each frame to the object of interest and/or desired focal point. In some embodiments, a degree of vergence may be between 5 degrees to 10 degrees. In some embodiments, a desired degree of vergence of more than 10 degrees may cause a user to see different objects and/or experience disjointed views (i.e., double vision or diplopia).

In some embodiments, the second frame may additionally be selected based on gathered location and/or IMU information. For example, if the object of interest and/or focal point is closer, a larger degree of vergence may be desired to convey an appropriate level of depth. Conversely, if the object of interest and/or focal point is further away, a smaller degree of vergence may be desired.

In some embodiments, the degree of vergence may then be used to determine a spatial baseline. The spatial baseline refers to the distance between the left eye and the right eye, and consequently, the distance between the first frame and the second frame. The average distance between the left eye and right eye of a human is about 10 cm to 15 cm. However, in some embodiments, a wider spatial baseline may be allowed in order to enhance the experience effect of depth. For example, a desired spatial baseline may be 30 cm.

Once the distance of the spatial baseline has been determined, a second frame located at that distance away from the first frame may be selected to be used as the stereo pair of the first frame. In some embodiments, the second frame located at the determined distance may be an actual frame captured by the camera at step 2801. In some embodiments, the second frame located at the determined distance may be an artificial frame generated by interpolation, or other enhancement algorithms, in creating the MIDMR. In other embodiments, an artificial second frame may be generated by various enhancement algorithms described below with reference to step 2809.

At step 2811, enhancement algorithms are applied to the frames. In some embodiments, enhancement algorithms may only be applied to the second frame. In some embodiments, step 2811 may alternatively, or additionally, occur after step 2805 and before selecting the first frame for viewing at step 2807. In various embodiments, such algorithms may include: automatic frame selection, stabilization, view interpolation, filters, and/or compression. In some embodiments, the enhancement algorithms may include image rotation. In order for the user to perceive depth, the view of each frame must be angled toward the object of interest such that the line of sight to the object of interest is perpendicular to the image frame. In some embodiments, certain portions of the image of a frame may be rotated more or less than other portions of that image. For example, portions identified as context and/or background with a focal point at infinity may be rotated less than a nearby object of interest in the foreground identified as the content.

In some embodiments, image rotation may include using IMU and image data to identify regions that belong to the foreground and regions that belong to the background. For example, rotation information from the IMU data informs how a keypoint at infinity should move. This then can be used to identify foreground regions where a keypoint's movement violates the optical flow for infinity. In some embodiments, the foreground may correspond to the content or an object of interest, and the background may correspond to the context. In some embodiments, the keypoints may be used to determine optimal transformation for one or more images in a stereo pair. In some embodiments, the keypoints are used to determine focal length and rotation parameters for the optimal transformation.

A Harris corner detector algorithm may be implemented to detect salient features to designate as keypoints in each frame, such as areas of large contrast, areas with minimum ambiguity in different dimensions, and/or areas with high cornerness. In some embodiments, only keypoints corresponding to the object of interest and/or content are designated. For example, when performing image rotation for a concave MIDMR, only keypoints corresponding to the object of interest and/or content will be designated and used. However, where image rotation is used for a convex MIDMR, keypoints corresponding to both the background and the foreground may be designated and used. Then, a Kanade-Lucas-Tomasi (KLT) feature tracker may be used to track keypoints between two image frames. In some embodiments, one or more keypoints tracked by the KLT feature tracker for image rotation may be the same keypoints used by other enhancement algorithms, such as infinite smoothing and/or view interpolation, as further described herein.

Two keypoints in a first frame and corresponding keypoints in a second frame may be selected at random to determine the rotation transformation. Based on the two keypoint correspondences, the focal length and rotation are solved to calculate the transformation. In various embodiments, only keypoints corresponding to the foreground regions are used to solve for focal length and rotation. In some embodiments, finding the optimal rotation transformation may further include minimizing the image intensity difference between the foreground regions of the two image frames. This two-dimensional 3×3 image transformation can be mapped from the combination of an actual 3D camera rotation and the focal length. The new pre-rotated image sequence is then produced given the solved transformation.

In some embodiments, a frame that is located at a particular point along the camera translation, which needed to create a stereo pair, may not exist. An artificially frame may be rendered to serve as the frame required to complete the stereo pair. Accordingly, by generating these artificially rendered frames, smooth navigation within the MIDMR becomes possible. In some embodiments, frames that have been rotated based on methods described with respect to step 2811 are already stabilized and correctly focused onto the object of interest. Thus, image frames interpolated based on these rotated frames may not require additional image rotation applied.

At step 2813, the stereo pair is presented to the user. In some embodiments, a first frame in the stereo pair is designated to be viewed by the user's left eye, while the second frame is designated to be viewed by the user's right eye. In some embodiments, the first and second frames are presented to the respective eye each frame is designated for, such that only the left eye views the first frame while only the right eye views the second frame. For example, the frames may be presented to the user in a viewing device, such as a virtual reality headset. This effectively applies a 3×3 image warp to the left eye and right eye images. By viewing each frame in the stereo pair with separate eyes in this way, these two-dimensional images are combined in the user's brain to give the perception of 3D depth.

The method may then return to step 2807 to select another frame for viewing. As previously described above, a subsequent frame may be selected by the user. In other embodiments, a subsequent frame may be selected based on a received user action to view the object of interest from a second viewpoint. For example, this user action can include moving (e.g. tilting, translating, rotating, etc.) an input device, swiping the screen, etc., depending on the application. For instance, the user action can correspond to motion associated with a locally concave MIDMR, a locally convex MIDMR, or a locally flat MIDMR, etc. Additionally, the user action may include movement of the user and/or a viewing device in three-dimensional space. For example, if the user moves the viewing device to another location in three-dimensional space, an appropriate frame corresponding to the view of the object of interest, content, and/or context from that camera location in three dimensional space. As previously described, intermediate images can be rendered between image frames in a MIDMR. Such intermediate images correspond to viewpoints located between the viewpoints of the existing image frames. In some embodiments, stereo pairs may be generated for each of these intermediate images and presented to the user by method 2800.

Thus, method 2800 may be used to generate stereoscopic pairs of images for a monocular image sequence captured by a single lens camera. Unlike existing methods in which stereoscopic pairs are created by simultaneously capturing two images at a predetermined distance apart along a camera translation, method 2800, and other processes described herein, can create stereoscopic pairs with only a sequence of single images captured along a camera translation. Thus, fewer images, and corresponding image data is required, resulting in less data storage. Moreover, the information required for selection of stereoscopic pairs and image rotation for method 2800 do not need to be stored and may be determined in real-time. Additionally, parameters are not set for stereoscopic pairs of images generated by method 2800, unlike in existing methods. For example, a wider or shorter distance may be selected between each image frame in a stereoscopic pair in order to increase or decrease the depth perception, respectively. Furthermore, one or more various objects within an image sequence may be determined to be an object of interest and different rotation. Images may be rotated differently depending on which object or objects are determined to be the object of interest. Moreover, various portions within an image may be rotated differently based on the determined object of interest. In other words, different rotation transformations may be determined for different portions of an image.

By generating and presenting stereo pairs corresponding to sequence of image frames in a MIDMR, method 2800 may be used to provide depth to the MIDMR. In various instances, this allows the user to perceive depth in a scene and/or an object of interest presented as a three-dimensional model without actually rendering and/or storing an actual three-dimensional model. In other words, there is no polygon generation or texture mapping over a three-dimensional mesh and/or polygon model, as in existing methods. However, the user still perceives the content and/or context as an actual three-dimensional model with depth from multiple viewpoint angles. The three-dimensional effect provided by the MIDMR is generated simply through stitching of actual two-dimensional images and/or portions thereof, and generation of stereo pairs corresponding to the two-dimensional images.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the disclosure. It is therefore intended that the disclosure be interpreted to include all variations and equivalents that fall within the true spirit and scope of the present disclosure.

What is claimed is:

1. A method for generating a multi-view interactive digital media representation in a virtual reality environment comprising:

obtaining a plurality of images, wherein each image in the plurality of images has location information and an object, wherein the plurality of images include at least a portion of overlapping subject matter;

fusing, via a processor, the plurality of images into a content model, wherein the content model includes a multi-view interactive digital media representation of the object; and generating, via the processor, a virtual reality environment using the content model;

wherein the multi-view interactive digital media representation is generated by fusing each object in the plurality of images into a single content model object without using the background in the plurality of images, connected together in a three-dimensional spatial graph, wherein the content model is generated directly from the plurality of images without using a 3D polygon model, wherein the content model includes multiple images captured using a convex capture motion;

wherein the multi-view interactive digital media representation is configured such that a user can navigate through and within the virtual reality environment to switch between multiple viewpoints of the content model via corresponding physical movements, wherein the user can directly rotate the content model while the user is in the virtual reality environment against a static context model background and walk around the object while the user is in the virtual reality environment, wherein walking around the object includes rotating the content model in conjunction with a rotating context model background, wherein the content model includes embedded objects that only are only visible during certain rotational views.

2. The method of claim 1, wherein the plurality of images is obtained from a plurality of users.

3. The method of claim 1, wherein the virtual reality environment is enhanced using one or more of automatic frame selection, stabilization, view interpolation, filters, and compression.

4. The method of claim 1, wherein the plurality of images includes images with different temporal information.

5. The method of claim 1, wherein the static context model background includes a locally concave surround view, the surround view surrounding the content model in a 360 degree navigable environment.

6. The method of claim 1, wherein the content model includes a locally convex surround view of the object.

7. The method of claim 1, wherein the virtual reality environment is configured such that the user can appear to be closer or farther to the surround views by physically moving through space.

8. A system for generating a multi-view interactive digital media representation in a virtual reality environment comprising:
   a processor; and
   memory, the memory comprising instructions for:
      obtaining a plurality of images, wherein each image in the plurality of images has location information and an object, wherein the plurality of images include at least a portion of overlapping subject matter;
      fusing, via a processor, the plurality of images into a content model, wherein the content model includes a multi-view interactive digital media representation of the object; and
      generating, via the processor, a virtual reality environment using the content model;
      wherein the multi-view interactive digital media representation is generated by fusing each object in the plurality of images into a single content model object without using the background in the plurality of images, connected together in a three-dimensional spatial graph, wherein the content model is generated directly from the plurality of images without using a 3D polygon model, wherein the content model includes multiple images captured using a convex capture motion;
      wherein the multi-view interactive digital media representation is configured such that a user can navigate through and within the virtual reality environment to switch between multiple viewpoints of the content model via corresponding physical movements,
      wherein the user can directly rotate the content model while the user is in the virtual reality environment against a static context model background and walk around the object while the user is in the virtual reality environment, wherein walking around the object includes rotating the content model in conjunction with a rotating context model background, wherein the content model includes embedded objects that only are only visible during certain rotational views.

9. The system of claim 8, wherein the plurality of images is obtained from a plurality of users.

10. The system of claim 8, wherein the virtual reality environment is enhanced using one or more of automatic frame selection, stabilization, view interpolation, filters, and compression.

11. The system of claim 8, wherein the plurality of images includes images with different temporal information.

12. The system of claim 8, wherein the static context model background includes a locally concave surround view, the surround view surrounding the content model in a 360 degree navigable environment.

13. The system of claim 8, wherein the content model includes a locally convex surround view of the object.

14. The system of claim 8, wherein the virtual reality environment is configured such that the user can appear to be closer or farther to the surround views by physically moving through space.

15. A non-transitory computer readable medium comprising instructions to execute a method for generating a multi-view interactive digital media representation in a virtual reality environment, the method comprising:
   obtaining a plurality of images, wherein each image in the plurality of images has location information and an object, wherein the plurality of images include at least a portion of overlapping subject matter;
   fusing, via a processor, the plurality of images into a content model, wherein the content model includes a multi-view interactive digital media representation of the object; and
   generating, via the processor, a virtual reality environment using the content model;
   wherein the multi-view interactive digital media representation is generated by fusing each object in the plurality of images into a single content model object without using the background in the plurality of images, connected together in a three-dimensional spatial graph, wherein the content model is generated directly from the plurality of images without using a 3D polygon model, wherein the content model includes multiple images captured using a convex capture motion;
   wherein the multi-view interactive digital media representation is configured such that a user can navigate through and within the virtual reality environment to switch between multiple viewpoints of the content model via corresponding physical movements,
   wherein the user can directly rotate the content model while the user is in the virtual reality environment against a static context model background and walk around the object while the user is in the virtual reality environment, wherein walking around the object includes rotating the content model in conjunction with a rotating context model background, wherein the content model includes embedded objects that only are only visible during certain rotational views.

16. The non-transitory computer readable medium of claim 15, wherein the virtual reality environment is enhanced using one or more of automatic frame selection, stabilization, view interpolation, filters, and compression.

17. The non-transitory computer readable medium of claim 15, wherein the plurality of images includes images with different temporal information.

18. The non-transitory computer readable medium of claim 15, wherein the static context model background includes a locally concave surround view, the surround view surrounding the content model in a 360 degree navigable environment.

19. The non-transitory computer readable medium of claim 15, wherein the content model includes a locally convex surround view of the object.

20. The non-transitory computer readable medium of claim 15, wherein the virtual reality environment is configured such that the user can appear to be closer or farther to the surround views by physically moving through space.

* * * * *